US012591046B2

(12) United States Patent
Jeong et al.

(10) Patent No.: US 12,591,046 B2
(45) Date of Patent: Mar. 31, 2026

(54) LIDAR DEVICE HAVING A SMART POWER MANAGEMENT SYSTEM AND AN OPERATING METHOD OF THE LIDAR DEVICE IMPLEMENTING THE SMART POWER MANAGEMENT SYSTEM

(71) Applicant: SOS LAB Co., Ltd., Gwangju (KR)

(72) Inventors: Ji Seong Jeong, Gwangju (KR); Chan M Lim, Yongin-si (KR); Yong Yi Lee, Seongnam-si (KR); Dong Kyu Kim, Gwangju (KR); Jun Hwan Jang, Suwon-si (KR)

(73) Assignee: SOS LAB Co., Ltd., Gwangju (KR)

( * ) Notice: Subject to any disclaimer, the term of this patent is extended or adjusted under 35 U.S.C. 154(b) by 1171 days.

(21) Appl. No.: 17/528,045

(22) Filed: Nov. 16, 2021

(65) Prior Publication Data

US 2022/0155420 A1     May 19, 2022

(30) Foreign Application Priority Data

| Nov. 17, 2020 | (KR) | .......................... 10-2020-0153824 |
| Jun. 29, 2021 | (KR) | .......................... 10-2021-0084422 |
| Jun. 29, 2021 | (KR) | .......................... 10-2021-0084423 |

(51) Int. Cl.
  *G01S 7/481*     (2006.01)
  *B60R 16/023*    (2006.01)
  (Continued)

(52) U.S. Cl.
  CPC .......... *G01S 7/4815* (2013.01); *G01S 7/4816* (2013.01); *G01S 17/89* (2013.01); *G01S 17/931* (2020.01); *B60R 16/0231* (2013.01)

(58) Field of Classification Search
  CPC ...... G01S 7/4815; G01S 7/4816; G01S 17/89; G01S 17/931; G01S 7/4817; G01S 7/484; G01S 7/4865; B60R 16/0231
  See application file for complete search history.

(56) References Cited

U.S. PATENT DOCUMENTS

| 9,383,753 B1 * | 7/2016 | Templeton ........... G05D 1/0246 |
| 10,466,342 B1 * | 11/2019 | Zhu ....................... G01S 7/4865 |

(Continued)

FOREIGN PATENT DOCUMENTS

| CN | 307591274 S | 10/2022 |
| CN | 307657709 S | 11/2022 |
| TW | D199895 | 9/2019 |

OTHER PUBLICATIONS

Taiwanese Office Action and Search Report, with English Translation, re TW Application No. TW 112302273, dated May 9, 2023 in 6 pages.

(Continued)

*Primary Examiner* — Yuqing Xiao
*Assistant Examiner* — Andrea Maria Baca
(74) *Attorney, Agent, or Firm* — Knobbe, Martens, Olson & Bear, LLP

(57) ABSTRACT a LiDAR device including a laser emitting unit configured to emit laser, a laser detecting unit configured to detect laser emitted from the laser emitting unit and a controller configured to operate the LiDAR device in a first operation mode and a second operation mode in which a power consumption per unit time is lower than a power consumption per unit time of the first operation mode.

10 Claims, 28 Drawing Sheets

(51) Int. Cl.
  *G01S 17/89* (2020.01)
  *G01S 17/931* (2020.01)

(56) References Cited

U.S. PATENT DOCUMENTS

| 2017/0269209 A1* | 9/2017 | Hall | G01S 17/10 |
| 2019/0310375 A1* | 10/2019 | Finkelstein | G01S 7/484 |
| 2020/0041609 A1 | 2/2020 | Ames et al. | |
| 2021/0003706 A1* | 1/2021 | Hwangbo | G01S 7/4868 |
| 2022/0155458 A1 | 5/2022 | Jeong et al. | |

OTHER PUBLICATIONS

U.S. Notice of Allowance, U.S. Appl. No. 17/528,039, dated Oct. 21, 2024, 10 pages.

* cited by examiner

1150

2000

FIG. 6
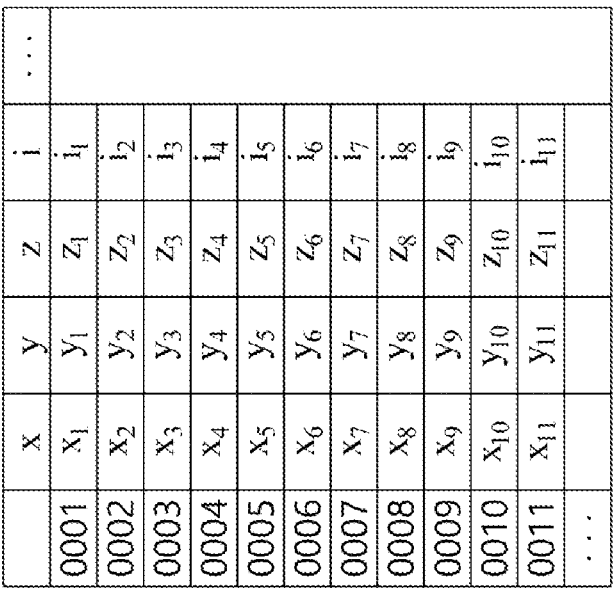
| | x | y | z | i | ⋮ |
|---|---|---|---|---|---|
| 0001 | $x_1$ | $y_1$ | $z_1$ | $i_1$ | |
| 0002 | $x_2$ | $y_2$ | $z_2$ | $i_2$ | |
| 0003 | $x_3$ | $y_3$ | $z_3$ | $i_3$ | |
| 0004 | $x_4$ | $y_4$ | $z_4$ | $i_4$ | |
| 0005 | $x_5$ | $y_5$ | $z_5$ | $i_5$ | |
| 0006 | $x_6$ | $y_6$ | $z_6$ | $i_6$ | |
| 0007 | $x_7$ | $y_7$ | $z_7$ | $i_7$ | |
| 0008 | $x_8$ | $y_8$ | $z_8$ | $i_8$ | |
| 0009 | $x_9$ | $y_9$ | $z_9$ | $i_9$ | |
| 0010 | $x_{10}$ | $y_{10}$ | $z_{10}$ | $i_{10}$ | |
| 0011 | $x_{11}$ | $y_{11}$ | $z_{11}$ | $i_{11}$ | |
| ⋮ | | | | | |
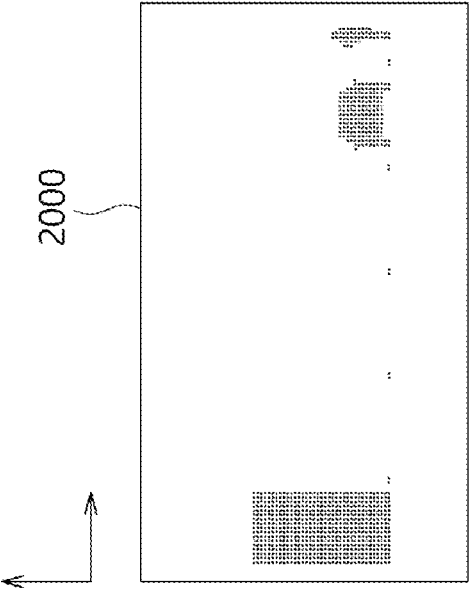
2000

FIG. 7

| | x | y | z | i | $\vdots$ |
|---|---|---|---|---|---|
| 0001 | $x_1$ | $y_1$ | $z_1$ | $i_1$ | |
| 0002 | $x_2$ | $y_2$ | $z_2$ | $i_2$ | |
| 0003 | $x_3$ | $y_3$ | $z_3$ | $i_3$ | |
| 0004 | $x_4$ | $y_4$ | $z_4$ | $i_4$ | |
| 0005 | $x_5$ | $y_5$ | $z_5$ | $i_5$ | |
| 0006 | $x_6$ | $y_6$ | $z_6$ | $i_6$ | |
| 0007 | $x_7$ | $y_7$ | $z_7$ | $i_7$ | |
| 0008 | $x_8$ | $y_8$ | $z_8$ | $i_8$ | |
| 0009 | $x_9$ | $y_9$ | $z_9$ | $i_9$ | |
| 0010 | $x_{10}$ | $y_{10}$ | $z_{10}$ | $i_{10}$ | |
| 0011 | $x_{11}$ | $y_{11}$ | $z_{11}$ | $i_{11}$ | |
| $\cdots$ | | | | | |

| | x | y | z | i |
|---|---|---|---|---|
| 0001 | $x_1$ | $y_1$ | $z_1$ | $i_1$ |
| 0002 | $x_2$ | $y_2$ | $z_2$ | $i_2$ |
| 0003 | $x_3$ | $y_3$ | $z_3$ | $i_3$ |
| 0004 | $x_4$ | $y_4$ | $z_4$ | $i_4$ |
| 0005 | $x_5$ | $y_5$ | $z_5$ | $i_5$ |
| 0006 | $x_6$ | $y_6$ | $z_6$ | $i_6$ |
| 0007 | $x_7$ | $y_7$ | $z_7$ | $i_7$ |
| 0008 | $x_8$ | $y_8$ | $z_8$ | $i_8$ |
| 0009 | $x_9$ | $y_9$ | $z_9$ | $i_9$ |
| 0010 | $x_{10}$ | $y_{10}$ | $z_{10}$ | $i_{10}$ |
| 0011 | $x_{11}$ | $y_{11}$ | $z_{11}$ | $i_{11}$ |
| ... | | | | |

2100

2110

LIDAR DEVICE HAVING A SMART POWER MANAGEMENT SYSTEM AND AN OPERATING METHOD OF THE LIDAR DEVICE IMPLEMENTING THE SMART POWER MANAGEMENT SYSTEM

CROSS REFERENCE TO RELATED APPLICATIONS

The present application claims priority to and the benefit of Korean Patent Application No. 10-2020-0153824, filed Nov. 17, 2020, Korean Patent Application No. 10-2021-0084422, filed Jun. 29, 2021, and Korean Patent Application No. 10-2021-0084423, filed Jun. 29, 2021 the disclosure of which is incorporated herein by reference in its entirety.

TECHNICAL FIELD

The present disclosure relates to a LiDAR device and, more particularly, to a LiDAR device equipped with a smart power management system and a method of operating the LiDAR device to realize the smart power management system.

BACKGROUND

Recently, with interest in autonomous vehicles and driverless vehicles, a light detection and ranging (LiDAR) has been in the spotlight. The LiDAR is a device that obtains information on near distances using a laser. The LiDAR has excellent precision and resolution and is able to recognize objects in three dimensions, so it has been applied to various fields, such as vehicles, drones, and aircrafts.

In the meantime, reducing power consumption of devices, such as autonomous vehicles, at which LiDAR devices are disposed may be considered an important issue in autonomous vehicles realized as electric vehicles. Even when a smart infrastructure, such as an unmanned system, is built using a LiDAR device, reducing the power consumed in the LiDAR device may be considered an important issue.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a vehicle that drives utilizing data obtained from a LiDAR device equipped with a smart power management system.

In addition, the present disclosure is directed to providing a LiDAR device equipped with a smart power management system.

According to an embodiment, A vehicle comprises a vehicle body, a LiDAR (light detection and ranging) device configured to operate in a first operation mode and a second operation mode in which a power consumption per unit time is lower than a power consumption per unit time of the first operation mode and a controller, wherein the controller is configured to transmit a first trigger signal to the LiDAR device when a state of the vehicle is changed from a first state to a second state, transmit a second trigger signal to the LiDAR device when the state of the vehicle is changed from the second state to the first state, wherein the LiDAR device is configured to change an operation mode of the LiDAR device from the first operation mode to the second operation mode when the LiDAR device receives the first trigger signal, change the operation mode of the LiDAR device from the second operation mode to the first operation mode when the LiDAR device receives the second trigger signal.

According to an embodiment, A LiDAR (Light detection and ranging) device disposed on a first device, comprises an emitting unit configured to emit laser, a detecting unit configured to detect laser emitted from the emitting unit and a controller, wherein the controller is configured to operate the LiDAR device in a first operation mode and a second operation mode in which a power consumption per unit time is lower than a power consumption per unit time of the first operation mode and wherein the controller is configured to change an operation mode of the LiDAR device from the first operation mode to the second operation mode when the controller receives a first trigger signal from the first device, change the operation mode of the LiDAR device from the second operation mode to the first operation mode when the controller receives a second trigger signal from the first device.

According to an embodiment, A LiDAR (Light detection and ranging) device with a smart power management system comprises a emitting unit configured to emit laser, a detecting unit configured to detect laser emitted from the emitting unit and a controller configured to operate the LiDAR device in a first operation mode and a second operation mode in which a power consumption per unit time is lower than a power consumption per unit time of the first operation mode, wherein when the LiDAR device is operated in the first operation mode, a first sampling period for obtaining a first point data and a second sampling period for obtaining a second point data are sequential, wherein in the first sampling period a first emitter emits laser N times, and in the second sampling period a second emitter emits laser M times, wherein a first time interval is provided between the first sampling period and the second sampling period, wherein when the LiDAR device is operated in the second operation mode, a third sampling period for obtaining a third point data and a fourth sampling period for obtaining a fourth point data are sequential, wherein in the third sampling period the first emitter emits laser L times, and in the fourth sampling period a third emitter emits laser P times, wherein a second time interval is provided between the third sampling period and the fourth sampling period, wherein the second time interval is longer than the first time interval.

Technical solutions in the present disclosure may not be limited to the above, and other not-mentioned technical solutions will be clearly understandable to those skilled in the art from the present specification and the accompanying drawings.

According to an embodiment of the present disclosure, a vehicle that drives utilizing data obtained from a LiDAR device equipped with a smart power management system can be provided.

According to another embodiment of the present disclosure, a LiDAR device equipped with a smart power management system can be provided.

Effects of the present disclosure are not limited to the aforementioned effects, and other effects which are not described herein should be clearly understood by those skilled in the art from the present specification and the accompanying drawings.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 6 is a diagram illustrating a point cloud simply displayed on a 2D plane;

FIG. 7 is a diagram illustrating point data obtained from a LiDAR device according to an embodiment;

FIG. 8 is a diagram illustrating a point data set obtained from a LiDAR device;

DETAILED DESCRIPTION OF THE INVENTION

Figure 1:
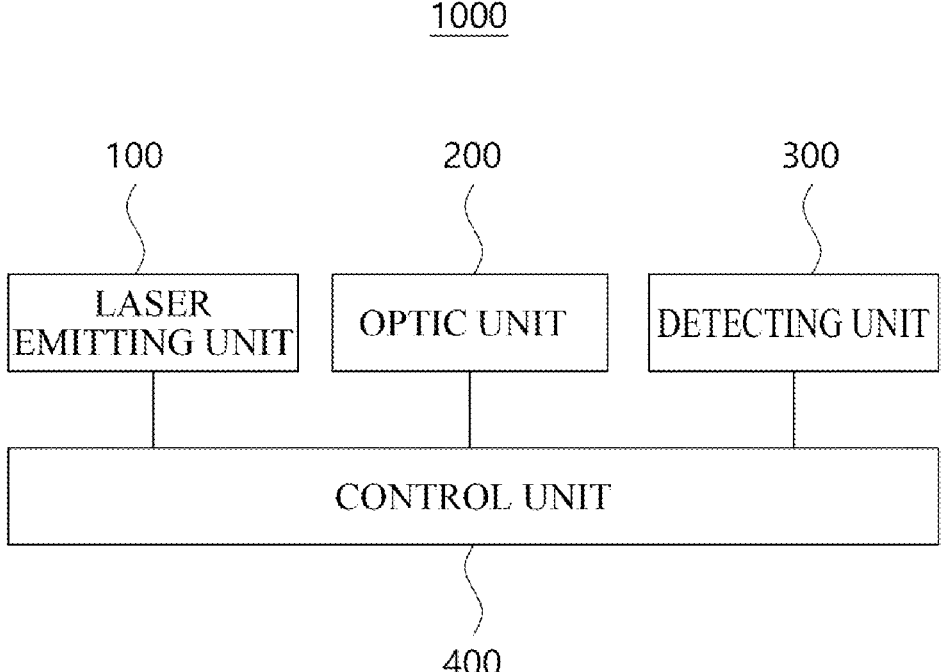
FIG. 1 is a diagram illustrating a LiDAR device according to an embodiment.

Embodiments described in the present specification are intended to clearly describe the scope of the present disclosure to those having ordinary skill in the art to which the present disclosure pertains, and do not limit the present disclosure. It should be understood that the present disclosure includes modifications or variations within the scope of the present disclosure.

The terms used in the present specification are selected from general terms, which are widely used currently, considering functions of elements in the present disclosure, and may have meanings varying according to the intention of those skilled in the art, the custom in the art, or the advent of new technology. If a specific term is used with a specific meaning, the meaning of the term will be described specifically. Accordingly, the terms used in the present specification should not be interpreted as simple names of the terms, but interpreted on the basis of the actual meanings of the terms and the whole context throughout the present specification.

The accompanying drawings of the present specification are to facilitate the description of the present disclosure and the shape in the drawings may be exaggerated to help understanding of the present disclosure, so the present disclosure is not limited to the drawings.

In the present specification, if it is determined that detailed descriptions of known configurations or functions related to the present disclosure make the gist of the present disclosure unclear, the detailed descriptions will be omitted when necessary.

According to an embodiment, there is provided A vehicle comprising: a vehicle body, a LiDAR (light detection and ranging) device configured to operate in a first operation mode and a second operation mode in which a power consumption per unit time is lower than a power consumption per unit time of the first operation mode and a controller, wherein the controller is configured to transmit a first trigger signal to the LiDAR device when a state of the vehicle is changed from a first state to a second state, transmit a second trigger signal to the LiDAR device when the state of the vehicle is changed from the second state to the first state, wherein the LiDAR device is configured to change an operation mode of the LiDAR device from the first operation mode to the second operation mode when the LiDAR device receives the first trigger signal, change the operation mode of the LiDAR device from the second operation mode to the first operation mode when the LiDAR device receives the second trigger signal.

Here, the first state is engine-on state and the second state is engine-off state.

Here, the first state is driving state and the second state is stop state.

Here, the first state is a state in which the driving speed of the vehicle exceeds a reference speed and the second state is a state in which the driving speed of the vehicle is less than the reference speed.

Here, a resolution of a first frame data obtained from the LiDAR device in the first operation mode is higher than the resolution of a second frame data obtained from the LiDAR device in the second operation mode.

Here, the controller is configure to: obtain a property for a first object based on a first frame data obtained from the LiDAR device when the LiDAR device operates in the first operation mode and obtain a distance value for a second object based on a second frame data obtained from the LiDAR device when the LiDAR device operates in the second operation mode.

Here, energy of laser emitted from the LIDAR device per unit time in the first operation mode is greater than energy of laser emitted from the LIDAR device per unit time in the second operation mode.

According to an embodiment, there is provided A LiDAR (Light detection and ranging) device disposed on a first device, comprising: an emitting unit configured to emit laser, a detecting unit configured to detect laser emitted from the emitting unit and a controller, wherein the controller is configured to operate the LiDAR device in a first operation mode and a second operation mode in which a power consumption per unit time is lower than a power consumption per unit time of the first operation mode and wherein the controller is configured to change an operation mode of the LiDAR device from the first operation mode to the second operation mode when the controller receives a first trigger signal from the first device, change the operation mode of the LiDAR device from the second operation mode to the first operation mode when the controller receives a second trigger signal from the first device.

According to an embodiment, there is provided A LiDAR (Light detection and ranging) device with a smart power management system comprising: a emitting unit configured to emit laser, a detecting unit configured to detect laser emitted from the emitting unit and a controller configured to operate the LiDAR device in a first operation mode and a second operation mode in which a power consumption per unit time is lower than a power consumption per unit time of the first operation mode, wherein when the LiDAR device is operated in the first operation mode, a first sampling period for obtaining a first point data and a second sampling period for obtaining a second point data are sequential, wherein in the first sampling period a first emitter emits laser N times, and in the second sampling period a second emitter emits laser M times, wherein a first time interval is provided between the first sampling period and the second sampling period, wherein when the LiDAR device is operated in the second operation mode, a third sampling period for obtaining a third point data and a fourth sampling period for obtaining a fourth point data are sequential, wherein in the third sampling period the first emitter emits laser L times, and in the fourth sampling period a third emitter emits laser P times, wherein a second time interval is provided between the third sampling period and the fourth sampling period, wherein the second time interval is longer than the first time interval.

Here, the N,M,L,P is the same.

Here, in the first to fourth sampling periods, a repetition of laser emitted from the emitting unit is the same.

Here, the third emitter is the same as the second emitter.

Here, the third emitter is different from the second emitter.

Here, an angular resolution between the first point data and the second point data is different from an angular resolution between the third point data and the fourth point data.

Here, an angle value of the angular resolution between the third point data and the fourth point data is greater an angle value of the angular resolution between the first point data and the second point data.

Here, the controller is configured to: obtain a first frame data including the first point data and the second point data when the LiDAR device is operated in the first operation mode, obtain a second frame data including the third point data and the fourth point data when the LiDAR device is operated in the second operation mode, wherein a resolution of the second frame data is lower than a resolution of the first frame data.

Here, the controller is configured to: obtain a first frame data including the first point data and the second point data when the LiDAR device is operated in the first operation mode, obtain a second frame data including the third point data and the fourth point data when the LiDAR device is operated in the second operation mode, wherein a number of point data included in the second frame data is less than a number of point data included in the first frame data.

Here, the controller is configured to: obtain a first frame data including the first point data and the second point data when the LiDAR device is operated in the first operation mode, obtain a second frame data including the third point data and the fourth point data when the LiDAR device is operated in the second operation mode, wherein a length of time for obtaining the second frame data is longer than the length of time for obtaining the first frame data.

Here, the emitting unit is provided in the form of an array including at least two or more emitters, and wherein the detecting unit is provided in the form of an array including at least two or more detectors.

Here, when the first emitter is activated, a first group of emitters including the first emitter is activated, wherein when the second emitter is activated, a second group of emitters including the second emitter is activated, and wherein when the third emitter is activated, a third group of emitters including the third emitter is activated.

Here, the third group of emitters is the same as the second group of emitters.

Various embodiments of elements of the LiDAR device will be described in detail below.

FIG. 1 is a diagram illustrating a LiDAR device according to an embodiment.

Referring to FIG. 1, a LiDAR device 1000 according to an embodiment may include a emitting unit 100.

In this case, the emitting unit 100 according to an embodiment may emit a laser beam.

Also, the emitting unit 100 may include one or more laser emitting elements. For example, the emitting unit 100 may include a single laser emitting element and may include a plurality of laser emitting elements. Also, when the emitting unit 100 includes a plurality of laser emitting elements, the plurality of laser emitting elements may constitute one array.

Also, the emitting unit 100 may include a laser diode (LD), a solid-state laser, a high power laser, a light-emitting diode (LED), a vertical-cavity surface-emitting laser (VC-SEL), an external cavity diode laser (ECDL), and the like, but the present disclosure is not limited thereto.

Also, the emitting unit 100 may output a laser beam of a certain wavelength. For example, the emitting unit 100 may output a laser beam with a wavelength of 905 nm or a laser beam with a wavelength of 1550 nm. Also, for example, the emitting unit 100 may output a laser beam with a wavelength of 940 nm. Also, for example, the emitting unit 100 may output a laser beam with a plurality of wavelengths ranging between 800 nm and 1000 nm. Also, when the emitting unit 100 includes a plurality of laser emitting elements, some of the plurality of laser emitting elements may output a laser beam with a wavelength of 905 nm, and the others may output a laser beam with a wavelength of 1500 nm.

Referring to FIG. 1 again, the LiDAR device 1000 according to an embodiment may include an optic unit 200.

Herein, the optic unit may be variously expressed as a steering unit, a scanning unit, etc., but the present disclosure is not limited thereto.

In this case, the optic unit 200 according to an embodiment may change a flight path of a laser beam. For example, the optic unit 200 may change a flight path of a laser beam such that a laser beam emitted from the emitting unit 100 is directed to a scanning region. Also, for example, the optic unit 200 may change a flight path of laser beam such that a laser beam reflected by an object located in the scanning region is directed to a detecting unit.

In this case, the optic unit 200 according to an embodiment may change a flight path of laser beam by reflecting a laser beam. For example, the optic unit 200 may change flight path of a laser beam by reflecting a laser beam emitted from the emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to reflect laser beams. For example, the optic unit 200 may include a mirror, a resonance scanner, a micro-electromechanical system (MEMS) mirror, a voice coil motor (VCM), a polygonal mirror, a rotating mirror, or a galvano mirror, and the like, but the present disclosure is not limited thereto.

Also, the optic unit 200 according to an embodiment may change a flight path of laser beam by refracting laser beams. For example, the optic unit 200 may change a flight path of laser beam by refracting a laser beam emitted from the emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to refract laser beams. For example, the optic unit 200 may include lenses, prisms, microlenses, or microfluidic lenses, but the present disclosure is not limited thereto.

Also, the optic unit 200 according to an embodiment may change a flight path of laser beam by changing the phase of a laser beam. For example, the optic unit 200 may change a flight path of laser beam by changing the phase of a laser beam emitted from the emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to change the phase of a laser beam. For example, the optic unit 200 may include an optical phased array (OPA), a metalens, a metasurface, or the like, but the present disclosure is not limited thereto.

Also, the optic unit 200 according to an embodiment may include one or more optic means. Also, for example, the optic unit 200 may include a plurality of optic means.

Referring to FIG. 1 again, the LiDAR device 1000 according to an embodiment may include a detecting unit 300.

Herein, the detecting unit may be variously expressed as a light receiving unit, a sensor unit, etc., but the present disclosure is not limited thereto.

In this case, the detecting unit 300 according to an embodiment may detect laser beams. For example, the detecting unit may detect a laser beam reflected by an object located in the scanning region.

Also, the detecting unit 300 according to an embodiment may receive a laser beam and generate an electric signal based on the received laser beam. For example, the detecting unit 300 may detect a laser beam reflected by an object located in the scanning region and generate an electric signal based on the received laser beam. Also, for example, the detecting unit 300 may receive a laser beam reflected by an object located in the scanning region through one or more optical means and generate an electric signal based on the received laser beam. Also, for example, the detecting unit 300 may receive a laser beam reflected by an object located in the scanning region through an optical filter and generate an electric signal based on the received laser beam.

Also, the detecting unit 300 according to an embodiment may detect the laser beam based on the generated electric signal. For example, the detecting unit 300 may detect the laser beam by comparing the magnitude of the generated electric signal to a predetermined threshold, but the present disclosure is not limited thereto. Also, for example, the detecting unit 300 may detect the laser beam by comparing the rising edge, falling edge, or the median of the rising edge and the falling edge of the generated electric signal to a predetermined threshold, but the present disclosure is not limited thereto. Also, for example, the detecting unit 300 may detect the laser beam by comparing the peak value of the generated electric signal to a predetermined threshold, but the present disclosure is not limited thereto.

Also, the detecting unit 300 according to an embodiment may include various detecting elements. For example, the detecting unit 300 may include a PN photodiode, a phototransistor, a PIN photodiode, an avalanche photodiode (APD), a single-photon avalanche diode (SPAD), silicon photomultipliers (SiPM), a time-to-digital converter (TDC), a comparator, a complementary metal-oxide-semiconductor (CMOS), a charge-coupled device (CCD), or the like, but the present disclosure is not limited thereto.

For example, the detecting unit 300 may be a two-dimensional (2D) SPAD array, but the present disclosure is not limited thereto. Also, for example, the SPAD array may include a plurality of SPAD units, and each SPAD unit may include a plurality of SPAD pixels.

In this case, the detecting unit 300 may generate a histogram by accumulating a plurality of data sets based on output signals of the detecting elements N times using the 2D SPAD array. For example, the detecting unit 300 may use the histogram to detect a reception time point of a laser beam that is reflected by an object and received.

For example, the detecting unit 300 may use the histogram to determine the peak time point of the histogram as the reception time point at which the laser beam reflected by the object is received, but the present disclosure is not limited thereto. Also, for example, the detecting unit 300 may use the histogram to determine a time point at which the histogram is greater than or equal to a predetermined value as the reception time point at which the laser beam reflected by the object is received, but the present disclosure is not limited thereto.

Also, the detecting unit 300 according to an embodiment may include one or more detecting elements. For example, the detecting unit 300 may include a single detecting element and may also include a plurality of detecting elements.

Also, the detecting unit 300 according to an embodiment may include one or more optical elements. For example, the detecting unit 300 may include an aperture, a microlens, a converging lens, a diffuser, or the like, but the present disclosure is not limited thereto.

Also, the detecting unit 300 according to an embodiment may include one or more optical filters. The detecting unit 300 may detect a laser beam reflected by an object through an optical filter. For example, the detecting unit 300 may include a band-pass filter, a dichroic filter, a guided-mode resonance filter, a polarizer, a wedge filter, or the like, but the present disclosure is not limited thereto.

Referring to FIG. 1 again, the LiDAR device 1000 according to an embodiment may include a processor 400.

Herein, the processor may be variously expressed as a processor or the like, but the present disclosure is not limited thereto.

In this case, the processor 400 according to an embodiment may control the operation of the emitting unit 100, the optic unit 200, or the detecting unit 300.

Also, the processor 400 according to an embodiment may control the operation of the emitting unit 100.

For example, the processor 400 may control an emission time point of a laser emitting from the emitting unit 100. Also, the processor 400 may control the power of the laser emitting from the emitting unit 100. Also, the processor 400 may control the pulse width of the laser emitting from the emitting unit 100. Also, the processor 400 may control the cycle of the laser emitting from the emitting unit 100. Also, when the emitting unit 100 includes a plurality of laser emitting elements, the processor 400 may control the emitting unit 100 to operate some of the plurality of laser emitting elements.

Also, the processor 400 according to an embodiment may control the operation of the optic unit 200.

For example, the processor 400 may control the operating speed of the optic unit 200. In detail, the optic unit 200 may control the rotational speed of a rotating mirror when including the rotating mirror and may control the repetition cycle of a MEMS mirror when including the MEMS mirror, but the present disclosure is not limited thereto.

Also, for example, the processor 400 may control the operation status of the optic unit 200. In detail, the optic unit 200 may control the operation angle of a MEMS mirror when including the MEMS mirror, but the present disclosure is not limited thereto.

Also, the processor 400 according to an embodiment may control the operation of the detecting unit 300.

For example, the processor 400 may control the sensitivity of the detecting unit 300. In detail, the processor 400 may control the sensitivity of the detecting unit 300 by adjusting a predetermined threshold, but the present disclosure is not limited thereto.

Also, for example, the processor 400 may control the operation of the detecting unit 300. In detail, the processor 400 may control the turn-on and -off of the detecting unit 300, and when including a plurality of detecting elements, the processor 400 may control the operation of the detecting unit 300 to operate some of the plurality of detecting elements.

Also, the processor 400 according to an embodiment may determine a distance from the LiDAR device 1000 to an object located in a scanning region based on a laser beam detected by the detecting unit 300.

For example, the processor 400 may determine the distance to the object located in the scanning region based on a time point at which the laser beam is emitted from the emitting unit 100 and a time point at which the laser beam is detected by the detecting unit 300. Also, for example, the processor 400 may determine the distance to the object located in the scanning region based on a time point at which a laser beam emitted from the laser beam is detected by the detecting unit 300 immediately without reaching the object and a time point at which a laser beam reflected by the object is sensed by the detecting unit 300.

There may be a difference between a time point at which the LiDAR device 1000 transmits a trigger signal for emitting a laser beam using a processor 400 and an actual emission time point, which is a time when the laser beam is actually emitted from a laser emitting element. Actually, no laser beam is emitted in a period between the time point of the trigger signal and the actual emission time point. Thus, when the period is included in the ToF of the laser beam, precision may be decreased.

The actual emission time point of the laser beam may be used to improve the precision of the measurement of the TOF of the laser beam. However, it may be difficult to determine the actual emission time point of the laser beam. Therefore, a laser beam should be detected to the detecting unit 300 as soon as or immediately after the laser beam is emitted from a laser emitting element without reaching an object.

For example, an optic may be disposed on an upper portion of the laser emitting element, and thus the optic may enable a laser beam emitted from the laser emitting element to be detected by the detecting unit 300 directly without reaching an object. The optic may be a mirror, a lens, a prism, a metasurface, or the like, but the present disclosure is not limited thereto. The optic may include one optic or a plurality of optics.

Also, for example, the detecting unit 300 may be disposed on an upper portion of the laser emitting element, and thus a laser beam emitted from the laser emitting element may be detected by the detecting unit 300 directly without reaching an object. The detecting unit 300 may be spaced a distance of 1 mm, 1 μm, 1 nm, or the like from the laser emitting element, but the present disclosure is not limited thereto. Alternatively, the detecting unit 300 may be adjacent to the laser emitting element with no interval therebetween. An optic may be present between the detecting unit 300 and the laser emitting element, but the present disclosure is not limited thereto.

In detail, the emitting unit 100 may emit a laser beam, and the processor 400 may acquire a time point at which the laser beam is emitted from the emitting unit 100. When the laser beam emitted from the emitting unit 100 is reflected by an object located in the scanning region, the detecting unit 300 may detect a laser beam reflected by the object, and the processor 400 may acquire a time point at which the laser beam is detected by the detecting unit 300 and may determine a distance to the object located in the scan region based on the emission time point and the detection time point of the laser beam.

Also, in detail, the laser beam may be emitted from the emitting unit 100, and the laser beam emitted from the emitting unit 100 may be detected by the detecting unit 300 directly without reaching the object located in the scanning region. In this case, the processor 400 may acquire a time point at which the laser beam is detected without reaching the object. When the laser beam emitted from the emitting unit 100 is reflected by the object located in the scanning region, the detecting unit 300 may detect the laser beam reflected by the object, and the processor 400 may acquire the time point at which the laser beam is detected by the detecting unit 300. In this case, the processor 400 may determine the distance to the object located in the scanning region based on the detection time point of the laser beam that does not reach the object and the detection time point of the laser beam that is reflected by the object.

Figure 2:
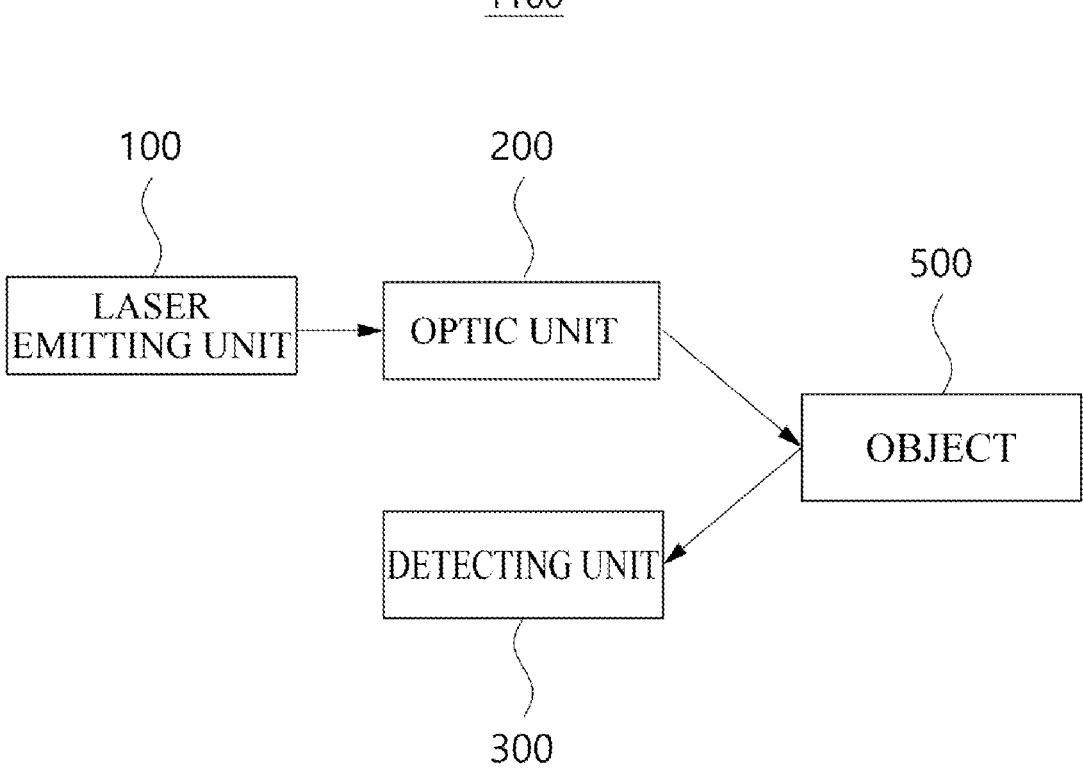
FIG. 2 is a diagram illustrating a LiDAR device according to an embodiment.

FIG. 2 is a diagram showing a LiDAR device according to an embodiment.

Referring to FIG. 2, a LiDAR device 1100 according to an embodiment may include a emitting unit 100, an optic unit 200, and a detecting unit 300.

The emitting unit 100, the optic unit 200, and the detecting unit 300 have been described with reference to FIG. 1, and thus a detailed description thereof will be omitted.

A laser beam emitted from the emitting unit 100 may pass through the optic unit 200. In addition, the laser beam passing through the optic unit 200 may be irradiated toward an object 500. Further, the laser beam reflected from the object 500 may be received by the detecting unit 300.

Figure 3:
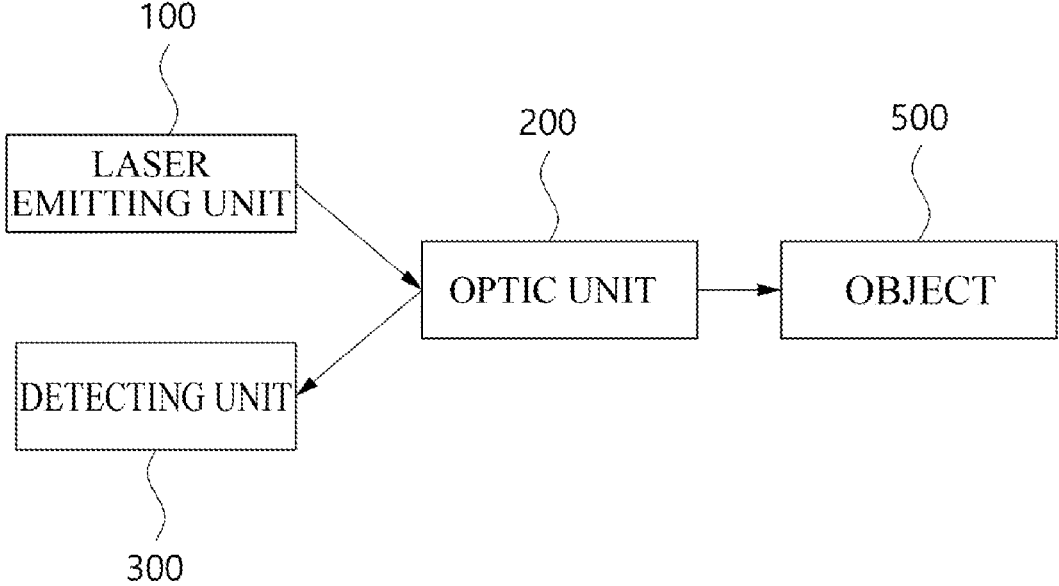
FIG. 3 is a diagram illustrating a LiDAR device according to another embodiment.

FIG. 3 is a diagram illustrating a LiDAR device according to another embodiment.

Referring to FIG. 3, a LiDAR device 1150 according to another embodiment may include a emitting unit 100, an optic unit 200, and a detecting unit 300.

The emitting unit 100, the optic unit 200, and the detecting unit 300 have been described with reference to FIG. 1, and thus a detailed descriptions thereof will be omitted.

A laser beam emitted from the emitting unit 100 may pass through the optic unit 200. In addition, the laser beam passing through the optic unit 200 may be irradiated toward an object 500. In addition, the laser beam reflected from the object 500 may pass through the optic unit 200 again.

At this point, the optic unit, through which the laser beam before being irradiated to the object has passed, and the optic unit, through which the laser beam that is reflected from the object has passed, may be physically the same optic unit, but may be physically different optic units.

The laser beam passing through the optic unit 200 may be received by the detecting unit 300.

Hereinafter, various embodiments of a emitting unit including a vertical-cavity-surface-emitting laser (VCSEL) will be described in detail.

FIGS. 4A to 4D are diagrams illustrating various embodiments of a LiDAR device.

Figure 4A:
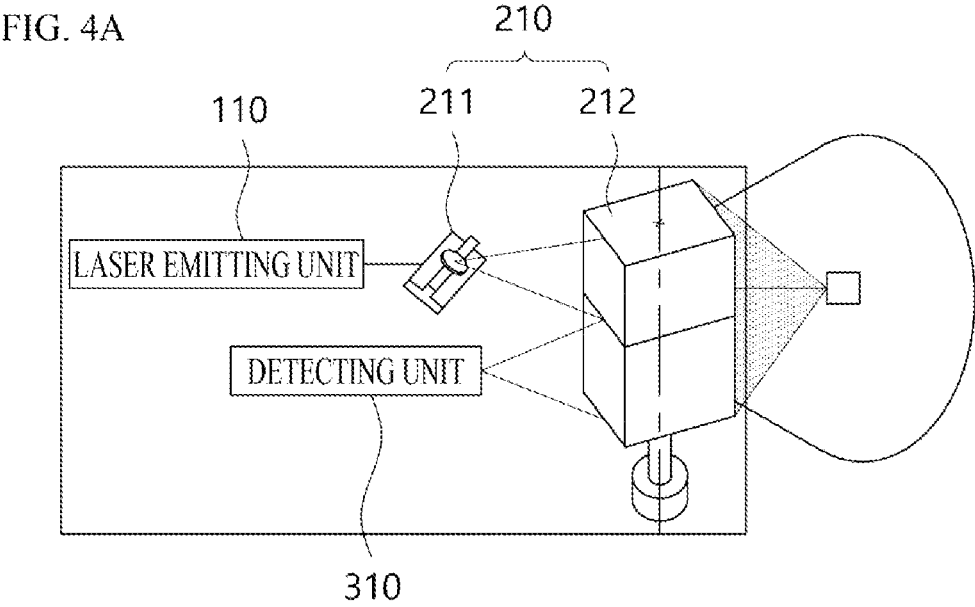
FIGS. 4A to 4D are diagrams illustrating various embodiments of a LiDAR device.

Referring to FIG. 4A, a LiDAR device according to an embodiment may include a emitting unit 110, an optic unit 210, and a detecting unit 310. The optic unit 210 may include a nodding mirror 211 and a polygonal mirror 212 described above, but no limitation thereto is imposed.

Herein, the above-described details may be applied to the emitting unit 110, the optic unit 210, and the detecting unit 310, so a redundant description will be omitted. FIG. 4A is a simple diagram of one of various embodiments of the LiDAR device, and various embodiments of the LiDAR device are not limited to that shown in FIG. 4A.

Figure 4B:
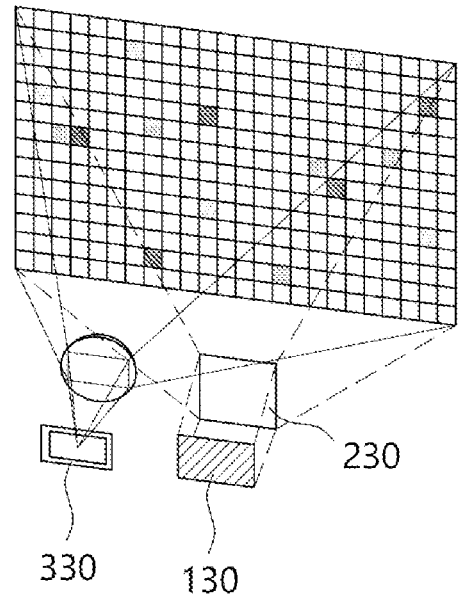

In addition, referring to FIG. 4B, a LiDAR device according to an embodiment may include a emitting unit 120, an optic unit 220, and a detecting unit 320. The optic unit 220 may include at least one lens capable of collimating and steering a laser emitted from the emitting unit 120, but no limitation thereto is imposed.

Herein, the above-described details may be applied to the emitting unit 120, the optic unit 220, and the detecting unit 320, so a redundant description will be omitted. FIG. 4B is a simple diagram of one of various embodiments of the LiDAR device, and various embodiments of the LiDAR device are not limited to that shown in FIG. 4B.

Figure 4C:
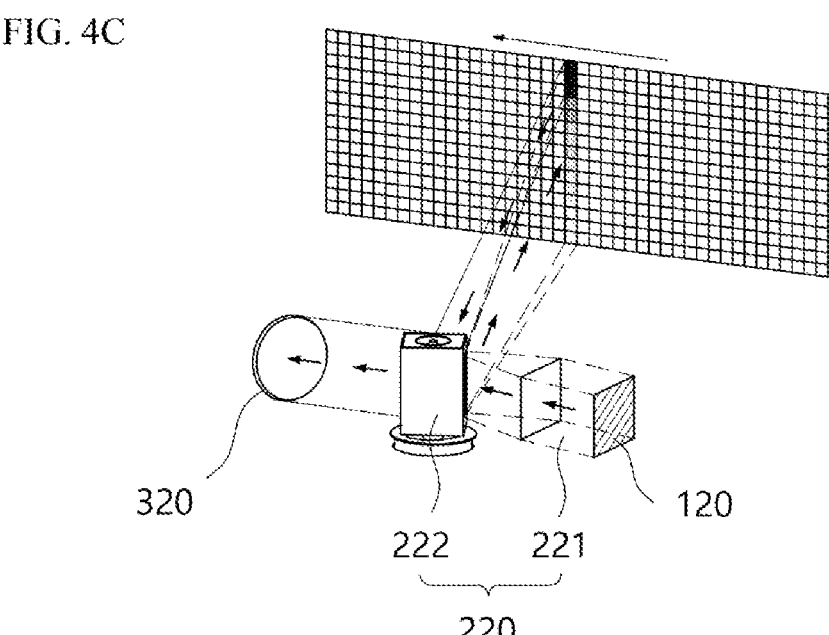

In addition, referring to FIG. 4C, a LiDAR device according to an embodiment may include a emitting unit 130, an optic unit 230, and a detecting unit 330. The optic unit 230 may include at least one lens capable of collimating and steering a laser emitted from the emitting unit 130, but no limitation thereto is imposed.

Herein, the above-described details may be applied to the emitting unit 130, the optic unit 230, and the detecting unit 330, so a redundant description will be omitted. FIG. 4C is a simple diagram of one of various embodiments of the LiDAR device, and various embodiments of the LiDAR device are not limited to that shown in FIG. 4C.

Figure 4D:
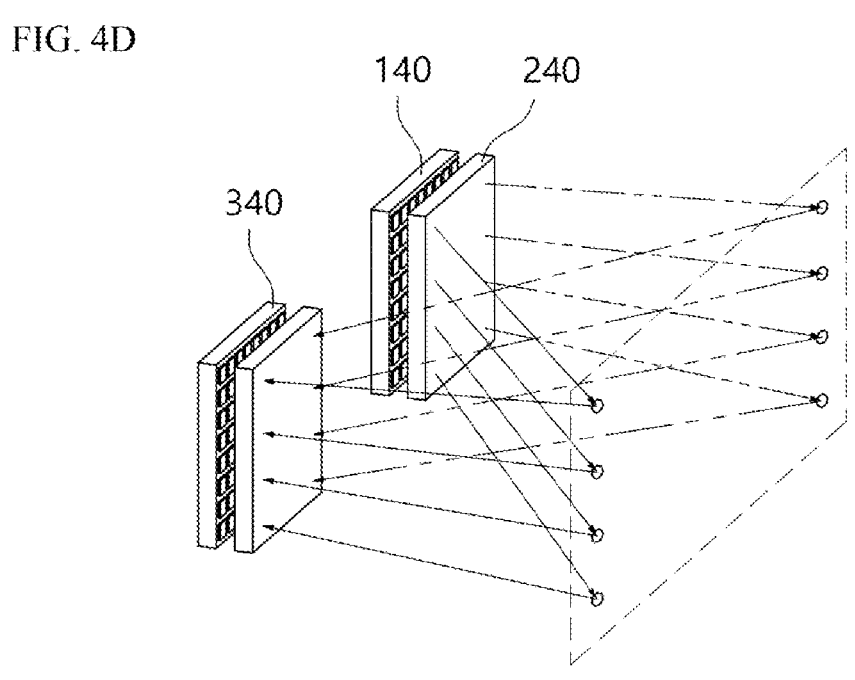

In addition, referring to FIG. 4D, a LiDAR device according to an embodiment may include a emitting unit 140, an optic unit 240, and a detecting unit 340. The optic unit 240 may include at least one lens capable of collimating and steering a laser emitted from the emitting unit 140, but no limitation thereto is imposed.

Herein, the above-described details may be applied to the emitting unit 140, the optic unit 240, and the detecting unit 340, so a redundant description will be omitted. FIG. 4D is a simple diagram of one of various embodiments of the LiDAR device, and various embodiments of the LiDAR device are not limited to that shown in FIG. 4D.

A LiDAR device according to an embodiment may generate a point data set on the basis of light received from the outside. Herein, the point data set may mean data including at least one piece of information on an external object, on the basis of an electrical signal generated by receiving at least a portion of light scattered from the external object. For example, the point data set may be a group of data including location information and intensity information of multiple detection points where light is scattered, but is not limited thereto.

Figure 5:
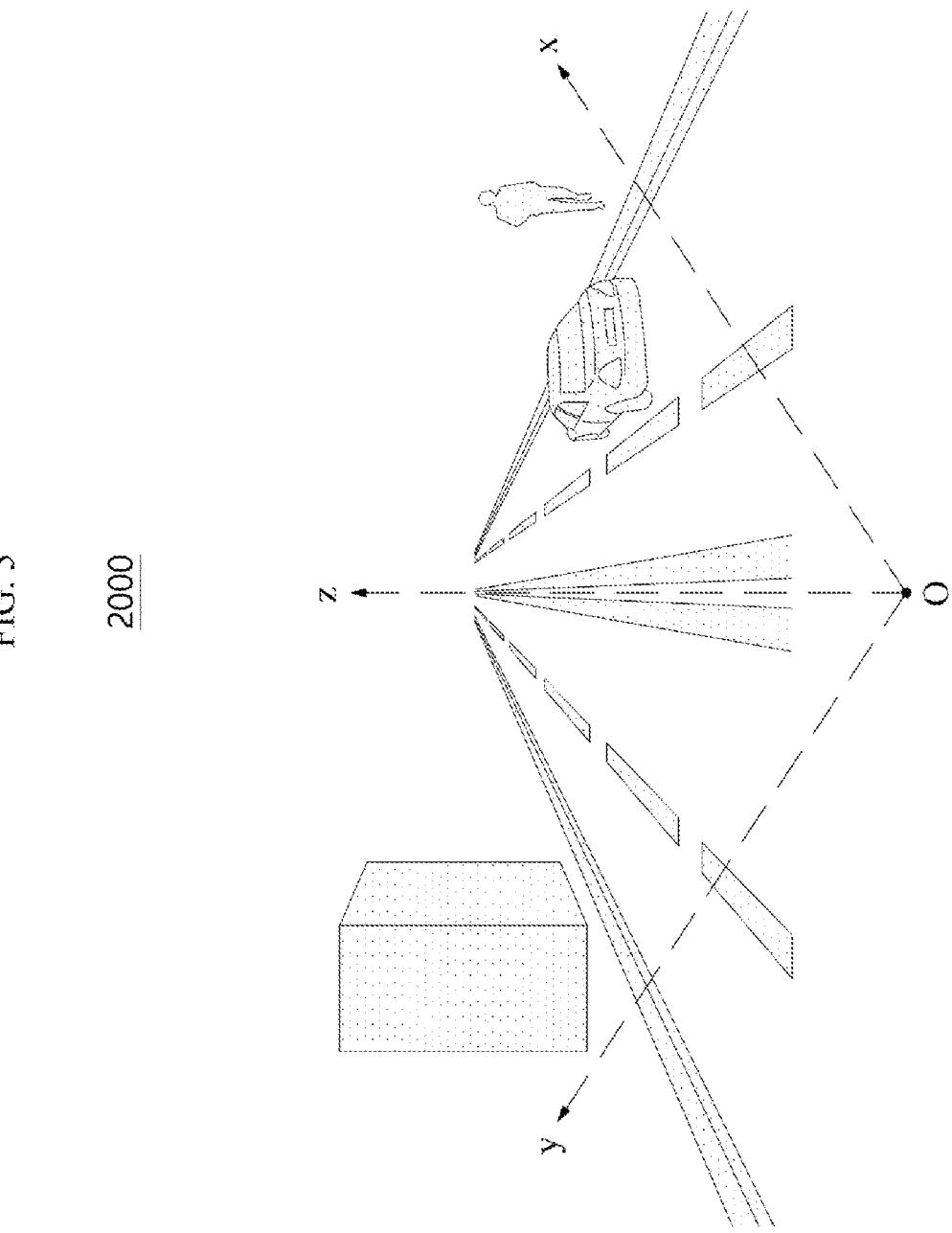
FIG. 5 is a diagram illustrating data displayed on a 3D map, the data being obtained by a LiDAR device.

FIG. 5 is a diagram illustrating data displayed on a 3D map, the data being obtained by a LiDAR device.

Referring to FIG. 5, the control unit of a LiDAR device may form a 3D point cloud image for a point data set on the basis of a detection signal obtained. In addition, the location of the origin O of the 3D point cloud image may correspond to the optical origin of the LiDAR device, but without being limited thereto, may correspond to the location of the center of gravity of the LiDAR device or to the location of the center of gravity of the vehicle at which the LiDAR device is disposed.

FIG. 6 is a diagram illustrating a point cloud simply displayed on a 2D plane.

Referring to FIG. 6, point cloud data 2000 may be represented on a 2D plane.

In addition, the point cloud data is represented on the 2D plane in the present specification, but may be for simply representing data on a 3D map in practice.

In addition, the point cloud data 2000 may be represented in the form of a data sheet. Multiple pieces of information included in the point cloud data 2000 may be represented as values on the data sheet.

Hereinafter, the meaning of various forms of data included in the point cloud data and sensor data will be described in detail.

FIG. 7 is a diagram illustrating point data obtained from a LiDAR device according to an embodiment.

Referring to FIG. 7, the point cloud data 2000 may include point data 2001. Herein, the point data mean data that may be primarily obtained as the LiDAR device detects an object. In addition, the point data may mean raw data that may be unprocessed initial information obtained from the LiDAR device.

In addition, the point data 2001 may be obtained as the LiDAR device scans at least a portion of an object, and the point data 2001 may include position coordinates (x, y, z).

In addition, according to an embodiment, the point data 2001 may further include an intensity value I.

In addition, the number of pieces of the point data 2001 may correspond to the number of lasers that are emitted from the LiDAR device, scattered from an object, and received by the LiDAR device.

More specifically, in a case which a laser emitted from the LiDAR device is scattered from at least a portion of the object and received by the LiDAR device, each time the laser is received, the LiDAR device processes a signal corresponding to the received laser and generates the point data 2001.

FIG. 8 is a diagram illustrating a point data set obtained from a LiDAR device.

Referring to FIG. 8, point cloud data 2000 may be composed of a point data set 2100. Herein, the point data set 2100 may mean one data set constituting the point cloud data 2000, but without being limited thereto, may mean multiple data sets. In addition, according to an embodiment, the point data set 2100 and the point cloud data 2000 may be used with the same meaning.

In addition, the point data set 2100 may mean multiple pieces of point data that are generated as the LiDAR device scans a scan area one time. For example, in a case in which the horizontal viewing angle of the LiDAR device is a 180 degree angle, the point data set 2100 may mean all point data obtained as the LiDAR device performs scanning at a 180 degree angle one time.

In addition, the point data set 2100 may include position coordinates (x, y, z) and an intensity value I of an object included in the viewing angle of the LiDAR device. In addition, position coordinates (x, y, z) and an intensity value I of the point data 2001 included in the point data set 2100 may be represented on a data sheet.

In addition, the point data set 2100 may include noise data. The noise data may be generated by an external environment regardless of an object located within the viewing angle of the LiDAR device. For example, the noise data may include a noise caused by inter-LiDAR interference, a noise caused by ambient light such as sunlight, and a noise caused by an object out of a measurable distance, but is not limited thereto.

In addition, the point data set 2100 may include background information. The background information may mean at least one piece of point data not related to an object, among multiple pieces of point data included in the point data set 2100. In addition, the background information may be pre-stored in an autonomous driving system including the LiDAR device. For example, the background information may include information on a static object (or a fixed object of which the location is fixed), such as a building, and the background information may be pre-stored in the form of a map in the LiDAR device.

Referring back to FIG. 8, the point cloud data 2000 may include a sub point data set 2110. Herein, the sub point data set 2110 may mean multiple pieces of point data 2001 representing the same object. For example, when the point data set 2100 includes multiple pieces of point data representing a person (HUMAN), the multiple pieces of point data constitute one sub point data set 2110.

In addition, the sub point data set 2110 may be included in the point data set 2100. In addition, the sub point data set 2110 may represent at least one object or at least a portion of one object included in the point data set 2100. More specifically, the sub point data set 2110 may mean multiple pieces of point data representing a first object, among multiple pieces of point data included in the point data set 2100.

In addition, the sub point data set 2110 may be obtained through clustering of at least one piece of point data related to a dynamic object, among multiple pieces of point data included in the point data set 2100. More specifically, after a static object and a dynamic object (or movable object) included in the point data set 2100 are detected utilizing the background information, data related to one object are grouped into a predetermined cluster, thereby obtaining the sub point data set 2110.

In addition, the sub point data set 2110 may be generated using machine learning. For example, the control unit of the LiDAR device may determine, on the basis of machine learning trained for various objects, at least some of multiple pieces of data included in the point cloud data 2000 represent the same object.

In addition, the sub point data set 2110 may be generated by segmenting the point data set 2100. Herein, the control unit of the LiDAR device may segment the point data set 2100 into particular segment units. In addition, at least one segment unit of the segmented point data set may represent at least a portion of a first object included in the point data set 2100. In addition, multiple segment units representing the first object may correspond to the sub point data set 2110.

Figure 9:
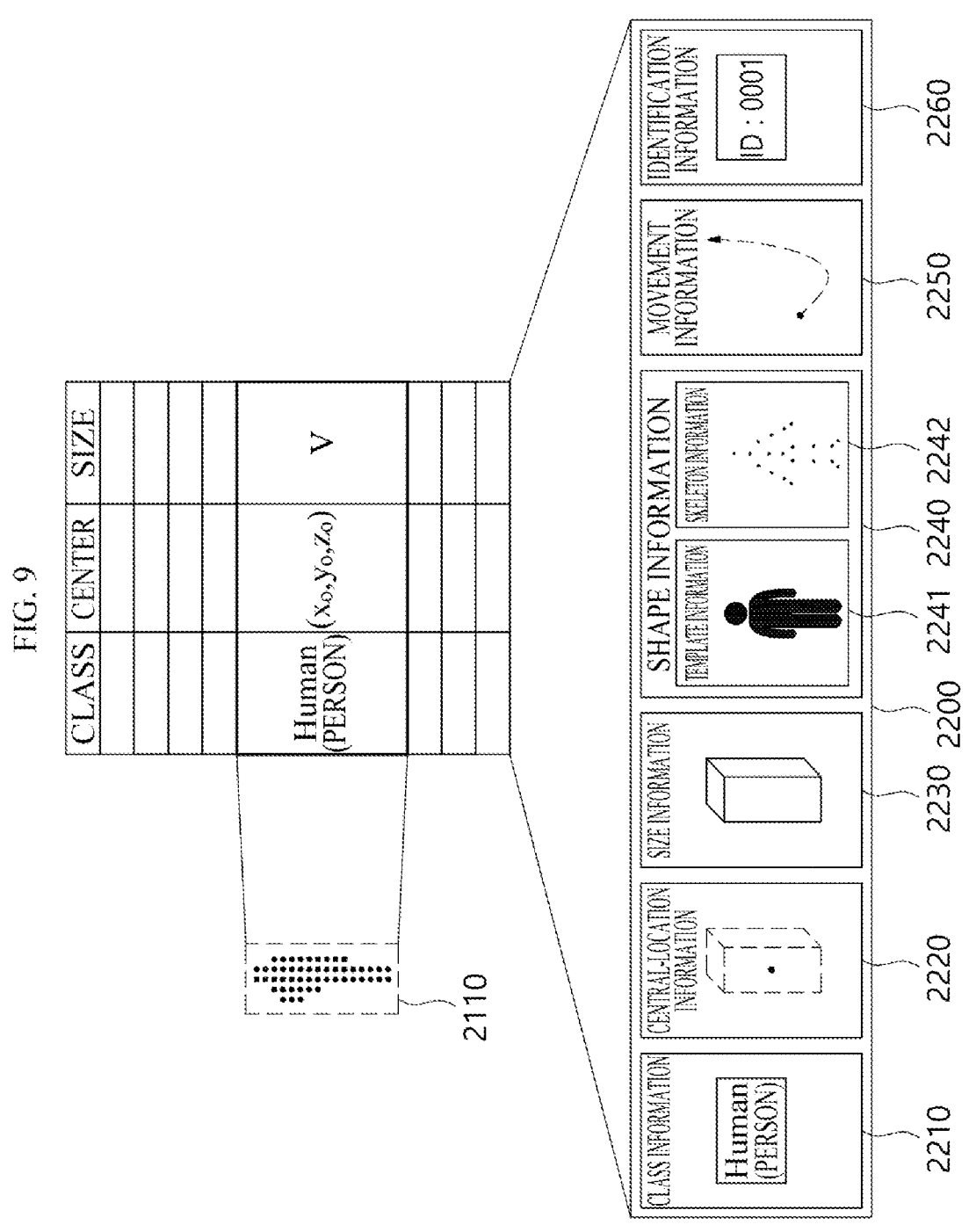
FIG. 9 is a diagram illustrating multiple pieces of information included in a property according to an embodiment.

FIG. 9 is a diagram illustrating multiple pieces of information included in a property according to an embodiment.

Referring to FIG. 9, the LiDAR device may include a property 2200. For example, the property 2200 may include class information 2210, central-location information 2220, size information 2230, shape information 2240, movement information 2250, and identification information 2260 of an object that the sub point data set 2110 represents, but is not limited thereto.

Herein, the property 2200 may be determined on the basis of at least one sub point data set 2110. More specifically, the property 2200 may include information on various properties of the object, such as the type, size, speed, and direction of the object that the at least one sub point data set 2110 represents. In addition, the property 2200 may be data resulting from processing at least a portion of the at least one sub point data set 2110.

In addition, a process of generating the property 2200 from the sub point data set 2110 included in the point data set 2100 may use a Point Cloud Library (PCL) library algorithm.

For example, a first process related to generating of the property 2200 by using the PCL algorithm may include: preprocessing a point data set; removing background information; detecting feature points (feature/keypoint detection); defining a descriptor; matching the feature points; and estimating properties of the object. However, no limitation thereto is imposed.

Herein, the preprocessing of the point data set may mean processing a point data set into a form appropriate for a PCL algorithm. In the first process, point data that is included in the point data set 2100, but is not related to extraction of properties of an object may be removed. For example, the preprocessing of the data may include: removing noise data included in the point data set 2100; and resampling multiple pieces of point data included in the point data set 2100. However, no limitation thereto is imposed.

In addition, through the removing of the background information, in the first process, the background information included in the point data set 2100 is removed, so that a sub point data set 2110 related to an object may be extracted.

In addition, through the detecting of the feature points, in the first process, the feature points representing the shape feature of the object well may be detected among multiple pieces of point data included in the sub point data set 2110 related to the object remaining after removal of the background information.

In addition, through the defining of the descriptor, for the feature points detected in the first process, a descriptor capable of describing the unique characteristics of the feature points may be defined.

In addition, through the matching of the feature points, in the first process, the descriptor of the feature points of the sub point data set 2110 is compared with a descriptor of feature points included in pre-stored template data related to the object, so that the corresponding feature points may be selected.

In addition, through the estimating of the properties of the object, in the first process, the object that the sub point data set 2110 represents may be detected using a geometric relationship of the feature points selected, and the property 2200 may be generated.

As another example, a second process related to generating of the property 2200 may include: preprocessing data; detecting data about an object; clustering the data about the object; classifying cluster data; and tracking the object. However, no limitation thereto is imposed.

Herein, through the detecting of the data about the object, in the second process, multiple pieces of point data representing an object may be extracted by utilizing pre-stored background data, among multiple pieces of point data included in the point data set 2100.

In addition, through the clustering of the data about the object, in the second process, a sub point data set 2110 may be extracted by clustering at least one piece of point data representing one object, among multiple pieces of point data.

In addition, through the classifying of the cluster data, in the second process, class information of the sub point data set 2110 may be classified or determined using a machine learning model or deep learning model trained in advance.

In addition, through the tracking of the object, in the second process, the property 2200 may be generated on the basis of the sub point data set 2110. For example, the controller performing the second process may display the location of the object with central position coordinates and volumes of multiple sub point data sets 2110. Accordingly, a correspondence relationship is defined on the basis of the distance and information on shape similarity between multiple sub point data sets obtained from consecutive frames and the object is tracked, so that the movement direction and speed of the object may be estimated.

Figure 10:
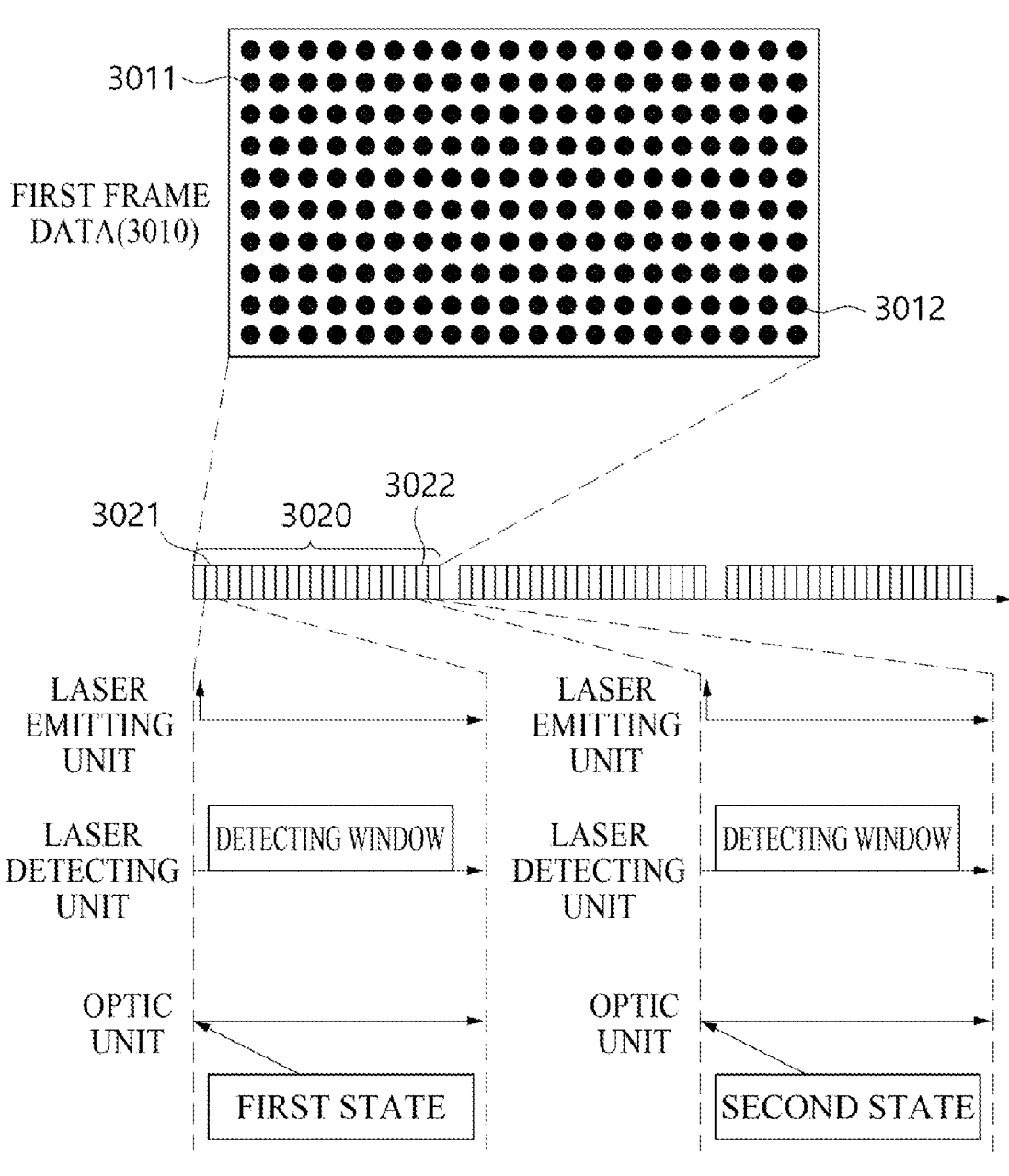
FIG. 10 is a diagram illustrating running of a LiDAR device according to an embodiment.

FIG. 10 is a diagram illustrating running of a LiDAR device according to an embodiment.

The details described with reference to FIG. 10 may be applied to a LiDAR device, in particular, a LiDAR device of which an optic unit includes a scanning mirror, such as a nodding mirror and a rotating mirror. However, no limitation thereto is imposed, and the details described below may be applied to LiDAR devices of various applicable structures.

Referring to FIG. 10, the LiDAR device according to the embodiment may obtain point data corresponding to at least one piece of frame data.

Herein, the frame data may mean one of the following: a data set constituting one screen; a point data set obtained for a predetermined time; a point data set prescribed in a predetermined format; a point cloud obtained for a predetermined time; a point cloud prescribed in a predetermined format; a point data set used for at least one data processing algorithm; and a point cloud used for at least one data processing algorithm. However, no limitation thereto is imposed, and the frame data may correspond to various concepts that can be understood as frame data by a person skilled in the art.

The at least one piece of frame data may include first frame data 3010.

Herein, the first frame data 3010 shown in FIG. 10 is simply represented as a 2D image for convenience of description, but is not limited thereto.

In addition, the first frame data 3010 may correspond to a point data set obtained for a first time period 3020, and the point data set may include multiple pieces of point data. Herein, the above-described details may be applied to a point data set and multiple pieces of point data, so a redundant description will be omitted.

For example, as shown in FIG. 10, the first frame data 3010 may include first point data 3011 and second point data 3012, but no limitation thereto is imposed.

In addition, each point data included in the first frame data 3010 may be obtained on the basis of a signal that is output from the detecting unit as the detecting unit receives a laser, wherein the laser is emitted from the emitting unit included in the LiDAR device and reflects off an object.

Accordingly, the first time period 3020 for obtaining the first frame data 3010 may include multiple sub time periods in which at least one piece of point data is obtained.

For example, the first time period 3020 for obtaining the first frame data 3010 may include a first sub time period 3021 for obtaining the first point data 3011, and a second sub time period 3022 for obtaining the second point data 3012, but no limitation thereto is imposed.

In addition, in each of the multiple sub time periods, the emitting unit, the detecting unit, and the optic unit included in the LiDAR device may operate.

For example, in the first sub time period 3021 that the multiple sub time periods include, the emitting unit, the detecting unit, and the optic unit included in the LiDAR device may operate. In the second sub time period 3022, the emitting unit, the detecting unit, and the optic unit included in the LiDAR device may operate. However, no limitation thereto is imposed.

More specifically, the emitting unit may be operated to emit a laser when the optic unit is in at least one state. The detecting unit may be operated to detect the laser emitted from the emitting unit.

For example, in the first sub time period 3021, the emitting unit operates to emit a laser when the optic unit is in a first state, and the detecting unit operates to detect the laser emitted from the emitting unit when the optic unit is in the first state. However, no limitation thereto is imposed.

In addition, for example, in the second sub time period 3022, the emitting unit operates to emit a laser when the optic unit is in a second state, and the detecting unit operates to detect the laser emitted from the emitting unit when the optic unit is in the second state. However, no limitation thereto is imposed.

In addition, when a time period during which the detecting unit operates to detect the laser emitted from the emitting unit is a detecting window, the detecting window has a particular length of time after the time point at which the laser is emitted from the emitting unit, but no limitation thereto is imposed.

In addition, the emitting unit operating in the first sub time period 3021 and the emitting unit operating in the second sub time period 3022 may be the same or different.

For example, the emitting unit may include a first emitting unit and a second emitting unit. The emitting unit operating in the first time period 3021 and the emitting unit operating in the second time period 3022 may be the same. Alternatively, the emitting unit operating in the first time period 3021 is the first emitting unit and the emitting unit operating in the second time period 3022 may be the second emitting unit. However, no limitation thereto is imposed.

In addition, the detecting unit operating in the first time period 3021 and the detecting unit operating in the second time period 3022 may be the same or different.

For example, the detecting unit may include a first detecting unit and a second detecting unit. The detecting unit operating in the first time period 3021 and the detecting unit operating in the second time period 3022 may be the same. Alternatively, the detecting unit operating in the first time period 3021 may be the first detecting unit and the detecting unit operating in the second time period 3022 may be the second detecting unit. However, no limitation thereto is imposed.

In addition, the first state of the optic unit in the first time period 3021 may be different from the second state of the optic unit in the second time period 3022.

For example, in the case in which the optic unit includes a rotating mirror, the first state of the optic unit in the first time period 3021 may mean a state in which the rotating mirror is rotated by a first angle, and the second state of the optic unit in the second time period 3022 may mean a state in which the rotating mirror is rotated by a second angle different from the first angle. However, no limitation thereto is imposed.

In addition, each of the multiple pieces of point data included in the first frame data 3010 may be obtained on the basis of the time at which a laser is emitted from the emitting unit, the time at which a laser is detected by the detecting unit, and state information of the optic unit.

For example, the first point data 3011 included in the first frame data 3010 may be obtained on the basis of the following: information on the time at which the laser is emitted from the emitting unit when the optic unit is in the first state in the first time period 3021; information on the time at which the laser emitted from the emitting unit is detected by the detecting unit; and information on the first state of the optic unit. However, no limitation thereto is imposed.

In addition, for example, the second point data 3012 included in the first frame data 3010 may be obtained on the basis of the following: information on the time at which the laser is emitted from the emitting unit when the optic unit is in the second state in the second time period 3022; information on the time at which the laser emitted from the emitting unit is detected by the detecting unit; and information on the second state of the optic unit. However, no limitation thereto is imposed.

Figure 11:
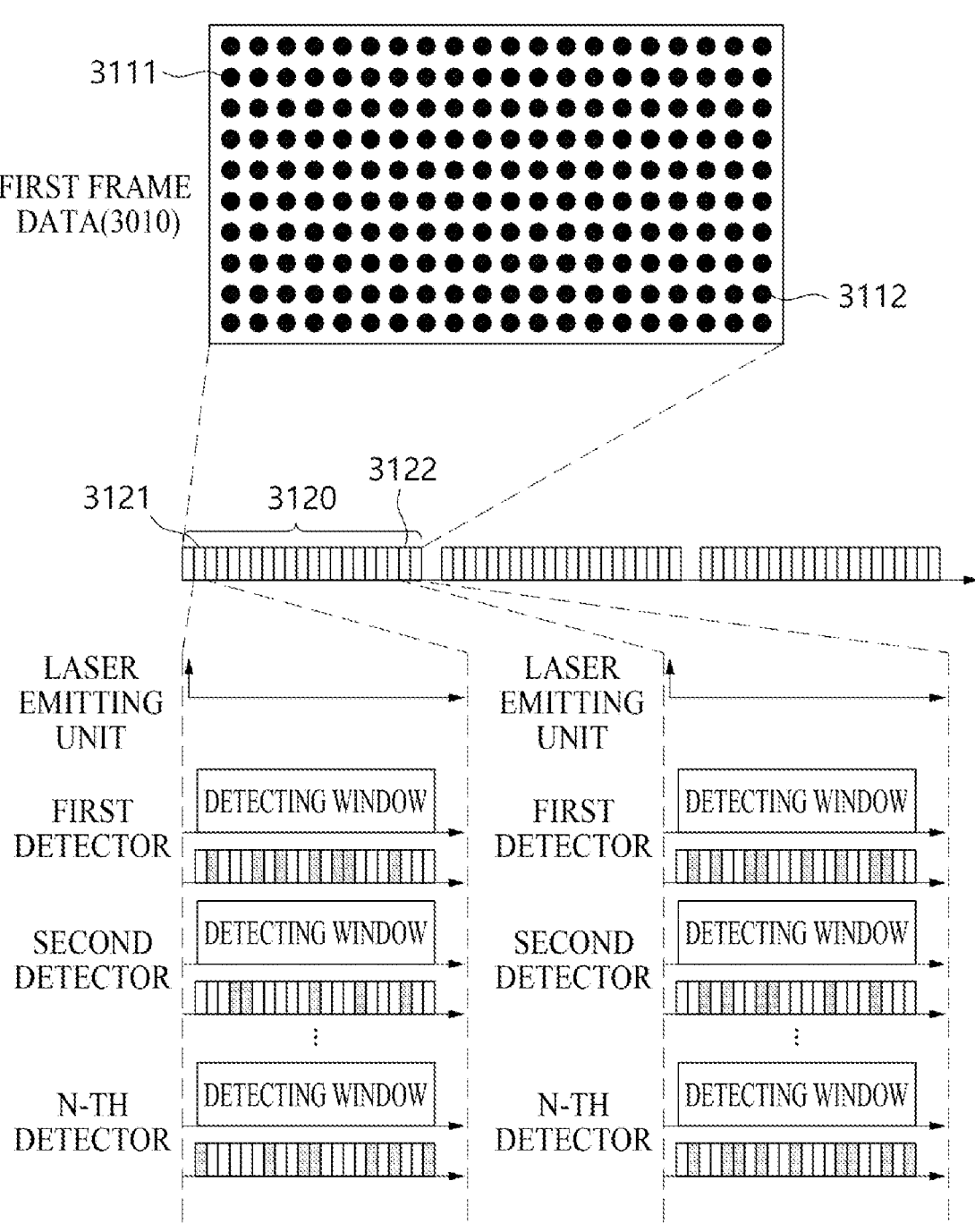
FIG. 11 is a diagram illustrating running of a LiDAR device according to an embodiment.

FIG. 11 is a diagram illustrating running of a LiDAR device according to an embodiment.

The details described with reference to FIG. 11 may be applied to a LiDAR device, in particular, a flash-type LiDAR device of which a detecting unit includes a detector array. However, no limitation thereto is imposed, and the details described below may be applied to LiDAR devices of various applicable structures.

Referring to FIG. 11, the LiDAR device according to the embodiment may obtain point data corresponding to at least one piece of frame data.

Herein, the frame data may mean one of the following: a data set constituting one screen; a point data set obtained for a predetermined time; a point data set prescribed in a predetermined format; a point cloud obtained for a predetermined time; a point cloud prescribed in a predetermined format; a point data set used for at least one data processing algorithm; and a point cloud used for at least one data processing algorithm. However, no limitation thereto is imposed, and the frame data may correspond to various concepts that can be understood as frame data by a person skilled in the art.

The at least one piece of frame data may include first frame data 3110.

Herein, the first frame data 3110 shown in FIG. 11 is simply represented as a 2D image for convenience of description, but is not limited thereto.

In addition, the first frame data 3110 may correspond to a point data set obtained for a first time period 3120, and the point data set may include multiple pieces of point data. Herein, the above-described details may be applied to a point data set and multiple pieces of point data, so a redundant description will be omitted.

For example, as shown in FIG. 11, the first frame data 3110 may include first point data 3111 and second point data 3112, but no limitation thereto is imposed.

In addition, each point data included in the first frame data 3110 may be obtained on the basis of a signal that is output from the detecting unit as the detecting unit receives a laser, wherein the laser is emitted from the emitting unit included in the LiDAR device and reflects off an object.

Accordingly, the first time period 3120 for obtaining the first frame data 3110 may include multiple sub time periods in which a data set for at least one detector is obtained. Herein, the data set for at least one detector may mean a counting value set obtained by matching a signal output from the at least one detector to a corresponding time bin. The data set for at least one detector may be used in generating histogram data for the at least one detector. In addition, herein, the histogram data may be data obtained by accumulating multiple data sets obtained in the respective multiple sub time periods. However, the histogram data is not limited thereto, and may include the meaning of histogram data understood as histogram data by a person skilled in the art.

For example, the first time period 3120 for obtaining the first frame data 3110 may include a first sub time period 3121 for obtaining a first data set for multiple detectors each, and a second sub time period 3122 for obtaining a second data set for each of the multiple detectors, but no limitation thereto is imposed.

In addition, in each of the multiple sub time periods, the emitting unit and the detecting unit included in the LiDAR device may operate.

For example, in the first sub time period 3121 that the multiple sub time periods include, the emitting unit and the detecting unit included in the LiDAR device may operate. In the second sub time period 3122, the emitting unit and the detecting unit included in the LiDAR device may operate. However, no limitation thereto is imposed.

More specifically, the emitting unit may be operated to emit a laser at a particular time point. The detecting unit may be operated to detect the laser emitted from the emitting unit. The detecting unit may generate a signal in response to light detected within a detecting window. On the basis of the generated signal, a counting value may be stored in a corresponding time bin.

For example, in the first sub time period 3121, the emitting unit may be operated to emit a laser, a first to an N-th detector included in the detecting unit may be operated to detect the laser emitted from the emitting unit, and each of the first to the N-th detector may generate a signal in response to light detected within a detecting window. On the basis of the generated signal, a counting value may be stored in a corresponding time bin. In FIG. 11, under the detecting window of each detector, time bins are shown in a manner that the detecting window is segmented, and storage of counting values in the respective time bins is shown, being shaded.

In addition, for example, in the second sub time period 3122, the emitting unit may be operated to emit a laser, a first to an N-th detector included in the detecting unit may be operated to detect the laser emitted from the emitting unit, and each of the first to the N-th detector may generate a signal in response to light detected within a detecting window. On the basis of the generated signal, a counting value may be stored in a corresponding time bin. In FIG. 11, under the detecting window of each detector, time bins are shown in a manner that the detecting window is segmented, and storage of counting values in the respective time bins is shown, being shaded.

In addition, on the basis of a signal generated in response to light detected within a detecting window for each detector in each sub time period, a data set for each detector may be obtained.

For example, in the first sub time period 3121, a first data set for each of the first to the N-th detector may be obtained on the basis of a signal generated in response to light detected by each of the first to the N-th detector, but no limitation thereto is imposed.

In addition, for example, in the second sub time period 3122, a second data set for each of the first to the N-th detector may be obtained on the basis of a signal generated in response to light detected by each of the first to the N-th detector, but no limitation thereto is imposed.

In addition, the emitting unit operating in the first sub time period 3121 and the emitting unit operating in the second sub time period 3122 may be the same or different.

For example, the emitting unit may include a first emitting unit and a second emitting unit. The emitting unit operating in the first sub time period 3121 and the emitting unit operating in the second sub time period 3122 may be the same. Alternatively, the emitting unit operating in the first sub time period 3121 may be the first emitting unit and the emitting unit operating in the second sub time period 3122 may be the second emitting unit. However, no limitation thereto is imposed.

In addition, each of the multiple pieces of point data included in the first frame data 3110 may be obtained on the basis of histogram data for each detector in which multiple data sets for each detector are accumulated for each detector.

For example, the first point data 3111 included in the first frame data 3110 may be obtained on the basis of first histogram data based on a first data set for a second detector obtained in the first sub time period 3121 and on a second data set for the second detector obtained in the second sub time period 3122, but no limitation thereto is imposed.

In addition, for example, the second point data 3112 included in the first frame data 3110 may be obtained on the basis of second histogram data based on a first data set for a N−1-th detector obtained in the first sub time period 3121 and on a second data set for the N−1-th detector obtained in the second sub time period 3122, but no limitation thereto is imposed.

Figure 12:
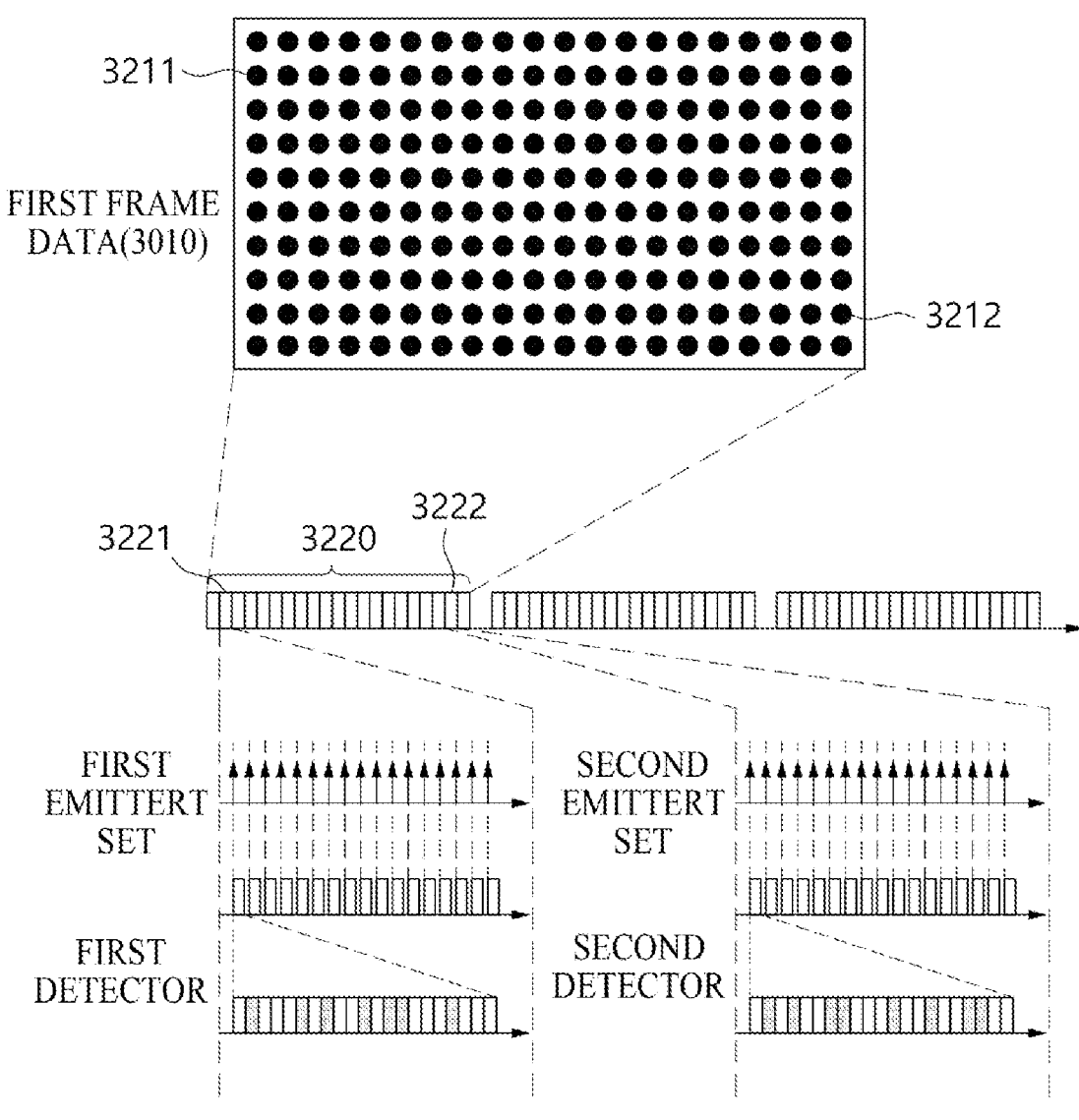
FIG. 12 is a diagram illustrating running of a LiDAR device according to an embodiment.

FIG. 12 is a diagram illustrating running of a LiDAR device according to an embodiment.

The details described with reference to FIG. 12 may be applied to a LiDAR device, in particular, a LiDAR device of which a detecting unit includes a detector array and a emitting unit includes an emitter array. However, no limitation thereto is imposed, and the details described below may be applied to LiDAR devices of various applicable structures.

In addition, in FIG. 12 for convenience of description, the description will be given using an emitter set (including at least one emitter for emitting a laser) included in a emitting unit, and the description will be given using only one detector among one or more detectors corresponding to the emitter set, but it may be understood as including a description that multiple detectors may operate corresponding to the emitter set.

Referring to FIG. 12, the LiDAR device according to the embodiment may obtain point data corresponding to at least one piece of frame data.

Herein, the frame data may mean one of the following: a data set constituting one screen; a point data set obtained for a predetermined time; a point data set prescribed in a predetermined format; a point cloud obtained for a predetermined time; a point cloud prescribed in a predetermined format; a point data set used for at least one data processing algorithm; and a point cloud used for at least one data processing algorithm. However, no limitation thereto is imposed, and the frame data may correspond to various concepts that can be understood as frame data by a person skilled in the art.

The at least one frame data may include first frame data 3210.

Herein, the first frame data 3210 shown in FIG. 12 is simply represented as a 2D image for convenience of description, but is not limited thereto.

In addition, the first frame data 3210 may correspond to a point data set obtained for a first time period 3220, and the point data set may include multiple pieces of point data. Herein, the above-described details may be applied to a point data set and multiple pieces of point data, so a redundant description will be omitted.

For example, as shown in FIG. 12, the first frame data 3210 may include first point data 3211 and second point data 3212, but no limitation thereto is imposed.

In addition, each point data included in the first frame data 3210 may be obtained on the basis of a signal that is output from the detecting unit as the detecting unit receives a laser, wherein the laser is emitted from the emitting unit included in the LiDAR device and reflects off an object.

Accordingly, the first time period 3220 for obtaining the first frame data 3210 may include multiple sub time periods for obtaining at least one piece of histogram data for obtaining at least one piece of point data.

For example, the first time period 3220 for obtaining the first frame data 3210 may include a first sub time period 3221 for obtaining first histogram data for obtaining the first point data 3211, and a second sub time period 3222 for obtaining second histogram data for obtaining the second point data 3212, but no limitation thereto is imposed.

In addition, in each of the multiple sub time periods, the emitting unit and the detecting unit included in the LiDAR device may operate.

For example, in the first sub time period 3221 that the multiple sub time periods include, the emitting unit and the detecting unit included in the LiDAR device may operate. In the second sub time period 3222, the emitting unit and the detecting unit included in the LiDAR device may operate. However, no limitation thereto is imposed.

More specifically, the emitting unit may be operated to emit lasers N times. The detecting unit may operate in synchronization with the emitting unit to detect the lasers emitted from the emitting unit N times. The detecting unit may generate a signal in response to light detected within a detecting window. On the basis of the generated signal, a counting value may be stored in a corresponding time bin.

For example, in the first sub time period 3221, a first emitter set included in the emitting unit may be operated to emit a laser. A first detector included in the detecting unit may be operated to detect the laser emitted from the first emitter set. The first detector may generate a signal in response to light detected within a detecting window. On the basis of the generated signal, a counting value may be stored in a corresponding time bin.

In addition, for example, in the first sub time period 3221, the first emitter set may be operated to emit lasers N times. The first detector may operate in a detecting window corresponding to each laser output, may generate a signal in response to light detected within each detecting window, and may generate a data set by storing a counting value in a corresponding time bin on the basis of the generated signal. Accordingly, histogram data may be obtained on the basis of N data sets corresponding to the lasers emitted N times.

In addition, for example, in the second sub time period 3222, a second emitter set included in the emitting unit may be operated to emit a laser. A second detector included in the detecting unit may be operated to detect the laser emitted from the second emitter set. The second detector may generate a signal in response to light detected within a detecting window. On the basis of the generated signal, a counting value may be stored in a corresponding time bin.

In addition, for example, in the second sub time period 3222, the second emitter set may be operated to emit lasers N times. The second detector may operate in a detecting window corresponding to each laser output, may generate a signal in response to light detected within each detecting window, and may generate a data set by storing a counting value in a corresponding time bin on the basis of the generated signal. Accordingly, histogram data may be obtained on the basis of N data sets corresponding to the lasers emitted N times.

In addition, each of the multiple pieces of point data included in the first frame data 3210 may be obtained on the basis of histogram data for each detector in which multiple data sets for each detector are accumulated for each detector.

For example, the first point data 3211 included in the first frame data 3210 may be obtained on the basis of first histogram data obtained in the first sub time period 3221, and the second point data 3212 may be obtained on the basis of second histogram data obtained in the second sub time period 3222, but no limitation thereto is imposed.

Figure 13:
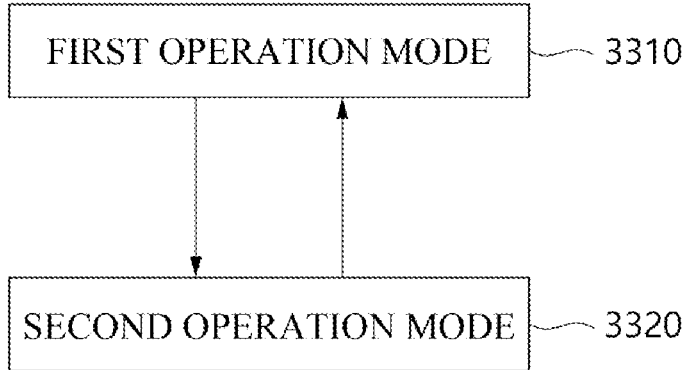
FIG. 13 is a diagram illustrating operation of a LiDAR device according to an embodiment.

FIG. 13 is a diagram illustrating operation of a LiDAR device according to an embodiment.

According to FIG. 13, the LiDAR device according to the embodiment may operate in at least a first operation mode 3310 and a second operation mode 3320.

Herein, the first operation mode 3310 may be a basic operation mode in which frame data in a first prescribed format is obtained in a first viewing angle range, the frame data in the first prescribed format has a first resolution, the frame data in the first prescribed format has a first angular resolution, and a first frame rate (the number of pieces of frame data generated per unit time) is provided. However, no limitation thereto is imposed.

In addition, the first operation mode 3310 may be a basic operation mode in which a laser is emitted at a first power, the emitting unit is operated at a first repetition (the degree of repetition), the optic unit is operated at a first rotation speed, and the detecting unit is operated to be in synchronization with the emitting unit. However, no limitation thereto is imposed.

In addition, the first operation mode 3310 may be a basic operation mode in which a laser is emitted at a first power, the emitting unit is operated at a first repetition (the degree of repetition), N times of data set sampling for obtaining histogram data are provided, and the detecting unit is operated to be in synchronization with the emitting unit. However, no limitation thereto is imposed.

In addition, the first operation mode 3310 may be a basic operation mode in which the number of sampling times for obtaining each piece of point data is the same, but is not limited thereto. Herein, the number of sampling times for obtaining each piece of point data may mean the number of lasers emitted to obtain histogram data for obtaining each piece of point data or the number of detecting windows operated in synchronization with the emitted lasers, but without being limited thereto, may include the meaning understood by a person skilled in the art as the number of sampling times for obtaining each piece of point data.

In addition, the second operation mode 3320 may be a variation operation mode in which frame data in a second prescribed format is obtained in a range different from the first viewing angle range.

For example, when the first operation mode 3310 is a basic operation mode in which frame data in a first prescribed format is obtained in a viewing angle range of a horizontal 180 degree angle to a vertical 30 degree angle, the second operation mode 3320 is a variation operation mode in which frame data in a second prescribed format is obtained in a viewing angle range of a horizontal 180 degree angle to a vertical 15 degree angle. However, no limitation thereto is imposed.

In addition, the second operation mode 3320 may be a variation operation mode in which frame data in the second prescribed format having a second resolution different from frame data in the first prescribed format having the first resolution is obtained.

For example, when the first operation mode 3310 is a basic operation mode in which frame data (including X*Y pieces of point data) in the first prescribed format is obtained in a viewing angle range, the second operation mode 3320 is a variation operation mode in which frame data (including X'*Y' pieces of point data, wherein X' and X may differ, or Y' and Y may differ) in the second prescribed format is obtained in the same viewing angle range. However, no limitation thereto is imposed.

In addition, the second operation mode 3320 may be a variation operation mode in which frame data in a second prescribed format having a second angular resolution different from the first angular resolution is obtained.

For example, when the first operation mode 3310 is a basic mode in which frame data in a first prescribed format having a horizontal-angular resolution of 0.1 degrees and a vertical-angular resolution of 0.1 degrees is obtained, the second operation mode 3320 is a variation mode in which frame data in a second prescribed format having a horizontal-angular resolution of 0.1 degrees and a vertical-angular resolution of 0.2 degrees is obtained. However, no limitation thereto is imposed.

In addition, the second operation mode 3320 may be a variation operation mode in which frame data is generated at a second frame rate different from the first frame rate.

For example, when the first operation mode 3310 is a basic operation mode in which one piece of frame data in a first prescribed format is generated per ⅟₂₅ second, the second operation mode 3320 is a variation operation mode in which one piece of frame data in the first prescribed format is generated per ⅖₅ second. However, no limitation thereto is imposed.

In addition, the second operation mode 3320 may be a variation operation mode in which a laser is emitted at a second power different from the first power.

For example, when the first operation mode 3310 is a basic operation mode in which a laser is emitted at the first power, the second operation mode 3320 is a variation operation mode in which a laser is emitted at a second power lower than the first power to reduce power consumed by the emitting unit. However, no limitation thereto is imposed.

In addition, the second operation mode 3320 may be a variation operation mode in which the emitting unit is operated at a second repetition different from the first repetition.

For example, when the first operation mode 3310 is a basic operation mode in which the emitting unit is operated at 500 kHz, the second operation mode 3320 is a variation operation mode in which the emitting unit is operated at 250 kHz. However, no limitation thereto is imposed.

In addition, the second operation mode 3320 may be a variation operation mode in which the optic unit is operated at a second rotation speed different from the first rotation speed.

For example, when the first operation mode 3310 is a basic operation mode in which the optic unit is rotated at a first rotation speed, the second operation mode 3320 is a variation operation mode in which the optic unit is rotated at a second rotation speed slower than the first rotation speed to reduce power consumed by rotation of the optic unit. However, no limitation thereto is imposed.

In addition, the second operation mode 3320 may be a variation operation mode in which M times of data set sampling differing from the N times of data set sampling are provided. However, no limitation thereto is imposed.

For example, when the first operation mode 3310 is a basic operation mode in which N times of sampling for accumulating N data sets are provided to obtain histogram data for obtaining one piece of point data, the second operation mode 3320 is a variation operation mode in which M times of sampling for accumulating M, which differs from N, data sets are provided to obtain histogram data for obtaining one piece of point data. However, no limitation thereto is imposed.

In addition, the second operation mode 3320 may be a variation operation mode in which the number of sampling times for obtaining at least a portion of point data is different from the number of sampling times for obtaining another portion of point data. However, no limitation thereto is imposed.

For example, when the first operation mode 3310 is a basic operation mode in which the number of sampling times for obtaining each piece of point data is equal to N, the second operation mode 3320 is a variation operation mode in which the number of sampling times for obtaining point data located in a first viewing angle range is M and the number of sampling times for obtaining point data located in a second viewing angle range is N. Herein, the M and the N may differ, the first viewing angle range may be an outer range of the whole viewing angle, and the second viewing angle range may be a central range of the whole viewing angle. However, no limitation thereto is imposed.

Herein, the number of sampling times for obtaining each piece of point data may mean the number of lasers emitted to obtain histogram data for obtaining each piece of point data or the number of detecting windows operated in synchronization with the emitted lasers, but without being limited thereto, may include the meaning understood by a person skilled in the art as the number of sampling times for obtaining each piece of point data.

Each of the second operation modes 3320 described above is for describing various variation operation embodiments, each of the second operation modes 3320 described above may be connected with the feature occurring in the same operation mode, and various variation operation embodiments may be variously combined.

FIGS. 14A to 14F are diagrams illustrating various variation operation modes of a LiDAR device according to an embodiment.

Figure 14:
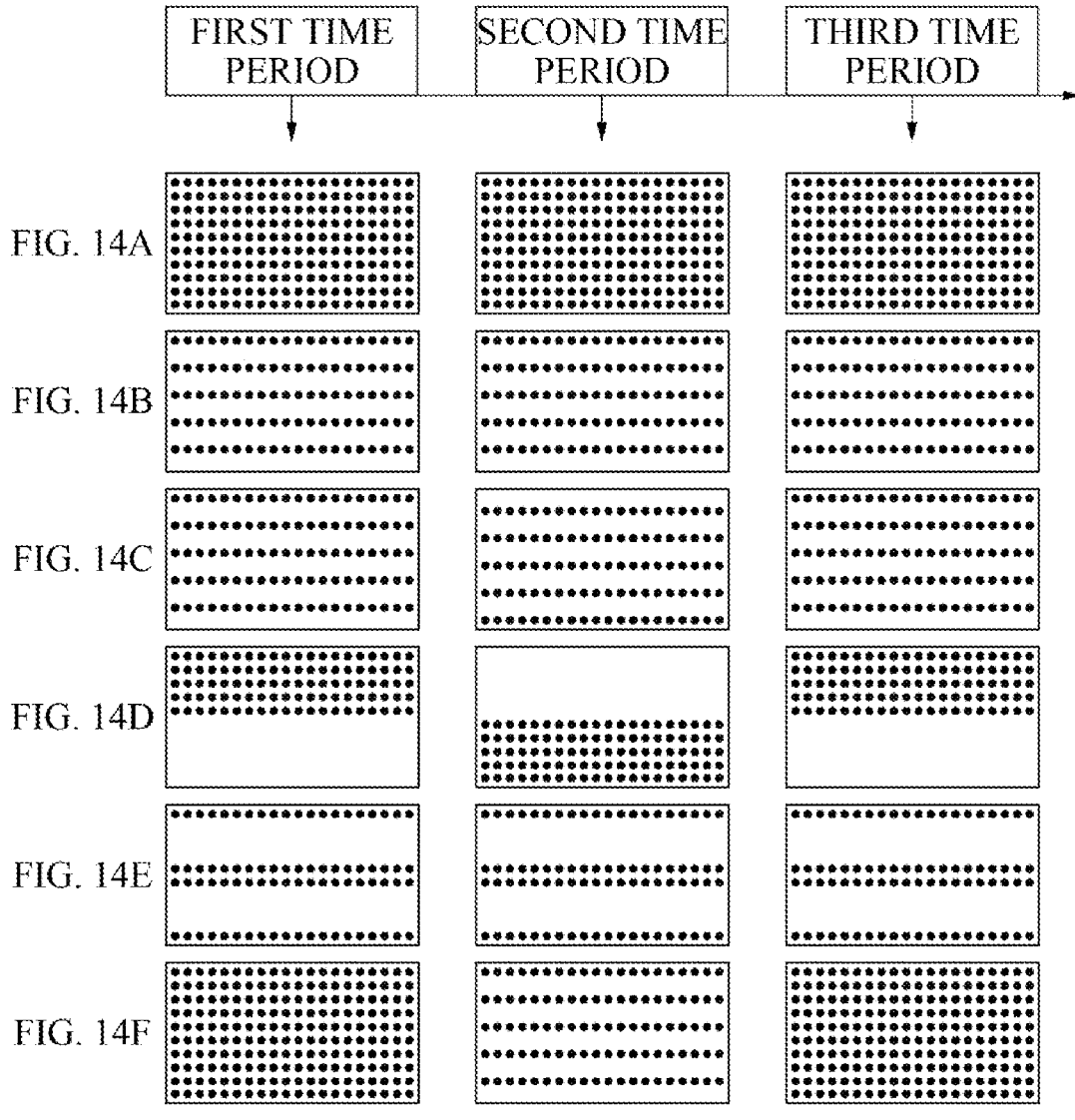
FIGS. 14A to 14F are diagrams illustrating various variation operation modes of a LiDAR device according to an embodiment.

More specifically, FIG. 14A is a diagram illustrating a basic operation mode of a LiDAR device according to an embodiment, and FIGS. 14B to 14F are diagrams illustrating a first to a fifth variation operation mode of the LiDAR device according to respective embodiments.

Referring to FIG. 14A, in the basic operation mode of the LiDAR device according to the embodiment, the LiDAR device may obtain a first point data set during a first time period, may obtain a second point data set during a second time period, and may obtain a third point data set during a third time period.

In addition, referring to FIG. 14A, the first point data set may correspond to first frame data, the second point data set may correspond to second frame data, and the third point data set may correspond to third frame data.

In addition, referring to FIG. 14A, each of the first to the third frame data may have a first resolution and a first angular resolution.

In addition, referring to FIG. 14A, the LiDAR device may have a first frame rate (the number of pieces of frame data generated per unit time), and the first frame rate may be 1/(the length of the first time period).

Referring to FIG. 14B, in the first variation operation mode of the LiDAR device according to the embodiment, the LiDAR device may obtain a fourth point data set during a first time period, may obtain a fifth point data set during a second time period, and may obtain a sixth point data set during a third time period.

In addition, referring to FIG. 14B, the fourth point data set may correspond to fourth frame data, the fifth point data set may correspond to fifth frame data, and the sixth point data set may correspond to sixth frame data.

In addition, referring to FIG. 14B, each of the fourth to the sixth frame data may have a second resolution and a second angular resolution.

In addition, referring to FIG. 14B, the LiDAR device may have a second frame rate (the number of pieces of frame data generated per unit time), and the second frame rate may be 1/(the length of the first time period).

In addition, referring to FIGS. 14A and 14B, the first variation operation mode of the LiDAR device may be a variation operation mode in which the fourth to the sixth frame data having a second resolution different from the first resolution are obtained.

For example, in the first variation operation mode of the LiDAR device, the number of pieces of point data included in the fourth frame data may be half the number of pieces of point data included in the first frame data in the basic operation mode. However, no limitation thereto is imposed.

In addition, referring to FIGS. 14A and 14B, the first variation operation mode of the LiDAR device may be a variation operation mode in which the fourth to the sixth frame data having a second angular resolution different from the first angular resolution are obtained.

For example, in the first variation operation mode of the LiDAR device, a horizontal-angular resolution between pieces of point data included in the fourth frame data may be the same as a horizontal-angular resolution between pieces of point data included in the first frame data, and a vertical-angular resolution between pieces of point data included in the fourth frame data may be different from a vertical-angular resolution between pieces of point data included in the first frame data. However, no limitation thereto is imposed.

In addition, referring to FIGS. 14A and 14B, in the first variation operation mode of the LiDAR device, the fourth to the sixth frame data may be generated at a second frame rate the same as the first frame rate. However, no limitation thereto is imposed.

Referring to FIG. 14C, in the second variation operation mode of the LiDAR device according to the embodiment, the LiDAR device may obtain a seventh point data set during a first time period, may obtain an eighth point data set during a second time period, and may obtain a ninth point data set during a third time period.

In addition, referring to FIG. 14C, each of the seventh to the ninth point data set may correspond to frame data, but without being limited thereto, a combination of the seventh point data set and the eighth point data set may correspond to frame data.

In addition, referring to FIG. 14C, each of the seventh to the ninth point data set may have a third resolution and a third angular resolution.

In addition, referring to FIG. 14C, the LiDAR device may have a third frame rate (the number of pieces of frame data generated per unit time), and the third frame rate may be 1/(the length of the first time period). However, without being limited thereto, the third frame rate may be 1/(the length of the first time period+the length of the second time period).

In addition, referring to FIGS. 14A and 14C, the second variation operation mode of the LiDAR device may be a variation operation mode in which a seventh to a ninth point data set having a third resolution different from the first resolution are obtained.

For example, in the second variation operation mode of the LiDAR device, the number of pieces of point data included in the seventh point data set may be half the number of pieces of point data included in the first point data set in the basic operation mode. However, no limitation thereto is imposed.

In addition, referring to FIGS. 14A and 14C, the second variation operation mode of the LiDAR device may be a variation operation mode in which frame data having a resolution the same as the first resolution is obtained.

For example, in the second variation operation mode of the LiDAR device, the number of pieces of point data included in the frame data including the seventh point data set and the eighth point data set may be the same as the number of pieces of point data included in the first frame data in the basic operation mode. However, no limitation thereto is imposed.

In addition, referring to FIGS. 14A and 14C, the second variation operation mode of the LiDAR device may be a variation operation mode in which a seventh to a ninth point data set having a third angular resolution different from the first angular resolution are obtained.

For example, in the second variation operation mode of the LiDAR device, a horizontal-angular resolution between pieces of point data included in the seventh point data set may be the same as a horizontal-angular resolution between pieces of point data included in the first point data set, and a vertical-angular resolution between pieces of point data included in the seventh point data set may be different from a vertical-angular resolution between pieces of point data included in the first point data set. However, no limitation thereto is imposed.

In addition, referring to FIGS. 14A and 14C, the second variation operation mode of the LiDAR device may be a variation operation mode in which frame data having an angular resolution the same as the first angular resolution is obtained.

For example, in the second variation operation mode of the LiDAR device, a horizontal and a vertical-angular resolution between pieces of point data included in the frame data including the seventh point data set and the eighth point data set may be the same as a horizontal and a vertical-angular resolution included in the first frame data. However, no limitation thereto is imposed.

In addition, referring to FIGS. 14A and 14C, when the basic operation mode of the LiDAR device is an operation mode in which a first point data set is obtained during a first time period, the second variation operation mode of the LiDAR device is an operation mode in which a seventh point data set overlapping a portion of the first point data set is obtained during the first time period and an eighth point data set overlapping another portion of the first point data set is obtained during a second time period.

Referring to FIG. 14D, in the third variation operation mode of the LiDAR device according to the embodiment, the LiDAR device may obtain a 10th point data set during a first time period, may obtain an 11th point data set during a second time period, and may obtain a 12th point data set during a third time period.

In addition, referring to FIG. 14D, each of the 10th to the 12th point data set may correspond to frame data, but without being limited thereto, a combination of the 10th point data set and the 11th point data set may correspond to frame data.

In addition, referring to FIG. 14D, each of the 10th and the 12th point data set may have a fourth resolution and a fourth angular resolution.

In addition, referring to FIG. 14D, the LiDAR device may have a fourth frame rate (the number of pieces of frame data generated per unit time), and the fourth frame rate may be 1/(the length of the first time period). However, without being limited thereto, the fourth frame rate may be 1/(the length of the first time period+the length of the second time period).

In addition, referring to FIGS. 14A and 14D, the third variation operation mode of the LiDAR device may be a variation operation mode in which a 10th to a 12th point data set having a fourth resolution different from the first resolution are obtained.

For example, in the third variation operation mode of the LiDAR device, the number of pieces of point data included in the 10th point data set may be half the number of pieces of point data included in the first point data set in the basic operation mode. However, no limitation thereto is imposed.

In addition, referring to FIGS. 14A and 14D, the third variation operation mode of the LiDAR device may be a variation operation mode in which frame data having a resolution the same as the first resolution is obtained.

For example, in the third variation operation mode of the LiDAR device, the number of pieces of point data included in the frame data including the 10th point data set and the 11th point data set may be the same as the number of pieces of point data included in the first frame data in the basic operation mode. However, no limitation thereto is imposed.

In addition, referring to FIGS. 14A and 14D, the third variation operation mode of the LiDAR device may be a variation operation mode in which a 10th to a 12th point data set having an angular resolution the same as the first angular resolution are obtained.

For example, in the third variation operation mode of the LiDAR device, a horizontal-angular resolution and a vertical-angular resolution between pieces of point data included in the 10th point data set may be the same as a horizontal-angular resolution and a vertical-angular resolution between pieces of point data included in the first point data set. However, no limitation thereto is imposed.

In addition, referring to FIGS. 14A and 14D, the third variation operation mode of the LiDAR device may be a variation operation mode in which frame data having an angular resolution the same as the first angular resolution is obtained.

For example, in the third variation operation mode of the LiDAR device, a horizontal and a vertical-angular resolution between pieces of point data included in the frame data including the 10th point data set and the 11th point data set may be the same as a horizontal and a vertical-angular resolution included in the first frame data. However, no limitation thereto is imposed.

In addition, referring to FIGS. 14A and 14D, the third variation operation mode of the LiDAR device may be a variation operation mode in which a 10th to a 12th point data set forming a viewing angle different from the viewing angle formed by the first point data set are obtained.

For example, in the third variation operation mode of the LiDAR device, the size of the viewing angle formed by pieces of point data included in each of the 10th to the 12th point data set may be different from the size of the viewing angle formed by pieces of point data included in the first point data set. However, no limitation thereto is imposed.

Referring to FIG. 14E, in the fourth variation operation mode of the LiDAR device according to the embodiment, the LiDAR device may obtain a 13th point data set during a first time period, may obtain a 14th point data set during a second time period, and may obtain a 15th point data set during a third time period.

In addition, referring to FIG. 14E, each of the 13th to the 15th point data set may correspond to frame data.

In addition, referring to FIG. 14E, each of the 13th to the 15th point data set may have a fifth resolution and a fifth angular resolution. Herein, the fifth angular resolution may vary according to a position within a viewing angle.

In addition, referring to FIG. 14E, the LiDAR device may have a fifth frame rate (the number of pieces of frame data generated per unit time), and the fifth frame rate may be 1/(the length of the first time period). However, no limitation thereto is imposed.

In addition, referring to FIGS. 14A and 14E, the fourth variation operation mode of the LiDAR device may be a variation operation mode in which a 13th to a 15th point data set having a fifth resolution different from the first resolution are obtained.

For example, in the fourth variation operation mode of the LiDAR device, the number of pieces of point data included in the 13th point data set may be smaller than the number of pieces of point data included in the first point data set in the basic operation mode. However, no limitation thereto is imposed.

In addition, referring to FIGS. 14A and 14E, a variation operation mode of the LiDAR device may be a variation operation mode in which frame data having a fifth resolution different from the first resolution is obtained.

For example, in the fourth variation operation mode of the LiDAR device, the number of pieces of point data included in the frame data including the 13th point data set may be smaller than the number of pieces of point data included in the first frame data in the basic operation mode. However, no limitation thereto is imposed.

In addition, referring to FIGS. 14A and 14E, the fourth variation operation mode of the LiDAR device may be a variation operation mode in which a 13th to a 15th point data set having a fifth angular resolution different from the first angular resolution are obtained.

For example, in the fourth variation operation mode of the LiDAR device, a horizontal-angular resolution between pieces of point data included in the 13th point data set may be the same as a horizontal-angular resolution between pieces of point data included in the first point data set, a vertical-angular resolution between pieces of point data included in the 13th point data set may have an angular resolution value that increases as it moves away from the center of the vertical viewing angle, and the vertical-angular resolution may be different from at least a portion of a vertical-angular resolution between pieces of point data included in the first point data set. However, no limitation thereto is imposed.

In addition, referring to FIGS. 14A and 14E, the fourth variation operation mode of the LiDAR device may be a variation operation mode in which frame data having a fifth angular resolution different from the first angular resolution is obtained.

For example, in the fourth variation operation mode of the LiDAR device, a horizontal-angular resolution between pieces of point data included in the frame data including the 13th point data set may be the same as a horizontal-angular resolution between pieces of point data included in the first frame data, a vertical-angular resolution between pieces of point data included in the frame data including the 13th point data set may have an angular resolution value that increases as it moves away from the center of the vertical viewing angle, and the vertical-angular resolution may be different from at least a portion of a vertical-angular resolution between pieces of point data included in the first frame data. However, no limitation thereto is imposed.

Referring to FIG. 14F, in the fifth variation operation mode of the LiDAR device according to the embodiment, the LiDAR device may obtain a 16th point data set during a first time period, may obtain a 17th point data set during a second time period, and may obtain an 18th point data set during a third time period.

In addition, referring to FIG. 14F, each of the 16th to the 18th point data set may correspond to frame data.

In addition, referring to FIG. 14F, the 16th point data set may have a sixth resolution and a sixth angular resolution, the 17th point data set may have a seventh resolution and a seventh angular resolution, and the 18th point data set may have an eighth resolution and an eighth angular resolution.

In addition, referring to FIG. 14F, the LiDAR device may have a sixth frame rate (the number of pieces of frame data generated per unit time), and the sixth frame rate may be 1/(the length of the first time period). However, no limitation thereto is imposed.

In addition, referring to FIGS. 14A and 14F, the fifth variation operation mode of the LiDAR device may be a variation operation mode in which a 16th point data set having a sixth resolution the same as the first resolution, a 17th point data set having a seventh resolution different from the first resolution, and an 18th point data set having an eighth resolution the same as the first resolution are obtained.

For example, in the fifth variation operation mode of the LiDAR device, the number of pieces of point data included in the 16th point data set may be the same as the number of pieces of point data included in the first point data set in the basic operation mode, the number of pieces of point data included in the 17th point data set may be different from the number of pieces of point data included in the first point data set in the basic operation mode, and the number of pieces of point data included in the 18th point data set may be the same as the number of pieces of point data included in the first point data set in the basic operation mode. However, no limitation thereto is imposed.

In addition, referring to FIGS. 14A and 14F, the fifth variation operation mode of the LiDAR device may be a variation operation mode in which 16th frame data having a sixth resolution the same as the first resolution, 17th frame data having a seventh resolution different from the first resolution, and 18th frame data having an eighth resolution the same as the first resolution are obtained.

For example, in the fifth variation operation mode of the LiDAR device, the number of pieces of point data included in 16th frame data including the 16th point data set may be the same as the number of pieces of point data included in the first frame data in the basic operation mode, the number of pieces of point data included in 17th frame data including the 17th point data set may be different from the number of pieces of point data included in the first frame data in the basic operation mode, and the number of pieces of point data included in 18th frame data including the 18th point data set may be the same as the number of pieces of point data included in the first frame data in the basic operation mode. However, no limitation thereto is imposed.

In addition, referring to FIGS. 14A and 14F, the fifth variation operation mode of the LiDAR device may be a variation operation mode in which a 16th point data set having a sixth angular resolution the same as the first angular resolution, a 17th point data set having a seventh angular resolution different from the first angular resolution, and an 18th point data set having an eighth angular resolution the same as the first angular resolution are obtained.

For example, in the fifth variation operation mode of the LiDAR device, a horizontal and a vertical-angular resolution between pieces of point data included in the 16th point data set may be the same as a horizontal and a vertical-angular resolution between pieces of point data included in the first point data set in the basic operation mode, a horizontal-angular resolution between pieces of point data included in the 17th point data set may be the same as a horizontal-angular resolution between pieces of point data included in the first point data set in the basic operation mode, a vertical-angular resolution between pieces of point data included in the 17th point data set may be different from a vertical-angular resolution between pieces of point data included in the first point data set in the basic operation mode, and a horizontal and a vertical-angular resolution between pieces of point data included in the 18th point data set may be the same as a horizontal and a vertical-angular resolution between pieces of point data included in the first point data set in the basic operation mode. However, no limitation thereto is imposed.

In addition, referring to FIGS. 14A and 14F, the fifth variation operation mode of the LiDAR device may be a variation operation mode in which 16th frame data having a sixth angular resolution the same as the first angular resolution, 17th frame data having a seventh angular resolution different from the first angular resolution, and 18th frame data having an eighth angular resolution the same as the first angular resolution are obtained.

For example, in the fifth variation operation mode of the LiDAR device, a horizontal and a vertical-angular resolution between pieces of point data included in the 16th frame data including the 16th point data set may be the same as a horizontal and a vertical-angular resolution between pieces of point data included in the first point data set in the basic operation mode, a horizontal-angular resolution between pieces of point data included in the 17th frame data including the 17th point data set may be the same as a horizontal-angular resolution between pieces of point data included in the first frame data in the basic operation mode, a vertical-angular resolution between pieces of point data included in the 17th frame data including the 17th point data set may be different from a vertical-angular resolution between pieces of point data included in the first frame data in the basic operation mode, and a horizontal and a vertical-angular resolution between pieces of point data included in the 18th frame data including the 18th point data set may be the same as a horizontal and a vertical-angular resolution between pieces of point data included in the first frame data in the basic operation mode. However, no limitation thereto is imposed.

Figure 15:
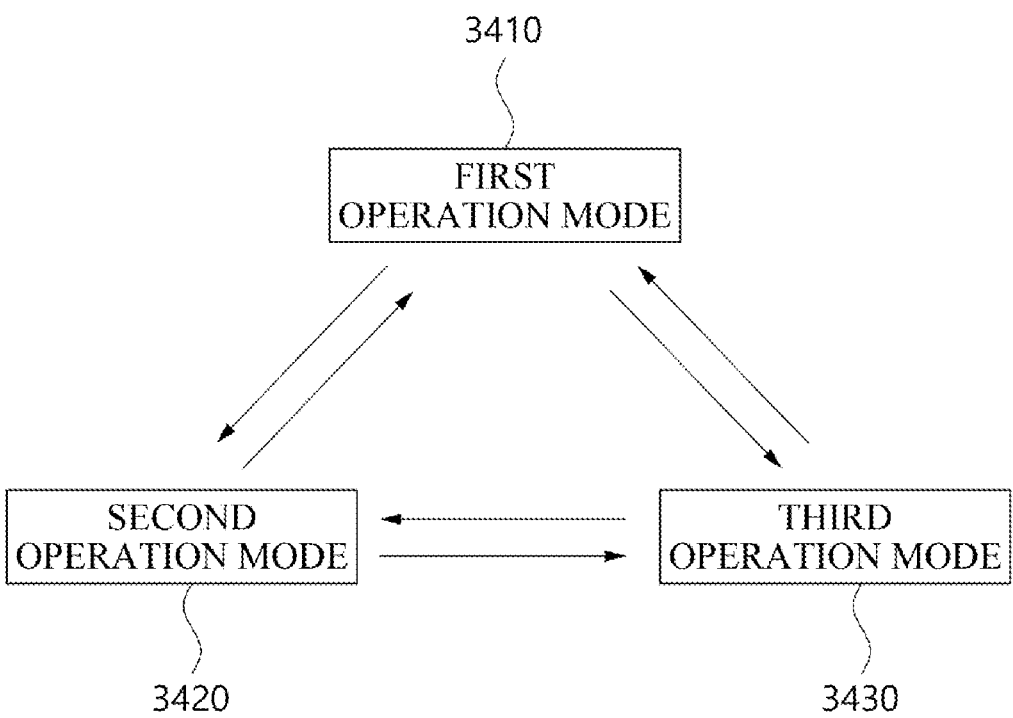
FIG. 15 is a diagram illustrating operation of a LiDAR device according to an embodiment.

FIG. 15 is a diagram illustrating operation of a LiDAR device according to an embodiment.

According to FIG. 15, the LiDAR device according to the embodiment may operate in at least a first operation mode 3410, a second operation mode 3420, and a third operation mode 3430.

Herein, the first operation mode 3410 may be a basic operation mode in which frame data in a first prescribed format is obtained in a first viewing angle range, the frame data in the first prescribed format has a first resolution, the frame data in the first prescribed format has a first angular resolution, and a first frame rate (the number of pieces of frame data generated per unit time) is provided. However, no limitation thereto is imposed.

In addition, the first operation mode 3410 may be a basic operation mode in which a laser is emitted at a first power, the emitting unit is operated at a first repetition (the degree of repetition), the optic unit is operated at a first rotation speed, and the detecting unit is operated to be in synchronization with the emitting unit. However, no limitation thereto is imposed.

In addition, the first operation mode 3410 may be a basic operation mode in which a laser is emitted at a first power, the emitting unit is operated at a first repetition (the degree of repetition), N times of data set sampling for obtaining histogram data are provided, and the detecting unit is operated to be in synchronization with the emitting unit. However, no limitation thereto is imposed.

In addition, the second operation mode 3420 may be a first variation operation mode in which frame data in a second prescribed format is obtained in a range different from the first viewing angle range.

For example, when the first operation mode 3410 is a basic operation mode in which frame data in a first prescribed format is obtained in a viewing angle range of a horizontal 180 degree angle to a vertical 30 degree angle, the second operation mode 3420 is a variation operation mode in which frame data in a second prescribed format is obtained in a viewing angle range of a horizontal 180 degree angle to a vertical 15 degree angle. However, no limitation thereto is imposed.

In addition, the third operation mode 3430 may be a second variation operation mode in which frame data in a third prescribed format is obtained in a range different from the first viewing angle range.

For example, when the first operation mode 3410 is a basic operation mode in which frame data in a first prescribed format is obtained in a viewing angle range of a horizontal 180 degree angle to a vertical 30 degree angle, the second operation mode 3420 is a variation operation mode in which frame data in a second prescribed format is obtained in a viewing angle range of a horizontal 180 degree angle to a vertical 15 degree angle and the third operation mode 3430 is a variation operation mode in which frame data in a third prescribed format is obtained in a viewing angle range of a horizontal 180 degree angle to a vertical 5 degree angle. However, no limitation thereto is imposed.

In addition, the second operation mode 3420 may be a first variation operation mode in which frame data in the second prescribed format having a second resolution different from frame data in the first prescribed format having the first resolution is obtained.

For example, when the first operation mode 3410 is a basic operation mode in which frame data (including X*Y pieces of point data) in the first prescribed format is obtained in a viewing angle range, the second operation mode 3420 is a variation operation mode in which frame data (including X'*Y' pieces of point data, wherein X' and X may differ, or Y' and Y may differ) in the second prescribed format is obtained in the same viewing angle range. However, no limitation thereto is imposed.

In addition, the third operation mode 3430 may be a second variation operation mode in which frame data in a third prescribed format having a third resolution different from frame data in the first prescribed format having the first resolution and from frame data in the second prescribed format having the second resolution is obtained.

For example, when the first operation mode 3410 is a basic operation mode in which frame data (including X*Y pieces of point data) in the first prescribed format is obtained in a viewing angle range, the second operation mode 3420 is a variation operation mode in which frame data (including X'*Y' pieces of point data, wherein X' and X may differ, or Y' and Y may differ) in the second prescribed format is obtained in the same viewing angle range and the third operation mode 3430 is a variation operation mode in which frame data (including X"*Y" pieces of point data, wherein X" may be different from X' and X, or Y" may be different from Y' and Y) in the third prescribed format is obtained in the same viewing angle range. However, no limitation thereto is imposed.

In addition, the second operation mode 3420 may be a first variation operation mode in which frame data in a second prescribed format having a second angular resolution different from the first angular resolution is obtained.

For example, when the first operation mode 3410 is a basic mode in which frame data in a first prescribed format having a horizontal-angular resolution of 0.1 degrees and a vertical-angular resolution of 0.1 degrees is obtained, the second operation mode 3420 is a variation mode in which frame data in a second prescribed format having a horizontal-angular resolution of 0.1 degrees and a vertical-angular resolution of 0.2 degrees is obtained. However, no limitation thereto is imposed.

In addition, the third operation mode 3430 may be a second variation operation mode in which frame data in a third prescribed format having a third angular resolution different from the first angular resolution and the second angular resolution is obtained.

For example, when the first operation mode 3410 is a basic mode in which frame data in a first prescribed format having a horizontal-angular resolution of 0.1 degrees and a vertical-angular resolution of 0.1 degrees is obtained, the second operation mode 3420 is a variation mode in which frame data in a second prescribed format having a horizontal-angular resolution of 0.1 degrees and a vertical-angular resolution of 0.2 degrees is obtained and the third operation mode 3430 is a variation mode in which frame data in a third prescribed format having a horizontal-angular resolution of 0.1 degrees and a vertical-angular resolution of 0.4 degrees is obtained. However, no limitation thereto is imposed.

In addition, the second operation mode 3420 may be a first variation operation mode in which frame data is generated at a second frame rate different from the first frame rate.

For example, when the first operation mode 3410 is a basic operation mode in which one piece of frame data in a first prescribed format is generated per ⅕s second, the second operation mode 3420 is a variation operation mode in which one piece of frame data in the first prescribed format is generated per ⅖s second. However, no limitation thereto is imposed.

In addition, the third operation mode 3430 may be a second variation operation mode in which frame data is generated at a third frame rate different from the first frame rate and the second frame rate.

For example, when the first operation mode 3410 is a basic operation mode in which one piece of frame data in a first prescribed format is generated per ⅕s second, the second operation mode 3420 is a variation operation mode in which one piece of frame data in the first prescribed format is generated per ⅖s second and the third operation mode 3430 is a variation operation mode in which one piece of frame data in the first prescribed format is generated per ⅗s second. However, no limitation thereto is imposed.

In addition, the second operation mode 3420 may be a first variation operation mode in which a laser is emitted at a second power different from the first power.

For example, when the first operation mode 3410 is a basic operation mode in which a laser is emitted at the first power, the second operation mode 3420 is a variation operation mode in which a laser is emitted at a second power lower than the first power to reduce power consumed by the emitting unit. However, no limitation thereto is imposed.

In addition, the third operation mode 3430 may be a second variation operation mode in which a laser is emitted at a third power different from the first power and the second power.

For example, when the first operation mode 3410 is a basic operation mode in which a laser is emitted at the first power, the second operation mode 3420 is a variation operation mode in which a laser is emitted at a second power lower than the first power to reduce power consumed by the emitting unit and the third operation mode 3430 is a variation operation mode in which a laser is emitted at a third power lower than the second power to reduce power consumed by the emitting unit. However, no limitation thereto is imposed.

In addition, the second operation mode 3420 may be a first variation operation mode in which the emitting unit is operated at a second repetition different from the first repetition.

For example, when the first operation mode 3410 is a basic operation mode in which the emitting unit is operated at 500 kHz, the second operation mode 3420 is a variation operation mode in which the emitting unit is operated at 250 kHz. However, no limitation thereto is imposed.

In addition, the third operation mode 3430 may be a second variation operation mode in which the emitting unit is operated at a third repetition different from the first repetition and the second repetition.

For example, when the first operation mode 3410 is a basic operation mode in which the emitting unit is operated at 500 kHz, the second operation mode 3420 is a variation operation mode in which the emitting unit is operated at 250 kHz and the third operation mode 3430 is a variation operation mode in which the emitting unit is operated at 125 kHz. However, no limitation thereto is imposed.

In addition, the second operation mode 3420 may be a first variation operation mode in which the optic unit is operated at a second rotation speed different from the first rotation speed.

For example, when the first operation mode 3410 is a basic operation mode in which the optic unit is rotated at a first rotation speed, the second operation mode 3420 is a variation operation mode in which the optic unit is rotated at a second rotation speed slower than the first rotation speed to reduce power consumed by rotation of the optic unit. However, no limitation thereto is imposed.

In addition, the third operation mode 3430 may be a second variation operation mode in which the optic unit is operated at a third rotation speed different from the first rotation speed and the second rotation speed.

For example, when the first operation mode 3410 is a basic operation mode in which the optic unit is rotated at a first rotation speed, the second operation mode 3420 is a variation operation mode in which the optic unit is rotated at a second rotation speed slower than the first rotation speed to reduce power consumed by rotation of the optic unit and the third operation mode 3430 is a variation operation mode in which the optic unit is rotated at a third rotation speed slower than the second rotation speed to reduce power consumed by rotation of the optic unit. However, no limitation thereto is imposed.

In addition, the second operation mode 3420 may be a first variation operation mode in which M times of data set sampling differing from the N times of data set sampling are provided. However, no limitation thereto is imposed.

For example, when the first operation mode 3410 is a basic operation mode in which N times of sampling for accumulating N data sets are provided to obtain histogram data for obtaining one piece of point data, the second operation mode 3420 is a variation operation mode in which M times of sampling for accumulating M, which differs from N, data sets are provided to obtain histogram data for obtaining one piece of point data. However, no limitation thereto is imposed.

In addition, the third operation mode 3430 may be a second variation operation mode in which P times of data set sampling differing from the N times of data set sampling and from the M times of data set sampling are provided. However, no limitation thereto is imposed.

For example, when the first operation mode 3410 is a basic operation mode in which N times of sampling for accumulating N data sets are provided to obtain histogram data for obtaining one piece of point data, the second operation mode 3420 is a variation operation mode in which M times of sampling for accumulating M, which differs from N, data sets are provided to obtain histogram data for obtaining one piece of point data and the third operation mode 3430 is a variation operation in which P times of sampling for accumulating P, which differs from N and M, data sets are provided to obtain histogram data for obtaining one piece of point data. However, no limitation thereto is imposed.

Although the above-described details are related to a first to a third operation mode, various operation modes that can be inferred from the relationships with the first to the third operation mode may be further included, for example, a fourth operation mode, and a fifth operation mode.

In addition, the above-described various variation operation modes may be applied to each operation mode.

Figure 16A:
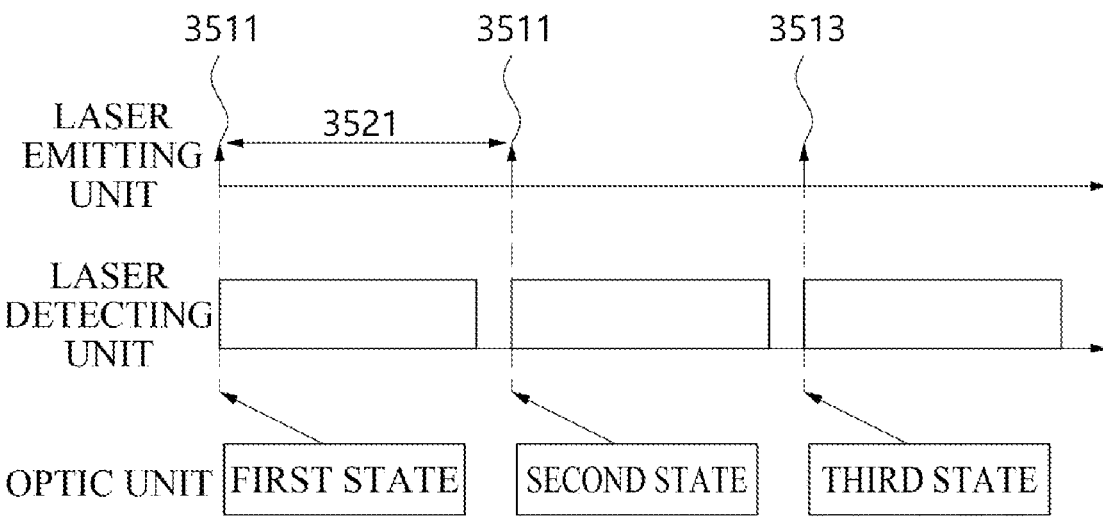
FIGS. 16A and 16B are diagrams illustrating operation of a LiDAR device depending on an operation mode according to an embodiment.
Figure 16B:
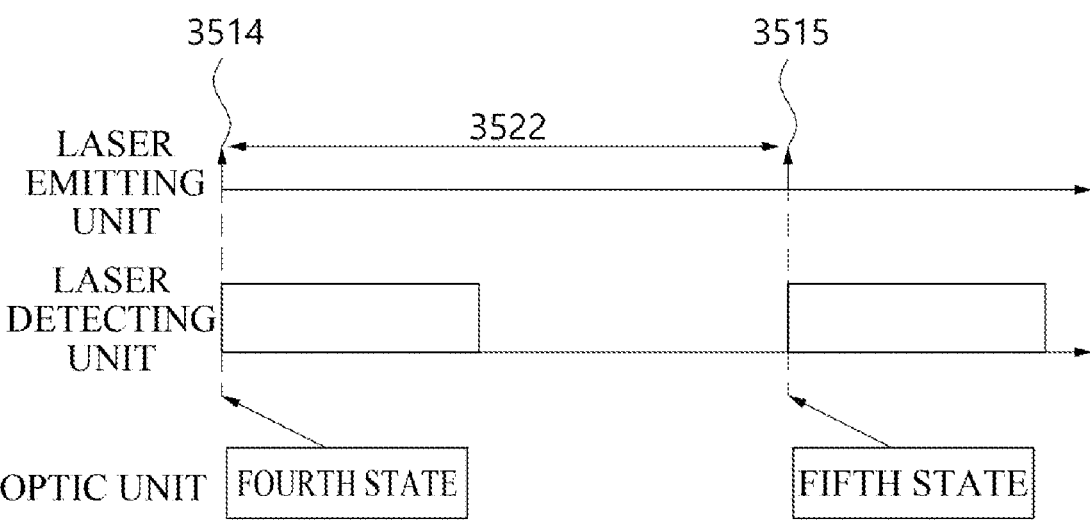

FIGS. 16A and 16B are diagrams illustrating operation of a LiDAR device depending on an operation mode according to an embodiment.

FIG. 16A is a diagram illustrating operation of a LiDAR device in a basic operation mode according to an embodiment. FIG. 16B is a diagram illustrating operation of the LiDAR device in a variation operation mode according to an embodiment.

However, the above-described details may be applied to FIGS. 16A and 16B, so a redundant description will be omitted.

Referring to FIG. 16A, in the basic operation mode of the LiDAR device according to the embodiment, the emitting unit may be operated to emit a first laser 3511 at a first time point, emit a second laser 3512 at a second time point, and emit a third laser 3513 at a third time point.

Herein, the optic unit at the first time point may be in a first state, the optic unit at the second time point may be in a second state, and the optic unit at the third time point may be in a third state.

In addition, referring to FIG. 16A, in the basic operation mode of the LiDAR device according to the embodiment, the difference between the first time point at which the first laser 3511 is emitted and the second time point at which the second laser 3512 is emitted may be a first time interval 3521.

In addition, the difference between the first state of the optic unit and the second state of the optic unit may be a first angle, and the difference between the second state and the third state may be a second angle.

In addition, referring to FIG. 16B, in the variation operation mode of the LiDAR device according to the embodiment, the emitting unit may be operated to emit a fourth laser 3514 at a fourth time point and emit a fifth laser 3515 at a fifth time point.

Herein, the optic unit at the fourth time point may be in a fourth state, and the optic unit at the fifth time point may be in a fifth state.

In addition, referring to FIG. 16B, in the variation operation mode of the LiDAR device according to the embodiment, the difference between the fourth time point at which the fourth laser 3514 is emitted and the fifth time point at which the fifth laser 3515 is emitted may be a second time interval 3522.

In addition, the difference between the fourth state of the optic unit and the fifth state of the optic unit may be a third angle.

In addition, referring to FIGS. 16A and 16B, the variation operation mode of the LiDAR device according to the embodiment may be a variation operation mode in which power consumed per unit time is lower than that in the basic operation mode of the LiDAR device according to the embodiment.

In addition, referring to FIGS. 16A and 16B, the second time interval 3522 between the fourth time point at which the fourth laser 3514 is emitted and the fifth time point at which the fifth laser 3515 is emitted in the variation operation mode of the LiDAR device according to the embodiment may be longer than the first time interval 3521 between the first time point at which the first laser 3511 is emitted and the second time point at which the second laser 3512 is emitted in the basic operation mode of the LiDAR device. Through this, in the variation operation mode of the LiDAR device, the number of times that the emitting unit is operated per unit time is reduced, so power consumed per unit time may be reduced.

In addition, referring to FIGS. 16A and 16B, in the variation operation mode of the LiDAR device according to the embodiment, the difference of the third angle between the fourth state of the optic unit and the fifth state of the optic unit may be greater than the difference of the first angle between the first state of the optic unit and the second state of the optic unit.

Figure 17A:
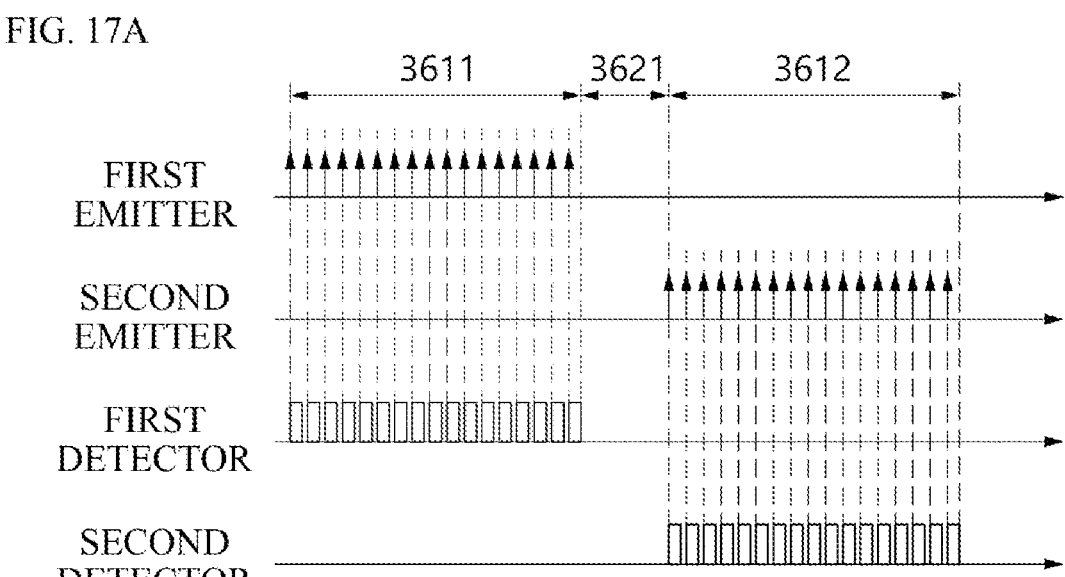
FIGS. 17A and 17B are diagrams illustrating operation of a LiDAR device depending on an operation mode according to an embodiment.
Figure 17B:
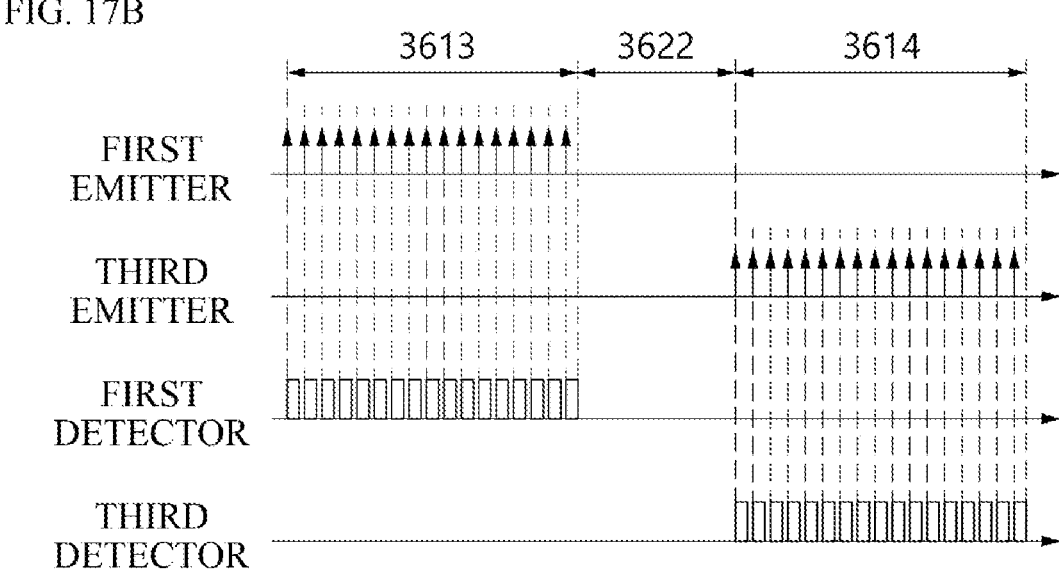

FIGS. 17A and 17B are diagrams illustrating operation of a LiDAR device depending on an operation mode according to an embodiment.

FIG. 17A is a diagram illustrating operation of a LiDAR device in a basic operation mode according to an embodiment. FIG. 17B is a diagram illustrating operation of the LiDAR device in a variation operation mode according to an embodiment.

However, the above-described details may be applied to FIGS. 17A and 17B, so a redundant description will be omitted.

Referring to FIG. 17A, in the basic operation mode of the LiDAR device according to the embodiment, a first emitter included in the emitting unit may be operated to emit lasers N times in a first sampling period 3611 for obtaining first point data, and a second emitter may be operated to emit lasers N times in a second sampling period 3612 for obtaining second point data.

Herein, the first sampling period 3611 and the second sampling period 3612 may be understood as a concept of including multiple time periods in which lasers are emitted to obtain data sets for obtaining histogram data for obtaining the respective first and second point data and the emitted lasers are detected. Each of the first sampling period 3611 and the second sampling period 3612 may mean the time period in which the first laser is emitted, data set is obtained on the basis of a result detected by a detector during the first detecting window for detecting the emitted laser, and the first operation is performed in the same manner N times. However, without being limited thereto, the first sampling period 3611 and the second sampling period 3612 may include the meaning understood as sampling periods by a person skilled in the art.

In addition, referring to FIG. 17A, in the basic operation mode of the LiDAR device according to the embodiment, the interval between the first sampling period 3611 and the second sampling period 3612 may be a first time interval 3621.

In addition, referring to FIG. 17B, in the variation operation mode of the LiDAR device according to the embodiment, the first emitter included in the emitting unit may be operated to emit lasers N times in a third sampling period 3613 for obtaining first point data, and a third emitter may be operated to emit lasers N times in a fourth sampling period 3614 for obtaining third point data.

Herein, the third sampling period 3613 and the fourth sampling period 3614 may be understood as a concept of including multiple time periods in which lasers are emitted to obtain data sets for obtaining histogram data for obtaining the respective first and third point data and the emitted lasers are detected. Each of the third sampling period 3613 and the fourth sampling period 3614 may mean the time period in which the first laser is emitted, data set is obtained on the basis of a result detected by a detector during the first detecting window for detecting the emitted laser, and the first operation is performed in the same manner N times. However, without being limited thereto, the third sampling period 3613 and the fourth sampling period 3614 may include the meaning understood as sampling periods by a person skilled in the art.

In addition, referring to FIG. 17B, in the variation operation mode of the LiDAR device according to the embodiment, the interval between the third sampling period 3613 and the fourth sampling period 3614 may be a second time interval 3622.

In addition, referring to FIGS. 17A and 17B, the variation operation mode of the LiDAR device according to the embodiment may be a variation operation mode in which power consumed per unit time is lower than that in the basic operation mode of the LiDAR device according to the embodiment.

In addition, referring to FIGS. 17A and 17B, a sequence for obtaining point data in the variation operation mode of the LiDAR device according to the embodiment may be different from a sequence for obtaining point data in the basic operation mode of the LiDAR device according to the embodiment.

For example, in the basic operation mode of the LiDAR device according to the embodiment, point data may be obtained in this sequence, first point data and second point data. In the variation operation mode of the LiDAR device according to the embodiment, point data may be obtained in this sequence, first point data and third point data. However, no limitation thereto is imposed.

In addition, referring to FIGS. 17A and 17B, the second time interval 3622, which is the interval between the third sampling period 3613 and the fourth sampling period 3614 in the variation operation mode of the LiDAR device according to the embodiment, may be longer than the first time interval 3621, which is the interval between the first sampling period 3611 and the second sampling period 3612 in the basic operation mode of the LiDAR device. Through this, in the variation operation mode of the LiDAR device, the number of times that the emitters are operated per unit time is reduced, so power consumed per unit time may be reduced.

In addition, the third emitter described above may be the same as the second emitter, but without being limited thereto, the third emitter and the second emitter may be different emitters. The third detector described above may be the same as the second detector, but without being limited thereto, the third detector and the second detector may be different detectors.

Figure 18A:
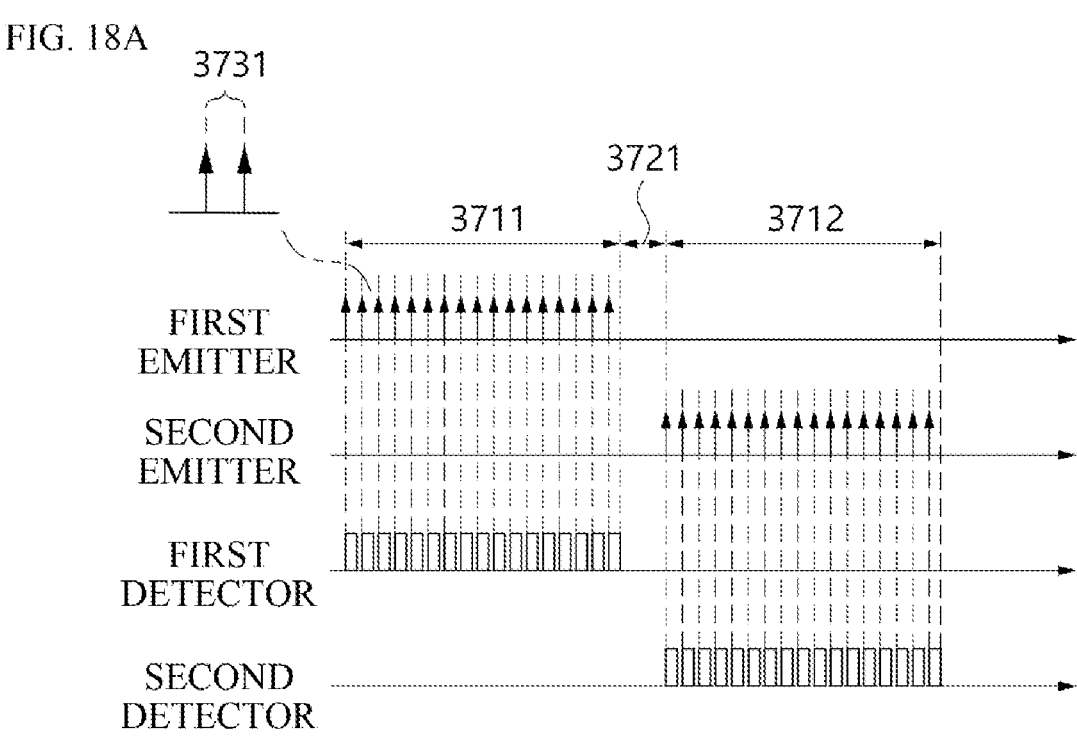
FIGS. 18A and 18B are diagrams illustrating operation of a LiDAR device depending on an operation mode according to an embodiment.
Figure 18B:
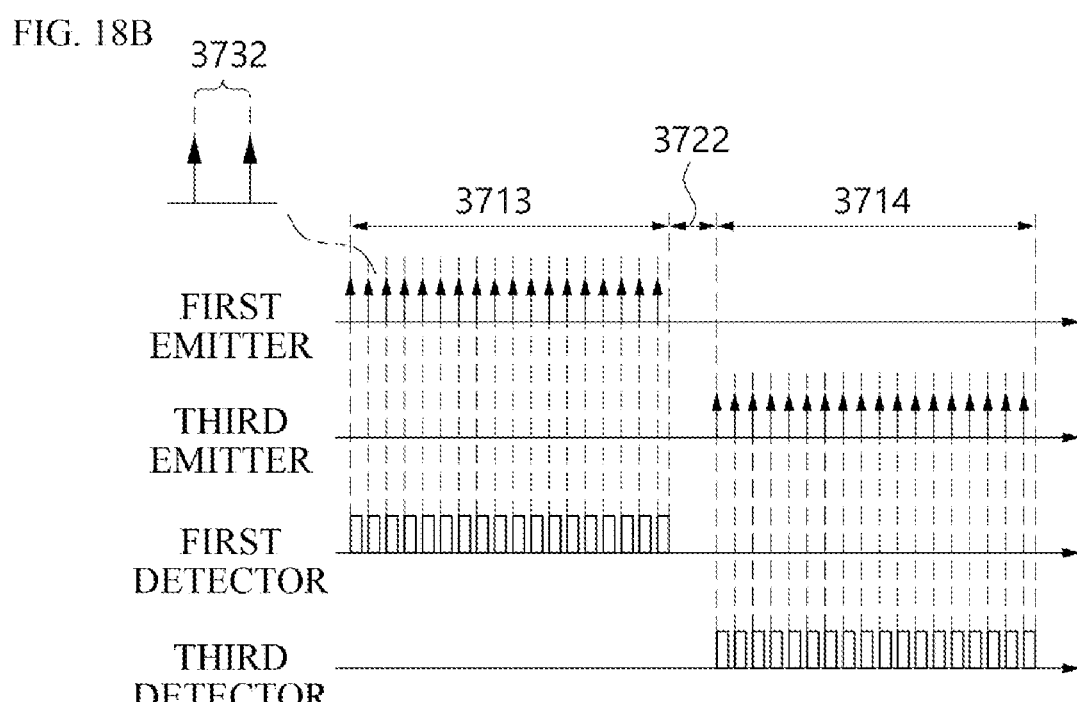

FIGS. 18A and 18B are diagrams illustrating operation of a LiDAR device depending on an operation mode according to an embodiment.

FIG. 18A is a diagram illustrating operation of a LiDAR device in a basic operation mode according to an embodiment. FIG. 18B is a diagram illustrating operation of the LiDAR device in a variation operation mode according to an embodiment.

However, the above-described details may be applied to FIGS. 18A and 18B, so a redundant description will be omitted.

Referring to FIG. 18A, in the basic operation mode of the LiDAR device according to the embodiment, a first emitter included in the emitting unit may be operated to emit lasers N times in a first sampling period 3711 for obtaining first point data, and a second emitter may be operated to emit lasers N times in a second sampling period 3712 for obtaining second point data.

Herein, the first sampling period 3711 and the second sampling period 3712 may be understood as a concept of including multiple time periods in which lasers are emitted to obtain data sets for obtaining histogram data for obtaining the respective first and second point data and the emitted lasers are detected. Each of the first sampling period 3711 and the second sampling period 3712 may mean the time period in which the first laser is emitted, data set is obtained on the basis of a result detected by a detector during the first detecting window for detecting the emitted laser, and the first operation is performed in the same manner N times. However, without being limited thereto, the first sampling period 3711 and the second sampling period 3712 may include the meaning understood as sampling periods by a person skilled in the art.

In addition, referring to FIG. 18A, in the basic operation mode of the LiDAR device according to the embodiment, the lasers adjacent in sequence and emitted within the first sampling period 3711 and the second sampling period 3712 may be emitted at predetermined time intervals.

For example, in the basic operation mode of the LiDAR device according to the embodiment, the third laser emitted in the first sampling period 3711 may be emitted after a first time interval 3731 after the second laser is emitted. However, no limitation thereto is imposed.

In addition, referring to FIG. 18A, in the basic operation mode of the LiDAR device according to the embodiment, the interval between the first sampling period 3711 and the second sampling period 3712 may be a second time interval 3721.

In addition, referring to FIG. 18B, in the variation operation mode of the LiDAR device according to the embodiment, the first emitter included in the emitting unit may be operated to emit lasers N times in a third sampling period 3713 for obtaining first point data, and a third emitter may be operated to emit lasers N times in a fourth sampling period 3714 for obtaining third point data.

Herein, the third sampling period 3713 and the fourth sampling period 3714 may be understood as a concept of including multiple time periods in which lasers are emitted to obtain data sets for obtaining histogram data for obtaining the respective first and third point data and the emitted lasers are detected. Each of the third sampling period 3713 and the fourth sampling period 3714 may mean the time period in which the first laser is emitted, data set is obtained on the basis of a result detected by a detector during the first detecting window for detecting the emitted laser, and the first operation is performed in the same manner N times. However, without being limited thereto, the third sampling period 3713 and the fourth sampling period 3714 may include the meaning understood as sampling periods by a person skilled in the art.

In addition, referring to FIG. 18B, in the basic operation mode of the LiDAR device according to the embodiment, the lasers adjacent in sequence and emitted within the third sampling period 3713 and the fourth sampling period 3714 may be emitted at predetermined time intervals.

For example, in the basic operation mode of the LiDAR device according to the embodiment, the third laser emitted in the third sampling period 3713 may be emitted after a third time interval 3732 after the second laser is emitted. However, no limitation thereto is imposed.

In addition, referring to FIG. 18B, in the basic operation mode of the LiDAR device according to the embodiment, the interval between the third sampling period 3713 and the fourth sampling period 3714 may be a fourth time interval 3722.

In addition, referring to FIGS. 18A and 18B, the variation operation mode of the LiDAR device according to the embodiment may be a variation operation mode in which power consumed per unit time is lower than that in the basic operation mode of the LiDAR device according to the embodiment.

In addition, referring to FIGS. 18A and 18B, a sequence for obtaining point data in the variation operation mode of the LiDAR device according to the embodiment may be different from a sequence for obtaining point data in the basic operation mode of the LiDAR device according to the embodiment.

For example, in the basic operation mode of the LiDAR device according to the embodiment, point data may be obtained in this sequence, first point data and second point data. In the variation operation mode of the LiDAR device according to the embodiment, point data may be obtained in this sequence, first point data and third point data. However, no limitation thereto is imposed.

In addition, referring to FIGS. 18A and 18B, the time interval between the lasers that are adjacent in sequence and emitted within the third and the fourth sampling period 3713 and 3714 in the variation operation mode of the LiDAR device according to the embodiment may be longer than the time interval between the lasers that are adjacent in sequence and emitted within the first and the second sampling period 3711 and 3712 in the basic operation mode of the LiDAR device.

For example, the third time interval 3732, which is the time interval between the second and the third laser in the third sampling period 3713 in the variation operation mode of the LiDAR device, may be longer than the first time interval 3731, which is the time interval between the second and the third laser in the first sampling period 3711 in the basic operation mode of the LiDAR device. However, no limitation thereto is imposed.

In addition, through this, in the variation operation mode of the LiDAR device, the number of times that the emitters are operated per unit time is reduced, so power consumed per unit time may be reduced.

In addition, referring to FIGS. 18A and 18B, the fourth time interval 3722, which is the interval between the third sampling period 3713 and the fourth sampling period 3714 in the variation operation mode of the LiDAR device according to the embodiment, may be the same as the second time interval 3721, which is the interval between the first sampling period 3711 and the second sampling period 3712 in the basic operation mode of the LiDAR device. However, no limitation thereto is imposed.

In addition, the third emitter described above may be the same as the second emitter, but without being limited thereto, the third emitter and the second emitter may be different emitters. The third detector described above may be the same as the second detector, but without being limited thereto, the third detector and the second detector may be different detectors.

Figure 19:
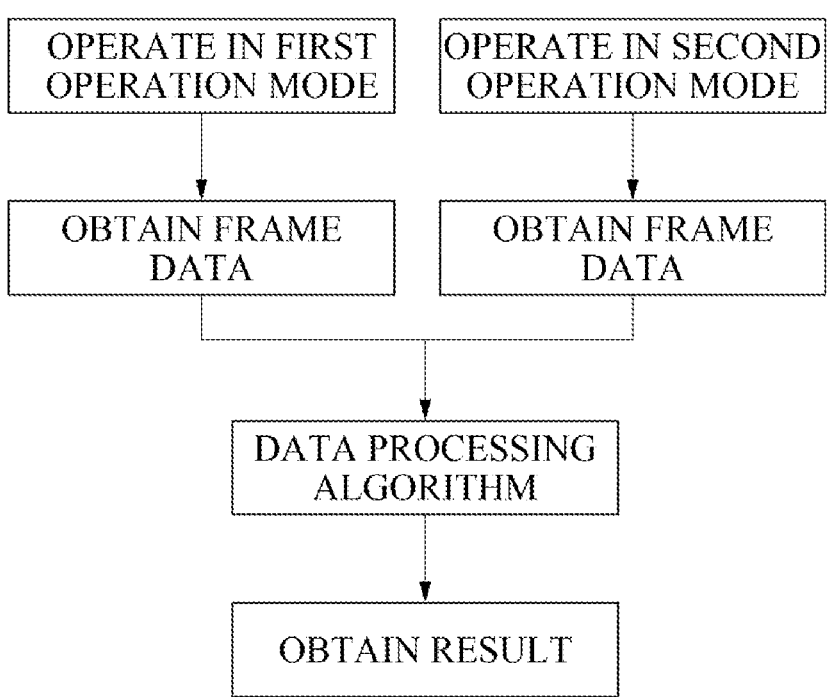
FIG. 19 is a diagram illustrating processing of frame data obtained in an operation mode of a LiDAR device according to an embodiment.

FIG. 19 is a diagram illustrating processing of frame data obtained in an operation mode of a LiDAR device according to an embodiment.

Referring to FIG. 19, the LiDAR device according to the embodiment may operate in a first operation mode or a second operation mode.

Herein, various embodiments of the above-described basic operation mode and variation operation mode may be applied to the first operation mode and the second operation mode, so a redundant description will be omitted.

Frame data may be obtained in the first operation mode of the LiDAR device according to the embodiment, and frame data may be obtained in the second operation mode of the LiDAR device according to the embodiment.

Herein, the frame data obtained in the first operation mode and the frame data obtained in the second operation mode may be frame data in the same prescribed format, but without being limited thereto, may be frame data in different prescribed formats. To this, the above-described details may be applied, so a redundant description will be omitted.

In addition, a data processing algorithm may be performed on frame data obtained in the first operation mode of the LiDAR device according to the embodiment.

Herein, the details described above with reference to FIGS. 8 and 9 may be applied to the data processing algorithm, so a redundant description will be omitted.

In addition, when the data processing algorithm is performed on the frame data obtained in the first operation mode of the LiDAR device according to the embodiment, at least one property value is obtained.

However, the above-described details may be applied thereto, so a redundant description will be omitted.

In addition, a data processing algorithm may be performed on frame data obtained in the second operation mode of the LiDAR device according to the embodiment.

Herein, the details described above with reference to FIGS. 8 and 9 may be applied to the data processing algorithm, so a redundant description will be omitted.

In addition, when the data processing algorithm is performed on the frame data obtained in the second operation mode of the LiDAR device according to the embodiment, at least one property value is obtained.

However, the above-described details may be applied thereto, so a redundant description will be omitted.

In addition, the same data processing algorithm may be performed on frame data obtained in the first operation mode and the second operation mode of the LiDAR device according to the embodiment.

For example, the same data processing algorithm to which the details described above with reference to FIGS. 8 and 9 are applied may be performed on the frame data obtained in the first operation mode and the second operation mode of the LiDAR device according to the embodiment. As a result of this, a property value for at least one sub point data set may be obtained. However, no limitation thereto is imposed.

Figure 20:
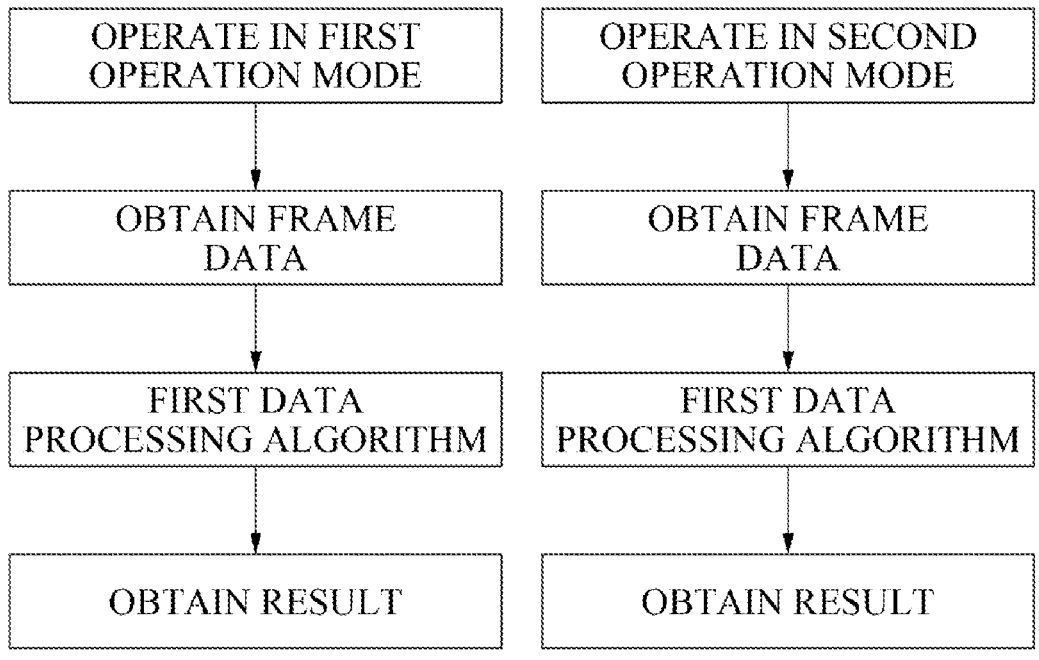
FIG. 20 is a diagram illustrating processing of frame data obtained in an operation mode of a LiDAR device according to an embodiment.

FIG. 20 is a diagram illustrating processing of frame data obtained in an operation mode of a LiDAR device according to an embodiment.

Referring to FIG. 20, the LiDAR device according to the embodiment may operate in a first operation mode or a second operation mode.

Herein, various embodiments of the above-described basic operation mode and variation operation mode may be applied to the first operation mode and the second operation mode, so a redundant description will be omitted.

Frame data may be obtained in the first operation mode of the LiDAR device according to the embodiment, and frame data may be obtained in the second operation mode of the LiDAR device according to the embodiment.

Herein, the frame data obtained in the first operation mode and the frame data obtained in the second operation mode may be frame data in the same prescribed format, but without being limited thereto, may be frame data in different prescribed formats. To this, the above-described details may be applied, so a redundant description will be omitted.

In addition, a first data processing algorithm may be performed on frame data obtained in the first operation mode of the LiDAR device according to the embodiment.

Herein, the details described above with reference to FIGS. 8 and 9 may be applied to the first data processing algorithm, so a redundant description will be omitted.

In addition, the first data processing algorithm may include a data processing algorithm for generating at least one trigger for switching from the first operation mode to the second operation mode.

For example, the first data processing algorithm may include an algorithm for generating trigger information for switching from the first operation mode to the second operation mode when the frame data obtained in the first operation mode satisfies a predetermined condition. However, no limitation thereto is imposed.

In addition, when the first data processing algorithm is performed on the frame data obtained in the first operation mode of the LiDAR device according to the embodiment, at least one property value is obtained.

However, the above-described details may be applied thereto, so a redundant description will be omitted.

In addition, a second data processing algorithm may be performed on frame data obtained in the second operation mode of the LiDAR device according to the embodiment.

Herein, the details described above with reference to FIGS. 8 and 9 may be applied to the second data processing algorithm, so a redundant description will be omitted.

In addition, the second data processing algorithm may include a data processing algorithm for generating at least one trigger for switching from the second operation mode to the first operation mode.

For example, the second data processing algorithm may include an algorithm for generating trigger information for switching from the second operation mode to the first operation mode when the frame data obtained in the second operation mode satisfies a predetermined condition. However, no limitation thereto is imposed.

In addition, when the second data processing algorithm is performed on the frame data obtained in the second operation mode of the LiDAR device according to the embodiment, at least one property value is obtained.

However, the above-described details may be applied thereto, so a redundant description will be omitted.

In addition, different data processing algorithms may be performed on frame data obtained in the first operation mode and the second operation mode of the LiDAR device according to the embodiment.

For example, a first data processing algorithm may be performed on the frame data obtained in the first operation mode of the LiDAR device according to the embodiment, and a second data processing algorithm may be performed on the frame data obtained in the second operation mode of the LiDAR device. The first data processing algorithm and the second data processing algorithm may differ. As a result of the first data processing algorithm, a property value for a sub point data set included in the frame data obtained in the first operation mode may be obtained. As a result of the second data processing algorithm, at least one trigger for switching from the second operation mode to the first operation mode may be obtained. However, no limitation thereto is imposed.

Figure 21:
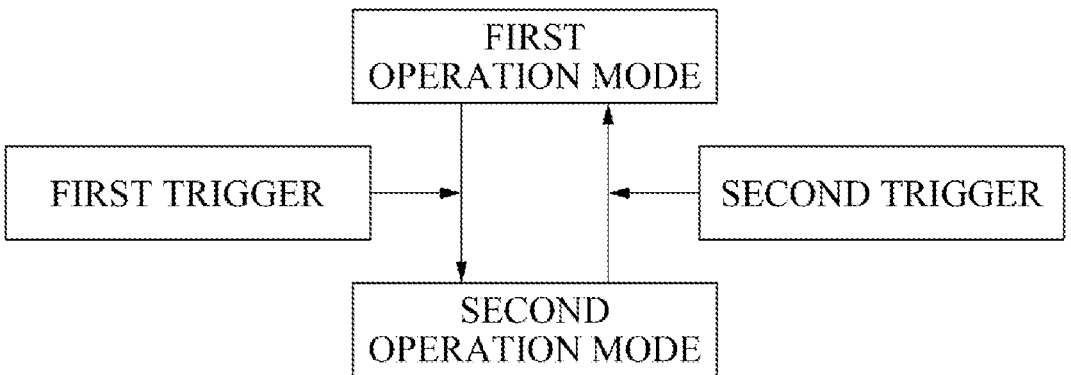
FIG. 21 is a diagram illustrating switching between operation modes of a LiDAR device according to an embodiment.

FIG. 21 is a diagram illustrating switching between operation modes of a LiDAR device according to an embodiment.

Referring to FIG. 21, the LiDAR device according to the embodiment may operate in a first operation mode or in a second operation mode. When a first trigger is obtained while the LiDAR device is in operation in the first operation mode, switching to the second operation mode takes place and the LiDAR device is operated. When a second trigger is obtained while the LiDAR device is in operation in the second operation mode, switching to the first operation mode takes place and the LiDAR device is operated. However, no limitation thereto is imposed.

Herein, various embodiments of the above-described basic operation mode and variation operation mode may be applied to the first operation mode and the second operation mode, so a redundant description will be omitted.

In addition, herein, the first trigger and the second trigger may include triggers variously obtained, and various embodiments of the first trigger and the second trigger will be described below.

The first trigger may include a trigger for time information.

For example, the first trigger may be generated on the basis of information on the time when the LiDAR device is operated in the first operation mode. As a more specific example, the first trigger is obtained when the LiDAR device obtains one piece of frame data in the first operation mode. However, no limitation thereto is imposed.

In addition, the second trigger may include a trigger for time information.

For example, the second trigger may be generated on the basis of information on the time when the LiDAR device is operated in the second operation mode. As a more specific example, when the LiDAR device obtains one piece of frame data in the second operation mode, the second trigger is obtained. However, no limitation thereto is imposed.

In addition, the first trigger may include a trigger based on frame data obtained in the first operation mode.

For example, the first trigger may be obtained on the basis of a property obtained for the frame data that is obtained as the LiDAR device is operated in the first operation mode. As a more specific example, the first trigger is obtained when the property obtained for the frame data that is obtained as the LiDAR device is operated in the first operation mode has no property related to a person. However, no limitation thereto is imposed.

In addition, for example, the first trigger may be obtained on the basis of at least one piece of point data included in the frame data that is obtained as the LiDAR device is operated in the first operation mode. As a more specific example, the first trigger is obtained when a distance value of at least one piece of point data included in the frame data that is obtained as the LiDAR device is operated in the first operation mode does not change by a predetermined amount or more for multiple pieces of frame data. However, no limitation thereto is imposed.

In addition, for example, the first trigger may be obtained on the basis of at least a portion of a sub point data set included in the frame data that is obtained as the LiDAR device is operated in the first operation mode. As a more specific example, the first trigger is obtained when a distance value of at least a portion of a sub point data set included in the frame that is obtained as the LiDAR device is operated in the first operation mode does not change by a predetermined amount or more for multiple pieces of frame data. However, no limitation thereto is imposed.

In addition, for example, the first trigger may be obtained on the basis of at least a portion of a sub point data set included in the frame data that is obtained as the LiDAR device is operated in the first operation mode. As a more specific example, the first trigger is obtained when a distance value of at least a portion of a sub point data set included in the frame data that is obtained as the LiDAR device is operated in the first operation mode is equal to or greater than a predetermined distance value (for example, when a distance value of a sub point data set for a person is out of the range of interest). However, no limitation thereto is imposed.

In addition, the second trigger may include a trigger based on frame data obtained in the second operation mode.

For example, the second trigger may be obtained on the basis of a property obtained for the frame data that is obtained as the LiDAR device is operated in the second operation mode. As a more specific example, the second trigger is obtained when a property related to a person is generated in the property obtained for the frame data that is obtained as the LiDAR device is operated in the second operation mode. However, no limitation thereto is imposed.

In addition, for example, the second trigger may be obtained on the basis of at least one piece of point data included in the frame data that is obtained as the LiDAR device is operated in the second operation mode. As a more specific example, the second trigger is obtained when a distance value of at least one piece of point data included in the frame data that is obtained as the LiDAR device is operated in the second operation mode changes by a predetermined amount or more for multiple pieces of frame data. However, no limitation thereto is imposed.

In addition, for example, the second trigger may be obtained on the basis of at least a portion of a sub point data set included in the frame data that is obtained as the LiDAR device is operated in the second operation mode. As a more specific example, the second trigger is obtained when a distance value of at least a portion of a sub point data set included in the frame data that is obtained as the LiDAR device is operated in the second operation mode changes by a predetermined amount or more for multiple pieces of frame data. However, no limitation thereto is imposed.

In addition, for example, the second trigger may be obtained on the basis of at least a portion of a sub point data set included in the frame data that is obtained as the LiDAR device is operated in the second operation mode. As a more specific example, the second trigger is obtained when a distance value of at least a portion of a sub point data set included in the frame data that is obtained as the LiDAR device is operated in the second operation mode is equal to or lower than a predetermined distance value (for example, when a distance value of a sub point data set for a person enters the range of interest). However, no limitation thereto is imposed.

In addition, for example, the second trigger may be obtained on the basis of at least a portion of a sub point data set included in the frame data that is obtained as the LiDAR device is operated in the second operation mode. As a more specific example, the second trigger is obtained when a motion is detected for at least a portion of a sub point data set included in the frame data that is obtained as the LiDAR device is operated in the second operation mode. However, no limitation thereto is imposed.

In addition, the first trigger may be obtained on the basis of data obtained from another sensor. Herein, examples of the sensor may include a camera sensor, a motion sensor, and a weather sensor, but are not limited thereto.

For example, the first trigger may be obtained on the basis of data obtained from a motion sensor. As a more specific example, the first trigger is obtained when the LiDAR device obtains, from the motion sensor, data indicating that there is no motion within a predetermined range. However, no limitation thereto is imposed.

In addition, the second trigger may be obtained on the basis of data obtained from another sensor. Herein, examples of the sensor may include a camera sensor, a motion sensor, and a weather sensor, but are not limited thereto.

For example, the second trigger may be obtained on the basis of data obtained from a motion sensor. As a more specific example, the second trigger is obtained when the LiDAR device obtains, from the motion sensor, data indicating that motion has occurred within a predetermined range. However, no limitation thereto is imposed.

In addition, when the LiDAR device is disposed at a first device, the first trigger is obtained on the basis of data obtained from the first device. Herein, examples of the first device may include a vehicle, and an infrastructure, but are not limited thereto.

For example, when the first device at which the LiDAR device is disposed is a vehicle, data related to stop is obtained from the vehicle and the first trigger is obtained on the basis of the data related to stop. However, no limitation thereto is imposed.

In addition, for example, when the first device at which the LiDAR device is disposed is a vehicle, data related to engine off is obtained from the vehicle and the first trigger is obtained on the basis of the data related to engine off. However, no limitation thereto is imposed.

In addition, for example, when the first device at which the LiDAR device is disposed is a vehicle, data related to gear change is obtained from the vehicle and the first trigger is obtained on the basis of the data related to gear change. However, no limitation thereto is imposed.

In addition, for example, when the first device at which the LiDAR device is disposed is a vehicle, data related to speed is obtained from the vehicle and the first trigger is obtained on the basis of the data related to speed. However, no limitation thereto is imposed.

In addition, for example, when the first device at which the LiDAR device is disposed is a vehicle, data indicating that the speed is equal to or slower than a predetermined speed is obtained from the vehicle and the first trigger is obtained on the basis of the data indicating that the speed is equal to or slower than the predetermined speed. However, no limitation thereto is imposed.

In addition, for example, when the first device at which the LiDAR device is disposed is a vehicle, data related to entering and leaving a particular area is obtained from the vehicle and the first trigger is obtained on the basis of the data related to entering and leaving the particular area. However, no limitation thereto is imposed.

In addition, for example, when the first device at which the LiDAR device is disposed is a vehicle, data related to remaining battery life is obtained from the vehicle and the first trigger is obtained on the basis of the data related to the remaining battery life. However, no limitation thereto is imposed.

In addition, for example, when the first device at which the LiDAR device is disposed is a vehicle, data related to remaining battery life and a distance to a target point is obtained from the vehicle and the first trigger is obtained on the basis of the data related to the remaining battery life and the distance to the target point. However, no limitation thereto is imposed.

In addition, for example, when the first device at which the LiDAR device is disposed is a vehicle, data related to a driver assistance mode (ADAS) is obtained from the vehicle and the first trigger is obtained on the basis of data related to a fully autonomous driving mode (AD). However, no limitation thereto is imposed.

In addition, for example, when the first device at which the LiDAR device is disposed is an infrastructure, data related to time information is obtained from the infrastructure and the first trigger is obtained on the basis of the data related to the time information. However, no limitation thereto is imposed. (This may be to operate in the second operation mode from 10 p.m. to 6 a.m. during which population flow is low. However, no limitation thereto is imposed.)

In addition, for example, when the first device at which the LiDAR device is disposed is an infrastructure, data related to signal information is obtained from the infrastructure and the first trigger is obtained on the basis of the data related to the signal information. However, no limitation thereto is imposed.

In addition, for example, when the first device at which the LiDAR device is disposed is an infrastructure, data related to the situation in which a vehicle leaves is obtained from the infrastructure and the first trigger is obtained on the basis of the data related to the situation in which the vehicle leaves. However, no limitation thereto is imposed.

In addition, when the LiDAR device is disposed at a first device, the second trigger is obtained on the basis of data obtained from the first device. Herein, examples of the first device may include a vehicle, and an infrastructure, but are not limited thereto.

For example, when the first device at which the LiDAR device is disposed is a vehicle, data related to departure is obtained from the vehicle and the second trigger is obtained on the basis of the data related to the departure. However, no limitation thereto is imposed.

In addition, for example, when the first device at which the LiDAR device is disposed is a vehicle, data related to engine on is obtained from the vehicle and the second trigger is obtained on the basis of the data related to engine on. However, no limitation thereto is imposed.

In addition, for example, when the first device at which the LiDAR device is disposed is a vehicle, data related to gear change is obtained from the vehicle and the first trigger is obtained on the basis of the data related to gear change. However, no limitation thereto is imposed.

In addition, for example, when the first device at which the LiDAR device is disposed is a vehicle, data related to speed is obtained from the vehicle and the second trigger is obtained on the basis of the data related to speed. However, no limitation thereto is imposed.

In addition, for example, when the first device at which the LiDAR device is disposed is a vehicle, data indicating that the speed is equal to or faster than a predetermined speed is obtained from the vehicle and the second trigger is obtained on the basis of the data indicating that the speed is equal to or faster than the predetermined speed. However, no limitation thereto is imposed.

In addition, for example, when the first device at which the LiDAR device is disposed is a vehicle, data related to entering and leaving a particular area is obtained from the vehicle and the second trigger is obtained on the basis of the data related to entering and leaving the particular area. However, no limitation thereto is imposed.

In addition, for example, when the first device at which the LiDAR device is disposed is a vehicle, data related to remaining battery life is obtained from the vehicle and the second trigger is obtained on the basis of the data related to the remaining battery life. However, no limitation thereto is imposed.

In addition, for example, when the first device at which the LiDAR device is disposed is a vehicle, data related to remaining battery life and a distance to a target point is obtained from the vehicle and the second trigger is obtained on the basis of the data related to the remaining battery life and the distance to the target point. However, no limitation thereto is imposed.

In addition, for example, when the first device at which the LiDAR device is disposed is a vehicle, data related to a fully autonomous driving mode (AD) is obtained from the vehicle and the second trigger is obtained on the basis of data related to a driver assistance mode (ADAS). However, no limitation thereto is imposed.

In addition, for example, when the first device at which the LiDAR device is disposed is an infrastructure, data related to time information is obtained from the infrastructure and the second trigger is obtained on the basis of the data related to the time information. However, no limitation thereto is imposed. (This may be to operate in the first operation mode from 6 a.m. to 10 p.m. during which population flow is high. However, no limitation thereto is imposed.)

In addition, for example, when the first device at which the LiDAR device is disposed is an infrastructure, data related to signal information is obtained from the infrastructure and the second trigger is obtained on the basis of the data related to the signal information. However, no limitation thereto is imposed.

In addition, for example, when the first device at which the LiDAR device is disposed is an infrastructure, data related to the situation in which a vehicle enters is obtained from the infrastructure and the second trigger is obtained on the basis of the data related to the situation in which the vehicle enters. However, no limitation thereto is imposed.

In addition, when the LiDAR device is disposed at a first device, the first trigger is obtained from the first device. Herein, examples of the first device may include a vehicle, and an infrastructure, but are not limited thereto.

For example, when the first device at which the LiDAR device is disposed is a vehicle and when the vehicle is stopped, the first trigger is obtained. However, no limitation thereto is imposed.

In addition, for example, when the first device at which the LiDAR device is disposed is a vehicle and when the engine of the vehicle is turned off, the first trigger is obtained. However, no limitation thereto is imposed.

In addition, for example, when the first device at which the LiDAR device is disposed is a vehicle and when the gear of the vehicle is changed, the first trigger is obtained. As a more specific example, when the gear of the vehicle is changed to Neutral (N), the first trigger is obtained. However, no limitation thereto is imposed.

In addition, for example, when the first device at which the LiDAR device is disposed is a vehicle and when the speed of the vehicle is equal to or slower than a predetermined speed, the first trigger is obtained. However, no limitation thereto is imposed.

In addition, for example, when the first device at which the LiDAR device is disposed is a vehicle and when the vehicle leaves a particular area, the first trigger is obtained. However, no limitation thereto is imposed.

In addition, for example, when the first device at which the LiDAR device is disposed is a vehicle and when the battery of the vehicle has a value equal to or lower than a predetermined value, the first trigger is obtained. However, no limitation thereto is imposed.

In addition, for example, when the first device at which the LiDAR device is disposed is a vehicle, the first trigger is obtained on the basis of a value of the battery of the vehicle and a distance to a target point. However, no limitation thereto is imposed.

In addition, for example, when the first device at which the LiDAR device is disposed is a vehicle and when the mode of the vehicle is switched from a fully autonomous driving mode (AD) to a driver assistance mode (ADAS), the first trigger is obtained. However, no limitation thereto is imposed.

In addition, for example, when the first device at which the LiDAR device is disposed is an infrastructure and when the time in the region at which the infrastructure is disposed is 10 p.m., the first trigger is obtained. However, no limitation thereto is imposed.

In addition, for example, when the first device at which the LiDAR device is disposed is an infrastructure, the first trigger is obtained on the basis of signal information of the region at which the infrastructure is disposed. However, no limitation thereto is imposed.

In addition, for example, when the first device at which the LiDAR device is disposed is an infrastructure, the first trigger is obtained on the basis of information on the situation in which a vehicle in a parking lot at which the infrastructure is disposed leaves the parking lot. However, no limitation thereto is imposed.

In addition, when the LiDAR device is disposed at a first device, the second trigger is obtained from the first device. Herein, examples of the first device may include a vehicle, and an infrastructure, but are not limited thereto.

For example, when the first device at which the LiDAR device is disposed is a vehicle and when the vehicle starts, the second trigger is obtained. However, no limitation thereto is imposed.

In addition, for example, when the first device at which the LiDAR device is disposed is a vehicle and when the engine of the vehicle is turned on, the second trigger is obtained. However, no limitation thereto is imposed.

In addition, for example, when the first device at which the LiDAR device is disposed is a vehicle and when the gear of the vehicle is changed to Drive (D), the second trigger is obtained. However, no limitation thereto is imposed.

In addition, for example, when the first device at which the LiDAR device is disposed is a vehicle and when the speed of the vehicle is equal to or faster than a predetermined speed, the second trigger is obtained. However, no limitation thereto is imposed.

In addition, for example, when the first device at which the LiDAR device is disposed is a vehicle and when the vehicle enters a particular area, the second trigger is obtained. However, no limitation thereto is imposed.

In addition, for example, when the first device at which the LiDAR device is disposed is a vehicle and when the remaining battery life of the vehicle increases, the second trigger is obtained. However, no limitation thereto is imposed.

In addition, for example, when the first device at which the LiDAR device is disposed is a vehicle and when the mode of the vehicle is switched from a driver assistance mode (ADAS) to a fully autonomous driving mode (AD), the second trigger is obtained. However, no limitation thereto is imposed.

In addition, for example, when the first device at which the LiDAR device is disposed is an infrastructure and when the time in the region at which the infrastructure is disposed is 6 a.m., the second trigger is obtained. However, no limitation thereto is imposed.

In addition, for example, when the first device at which the LiDAR device is disposed is an infrastructure, the second trigger is obtained on the basis of signal information of the region at which the infrastructure is disposed. However, no limitation thereto is imposed.

In addition, for example, when the first device at which the LiDAR device is disposed is an infrastructure, the second trigger is obtained on the basis of information on the situation in which a vehicle enters a parking lot at which the infrastructure is disposed. However, no limitation thereto is imposed.

In addition, the first trigger and the second trigger may be obtained by a user's input.

In addition, the first trigger and the second trigger may be obtained from a combination of at least two of the above-described conditions. However, no limitation thereto is imposed.

Figure 22:
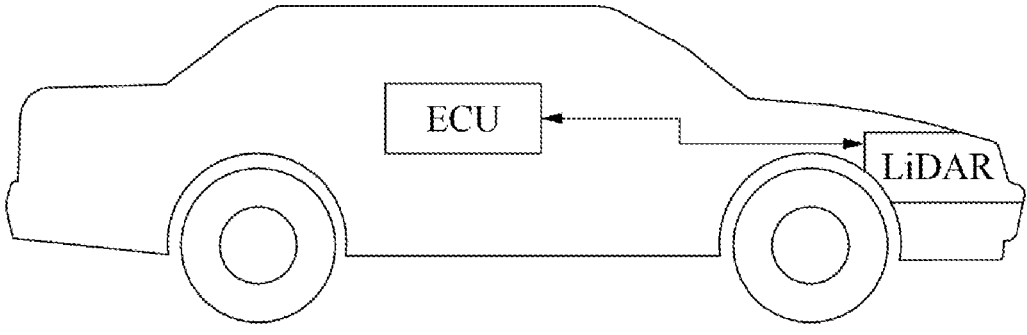
FIG. 22 is a diagram illustrating a LiDAR device equipped with a smart power management system and disposed at a vehicle.

FIG. 22 is a diagram illustrating a LiDAR device equipped with a smart power management system and disposed in a vehicle.

Herein, the smart power management system may mean a LiDAR system that may be operated in operation modes including the basic operation mode and the variation operation mode described above. The above-described details may be applied to the smart power management system, so a redundant description will be omitted.

In FIG. 22, a trigger for switching the operation modes of the LiDAR device equipped with the smart power management system will be mainly described.

In addition, the LiDAR device may obtain at least one piece of information from an ECU disposed in a vehicle, which may be described as obtaining the at least one piece of information from the vehicle for convenience of description.

The LiDAR device according to the embodiment may operate in at least a first operation mode and a second operation mode. When a first trigger is obtained in the first operation mode, switching to the second operation mode takes place. When a second trigger is obtained in the second operation mode, switching to the first operation mode takes place.

In addition, the second operation mode may be an operation mode in which power consumption per unit time is lower than that in the first operation mode. To this, the above-described details of the various embodiments of the basic operation mode and the variation operation mode may be applied, so a redundant description will be omitted.

When the LiDAR device according to the embodiment obtains the first trigger while operating in the first operation mode, the mode of the LiDAR device is switched to the second operation mode and the LiDAR device is operated.

For example, while the LiDAR device is operated in the first operation mode, the LiDAR device obtains the first trigger from the vehicle when the vehicle at which the LiDAR device is disposed stops. When the first trigger is obtained, the mode of the LiDAR device is switched from the first operation mode to the second operation mode and the LiDAR device is operated. However, no limitation thereto is imposed.

In addition, for example, while the LiDAR device is operated in the first operation mode, the LiDAR device obtains the first trigger from the vehicle when the engine of the vehicle at which the LiDAR device is disposed is turned off. When the first trigger is obtained, the mode of the LiDAR device is switched from the first operation mode to the second operation mode and the LiDAR device is operated. However, no limitation thereto is imposed.

In addition, for example, while the LiDAR device is operated in the first operation mode, the LiDAR device obtains the first trigger from the vehicle when the gear of the vehicle at which the LiDAR device is disposed is changed to Neutral (N). When the first trigger is obtained, the mode of the LiDAR device is switched from the first operation mode to the second operation mode and the LiDAR device is operated. However, no limitation thereto is imposed.

In addition, for example, while the LiDAR device is operated in the first operation mode, the LiDAR device obtains the first trigger from the vehicle when the speed of the vehicle at which the LiDAR device is disposed is equal to or slower than a predetermined speed. When the first trigger is obtained, the mode of the LiDAR device is switched from the first operation mode to the second operation mode and the LiDAR device is operated. However, no limitation thereto is imposed.

In addition, for example, while the LiDAR device is operated in the first operation mode, the LiDAR device obtains the first trigger from the vehicle when the vehicle at which the LiDAR device is disposed leaves a particular area (e.g., a child protection zone). When the first trigger is obtained, the mode of the LiDAR device is switched from the first operation mode to the second operation mode and the LiDAR device is operated. However, no limitation thereto is imposed.

In addition, for example, while the LiDAR device is operated in the first operation mode, the LiDAR device obtains the first trigger from the vehicle when the battery of the vehicle at which the LiDAR device is disposed has a value equal to or lower than a predetermined value. When the first trigger is obtained, the mode of the LiDAR device is switched from the first operation mode to the second operation mode and the LiDAR device is operated. However, no limitation thereto is imposed.

In addition, for example, while the LiDAR device is operated in the first operation mode, the LiDAR device obtains the first trigger when the mode of the vehicle at which the LiDAR device is disposed is switched from a fully autonomous driving mode (AD) to a driver assistance mode (ADAS). When the first trigger is obtained, the mode of the LiDAR device is switched from the first operation mode to the second operation mode and the LiDAR device is operated. However, no limitation thereto is imposed.

In addition, for example, while operating in the first operation mode, when the vehicle at which the LiDAR device is disposed has operated in a fully autonomous driving mode (AD) and enters a driver assistance mode (ADAS) because the battery of the vehicle has a value equal to lower than a predetermined value, the LiDAR device obtains the first trigger. When the first trigger is obtained, the mode of the LiDAR device is switched from the first operation mode to the second operation mode and the LiDAR device is operated. However, no limitation thereto is imposed.

In addition, for example, while operating in the first operation mode, when the vehicle at which the LiDAR device is disposed has operated in a fully autonomous driving mode (AD) and enters a driver assistance mode (ADAS) because of the driver in the vehicle, the LiDAR device obtains the first trigger. When the first trigger is obtained, the mode of the LiDAR device is switched from the first operation mode to the second operation mode and the LiDAR device is operated. However, no limitation thereto is imposed.

In addition, when the LiDAR device according to the embodiment obtains the second trigger while operating in the second operation mode, the mode of the LiDAR device is switched to the first operation mode and the LiDAR device is operated.

For example, while operating in the second operation mode, the LiDAR device obtains the second trigger when a distance value of at least one piece of point data included in frame data obtained in the second operation mode changes by a predetermined amount or more for multiple pieces of frame data. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a distance value of at least a portion of a sub point data set included in frame data obtained in the second operation mode changes by a predetermined amount or more for multiple pieces of frame data. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a distance value of at least a portion of a sub point data set included in frame data obtained in the second operation mode is equal to or lower than a predetermined distance value. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a motion is detected for at least a portion of a sub point data set included in frame data obtained in the second operation mode. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger from the vehicle when the vehicle at which the LiDAR device is disposed starts. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger from the vehicle when the engine of the vehicle at which the LiDAR device is disposed is turned on. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger from the vehicle when the gear of the vehicle at which the LiDAR device is disposed is changed to Drive (D). When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger from the vehicle when the speed of the vehicle at which the LiDAR device is disposed is equal to or faster than a predetermined speed. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger from the vehicle when the remaining battery life of the vehicle at which the LiDAR device is disposed increases. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when the mode of the vehicle at which the LiDAR device is disposed is switched from a driver assistance mode (ADAS) to a fully autonomous driving mode (AD). When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when the vehicle at which the LiDAR device is disposed receives a request for data transmission from another vehicle. When the second trigger is obtained, the mode of the LiDAR device is switched from the second operation mode to the first operation mode and the LiDAR device is operated. However, no limitation thereto is imposed.

Figure 23:
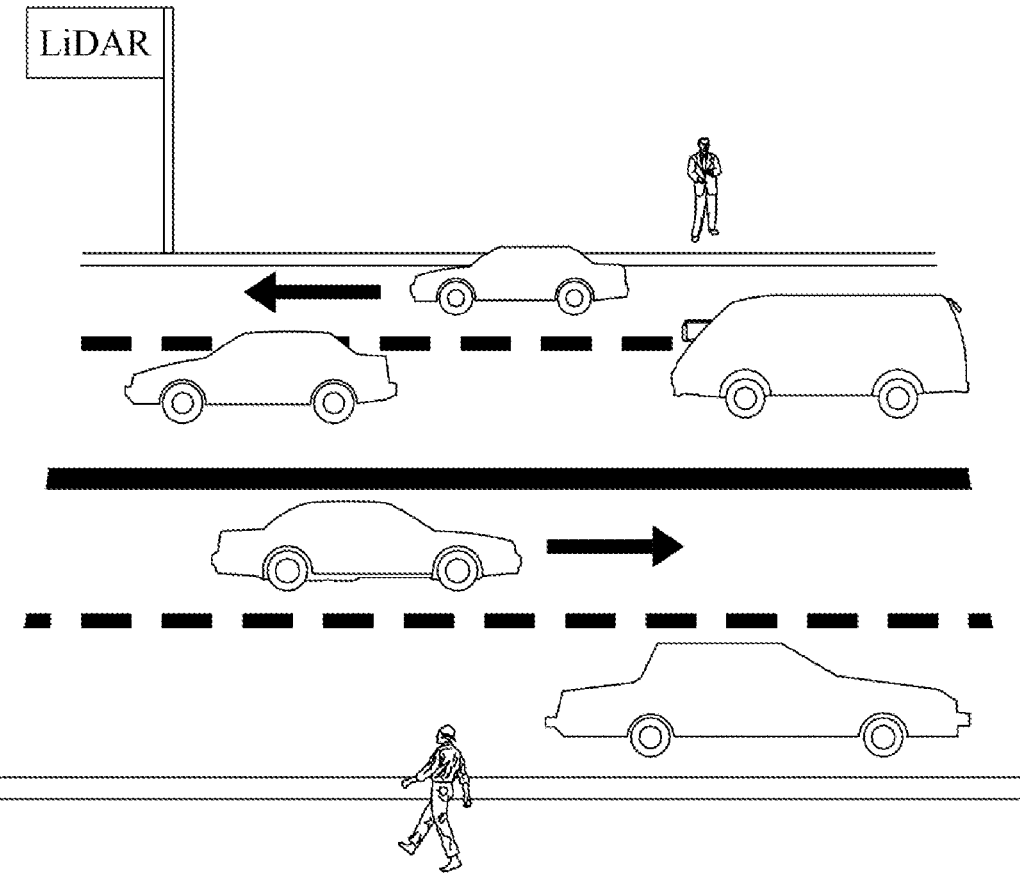
FIG. 23 is a diagram illustrating a LiDAR device equipped with a smart power management system and disposed at an infrastructure.

FIG. 23 is a diagram illustrating a LiDAR device equipped with a smart power management system and disposed at an infrastructure.

Herein, the smart power management system may mean a LiDAR system that may be operated in operation modes including the basic operation mode and the variation operation mode described above. The above-described details may be applied to the smart power management system, so a redundant description will be omitted.

In FIG. 23, a trigger for switching the operation modes of the LiDAR device equipped with the smart power management system will be mainly described.

The LiDAR device according to the embodiment may operate in at least a first operation mode and a second operation mode. When a first trigger is obtained in the first operation mode, switching to the second operation mode takes place. When a second trigger is obtained in the second operation mode, switching to the first operation mode takes place.

In addition, the second operation mode may be an operation mode in which power consumption per unit time is lower than that in the first operation mode. To this, the above-described details of the various embodiments of the basic operation mode and the variation operation mode may be applied, so a redundant description will be omitted.

When the LiDAR device according to the embodiment obtains the first trigger while operating in the first operation mode, the mode of the LiDAR device is switched to the second operation mode and the LiDAR device is operated.

For example, while operating in the first operation mode, the LiDAR device obtains the first trigger when the property obtained for frame data obtained in the first operation mode has no property related to a person. When the first trigger is obtained, the mode of the LiDAR device is switched from the first operation mode to the second operation mode and the LiDAR device is operated. However, no limitation thereto is imposed.

In addition, for example, while operating in the first operation mode, the LiDAR device obtains the first trigger when the property obtained for frame data obtained in the first operation mode has no property related to a vehicle. When the first trigger is obtained, the mode of the LiDAR device is switched from the first operation mode to the second operation mode and the LiDAR device is operated. However, no limitation thereto is imposed.

In addition, for example, while operating in the first operation mode, the LiDAR device obtains the first trigger when the property obtained for frame data obtained in the first operation mode has a property related to a vehicle, but the speed value of the property related to the vehicle is equal to or lower than a predetermined value. When the first trigger is obtained, the mode of the LiDAR device is switched from the first operation mode to the second operation mode and the LiDAR device is operated. However, no limitation thereto is imposed.

In addition, for example, while operating in the first operation mode, the LiDAR device obtains the first trigger when a distance value of at least one piece of point data included in frame data obtained in the first operation mode does not change by a predetermined amount or more for multiple pieces of frame data. When the first trigger is obtained, the mode of the LiDAR device is switched from the first operation mode to the second operation mode and the LiDAR device is operated. However, no limitation thereto is imposed.

In addition, for example, while operating in the first operation mode, the LiDAR device obtains the first trigger when a distance value of at least a portion of a sub point data set included in frame data obtained in the first operation mode does not change by a predetermined amount or more. When the first trigger is obtained, the mode of the LiDAR device is switched from the first operation mode to the second operation mode and the LiDAR device is operated. However, no limitation thereto is imposed.

In addition, for example, while operating in the first operation mode, the LiDAR device obtains the first trigger when a distance value of at least a portion of sub point data included in frame data obtained in the first operation mode is equal to or greater than a predetermined distance value. When the first trigger is obtained, the mode of the LiDAR device is switched from the first operation mode to the second operation mode and the LiDAR device is operated. However, no limitation thereto is imposed.

In addition, when the LiDAR device according to the embodiment obtains the second trigger while operating in the second operation mode, the mode of the LiDAR device is switched to the first operation mode and the LiDAR device is operated.

For example, while operating in the second operation mode, the LiDAR device obtains the second trigger when a property related to a person is generated in the property for frame data obtained in the second operation mode. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a distance value of at least one piece of point data included in frame data obtained in the second operation mode changes by a predetermined amount or more for multiple pieces of frame data. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a distance value of at least a portion of a sub point data set included in frame data obtained in the second operation mode changes by a predetermined amount or more for multiple pieces of frame data. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a distance value of at least a portion of a sub point data set included in frame data obtained in the second operation mode is equal to or lower than a predetermined distance value. When the second trigger is obtained, the mode of the LiDAR device is switched from the second operation mode to the first operation mode and the LiDAR device is operated. However, no limitation thereto is imposed.

In addition, for example, while operating in the second operation mode, the LiDAR device obtains the second trigger when a motion is detected for at least a portion of a sub point data set included in frame data obtained in the second operation mode. When the second trigger is obtained, the mode of the LiDAR device is switched from the second operation mode to the first operation mode and the LiDAR device is operated. However, no limitation thereto is imposed.

Figure 24:
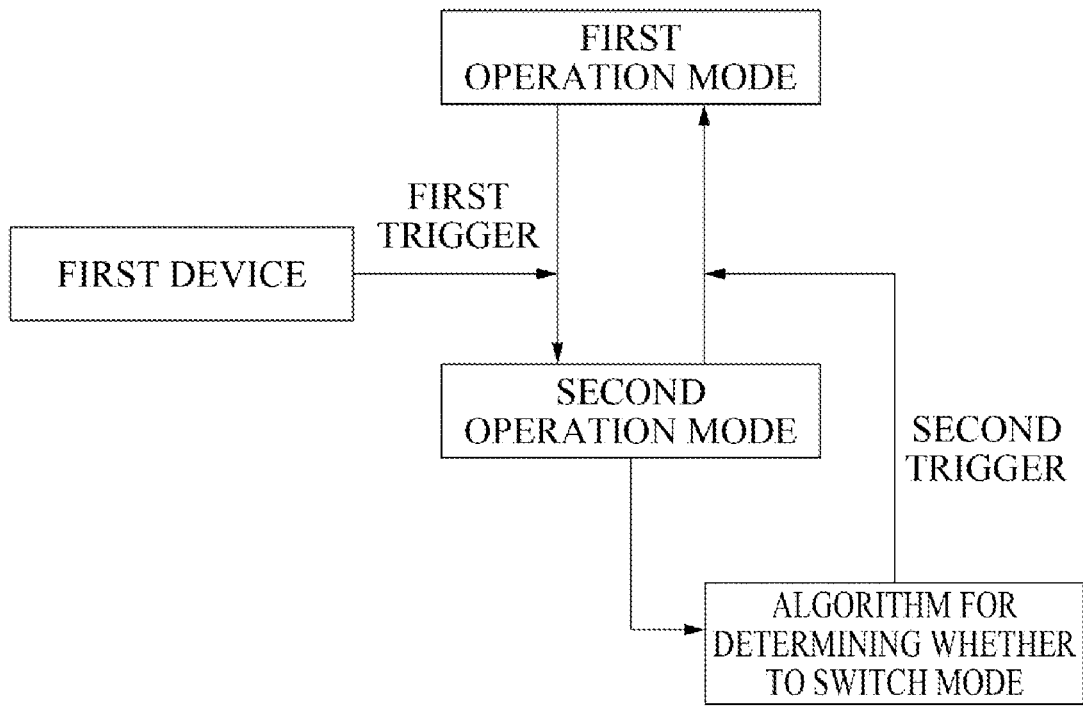
FIG. 24 is a diagram illustrating a smart power management system of a LiDAR device according to an embodiment.

FIG. 24 is a diagram illustrating a smart power management system of a LiDAR device according to an embodiment.

Referring to FIG. 24, the LiDAR device according to the embodiment may operate in at least a first operation mode and a second operation mode. To this, the above-described details may be applied, so a redundant description will be omitted.

In addition, the second operation mode may be an operation mode in which power consumption per unit time is lower than that in the first operation mode. To this, the above-described details of the various embodiments of the basic operation mode and the variation operation mode may be applied, so a redundant description will be omitted.

Referring to FIG. 24, the LiDAR device according to the embodiment may obtain a first trigger for switching from the first operation mode to the second operation mode, from a first device at which the LiDAR device is disposed, and may obtain a second trigger for switching from the second operation mode to the first operation mode, on the basis of frame data obtained in the second operation mode.

Herein, an algorithm for determining whether to switch a mode may be applied to obtain the second trigger on the basis of the frame data obtained in the second operation mode. The above-described second trigger generation conditions may be applied to the algorithm for determining whether to switch a mode, so a redundant description will be omitted.

In addition, the above-described details may be applied to the first trigger obtained from the first device, so a redundant description will be omitted.

Figure 25:
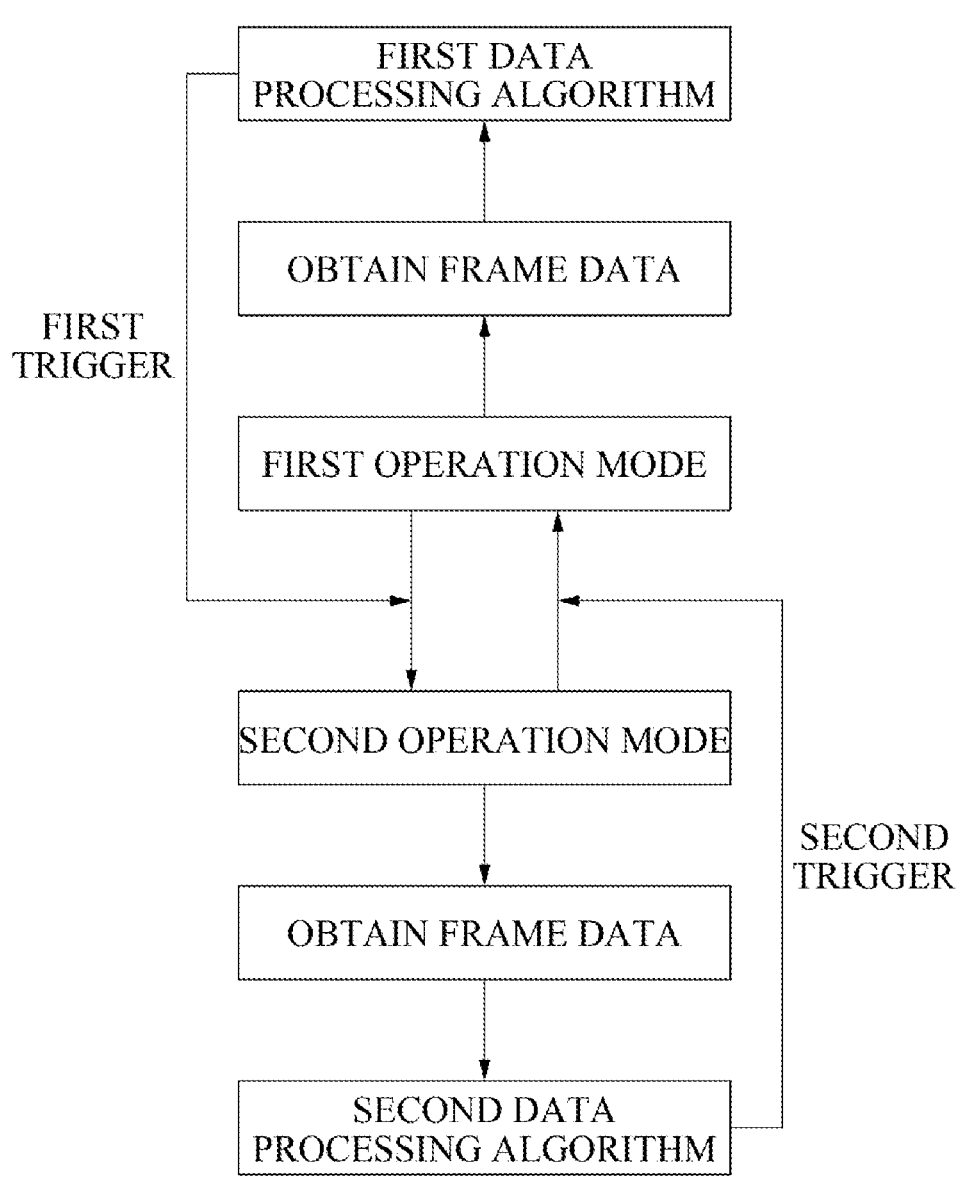
FIG. 25 is a diagram illustrating data processing of a LiDAR device equipped with a smart power management system according to an embodiment.

FIG. 25 is a diagram illustrating data processing of a LiDAR device equipped with a smart power management system according to an embodiment.

Referring to FIG. 25, the LiDAR device according to the embodiment may operate in at least a first operation mode and a second operation mode. To this, the above-described details may be applied, so a redundant description will be omitted.

In addition, the second operation mode may be an operation mode in which power consumption per unit time is lower than that in the first operation mode. To this, the above-described details of the various embodiments of the basic operation mode and the variation operation mode may be applied, so a redundant description will be omitted.

Referring to FIG. 25, the LiDAR device according to the embodiment may obtain a first trigger on the basis of frame data obtained in the first operation mode, and may obtain a second trigger on the basis of frame data obtained in the second operation mode.

Herein, in order to obtain the first trigger, a first data processing algorithm may be performed on frame data obtained in the first operation mode, and a second data processing algorithm may be performed on frame data obtained in the second operation mode.

Herein, the above-described details may be applied to the first and the second data processing algorithm, so a redundant description will be omitted.

In addition, the first and the second data processing algorithm may differ from each other.

For example, the first data processing algorithm may be an algorithm for obtaining a property for a sub point data set included in frame data obtained in the first operation mode. The second data processing algorithm may be an algorithm for obtaining a distance change value of at least one piece of point data included in frame data obtained in the second operation mode. However, no limitation thereto is imposed.

Figure 26:
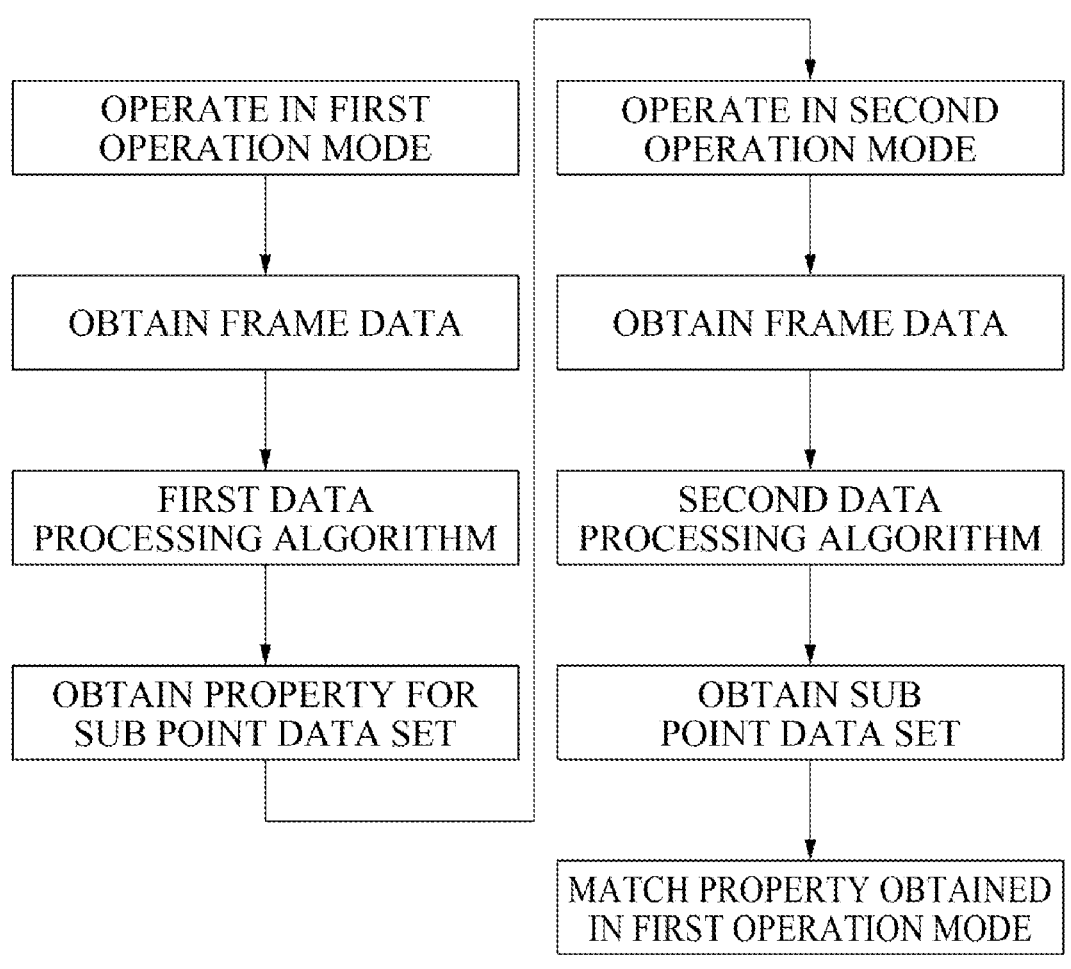
FIG. 26 is a diagram illustrating data processing of a LiDAR device equipped with a smart power management system according to an embodiment.

FIG. 26 is a diagram illustrating data processing of a LiDAR device equipped with a smart power management system according to an embodiment.

Referring to FIG. 26, the LiDAR device according to the embodiment may operate in at least a first operation mode and a second operation mode. To this, the above-described details may be applied, so a redundant description will be omitted.

In addition, the second operation mode may be an operation mode in which power consumption per unit time is lower than that in the first operation mode. To this, the above-described details of the various embodiments of the basic operation mode and the variation operation mode may be applied, so a redundant description will be omitted.

Referring to FIG. 26, the LiDAR device according to the embodiment may operate in the first operation mode, and may perform a first data processing algorithm on frame data obtained in the first operation mode, thereby obtaining a property for at least one sub point data set.

The above-described details may be applied thereto, so a redundant description will be omitted.

In addition, referring to FIG. 26, the LiDAR device according to the embodiment may operate in the second operation mode, and may perform a second data processing algorithm on frame data obtained in the second operation mode, thereby obtaining at least one sub point data set.

The above-described details may be applied thereto, so a redundant description will be omitted.

In addition, referring to FIG. 26, when the LiDAR device according to the embodiment operates in the second operation mode, the obtained at least one sub point data set is matched with a property for at least one sub point data set obtained in the first operation mode.

For example, in a case in which the LiDAR device obtains a first property for a first sub point data set during operation in the first operation mode, a second sub point data set corresponding to the first sub point data set is obtained when the LiDAR device is operated in the second operation mode, and the first property is matched with the second sub point data set. However, no limitation thereto is imposed.

In addition, in the second operation mode in which power consumption per unit time is low, a smaller amount of data may be obtained than in the first operation mode, so it may be difficult to obtain a property for a sub point data set. Regarding this, when a property obtained in the first operation mode in which the amount of data is larger is utilized and is matched, a property is easily obtained also in the second operation mode.

Figure 27A:
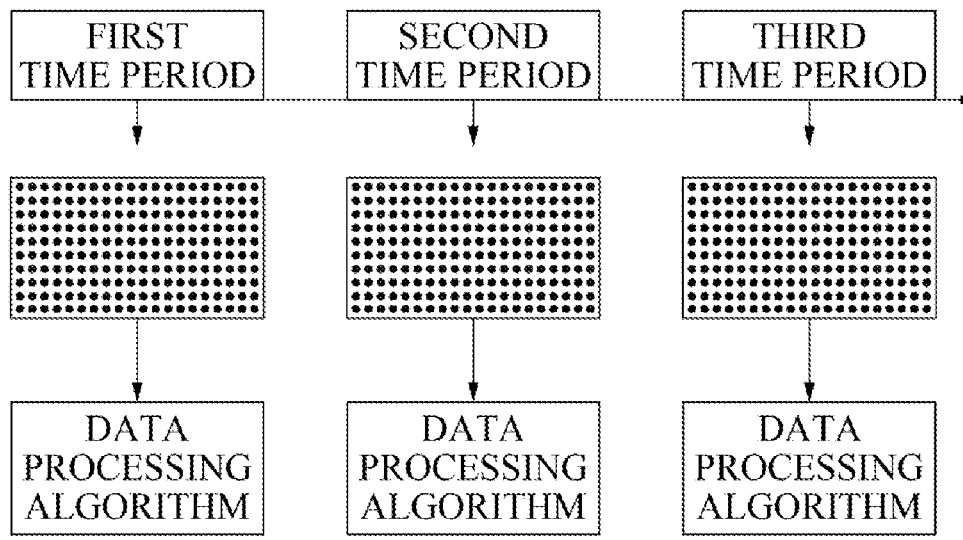
FIGS. 27A and 27B are diagrams illustrating data processing of a LiDAR device equipped with a smart power management system according to an embodiment.
Figure 27B:
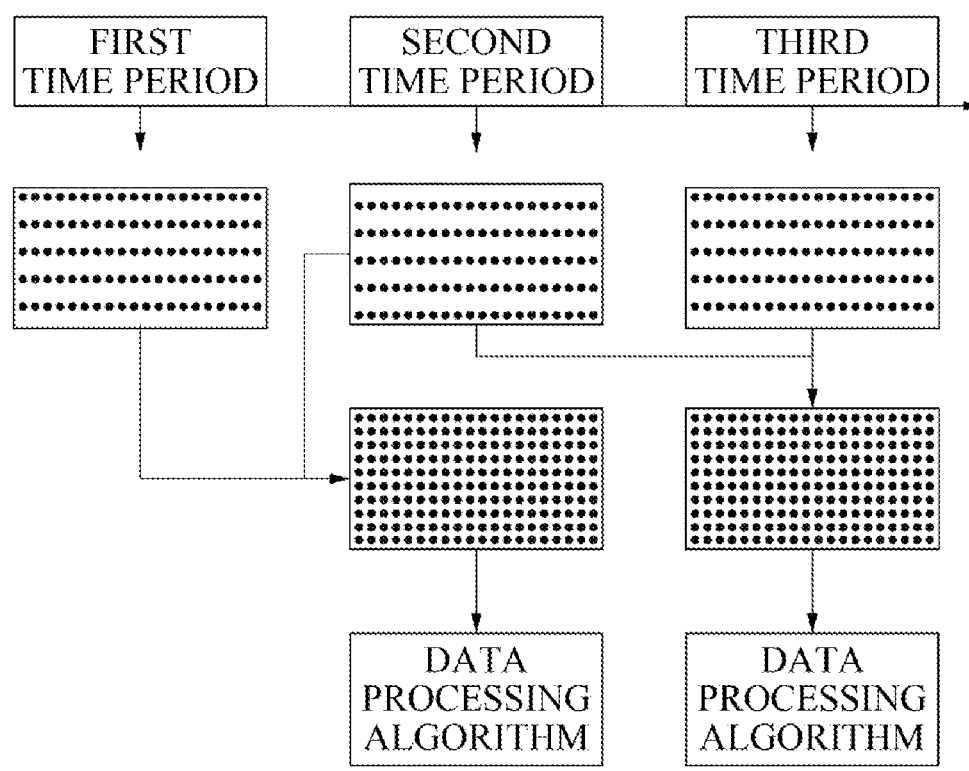

FIGS. 27A and 27B are diagrams illustrating data processing of a LiDAR device equipped with a smart power management system according to an embodiment.

FIG. 27A is a diagram illustrating a point data set that is obtained when a LiDAR device according to an embodiment operates in a first operation mode, and a data processing algorithm for the point data set. FIG. 27B is a diagram illustrating a point data set that is obtained when a LiDAR device according to an embodiment operates in a second operation mode, and a data processing algorithm for the point data set.

Referring to FIG. 27A, when the LiDAR device according to the embodiment operates in the first operation mode, the LiDAR device obtains a first point data set during a first time period, obtains a second point data set during a second time period, and obtains a third point data set during a third time period.

Herein, the above-described details may be applied to the point data sets, so a redundant description will be omitted.

In addition, referring to FIG. 27A, when the LiDAR device according to the embodiment operates in the first operation mode, a data processing algorithm is performed on the first point data set obtained during the first time period, a data processing algorithm is performed on the second point data set obtained during the second time period, and a data processing algorithm is performed on the third point data set obtained during the third time period.

In addition, referring to FIG. 27B, when the LiDAR device according to the embodiment operates in the second operation mode, the LiDAR device obtains a fourth point data set during a first time period, obtains a fifth point data set during a second time period, and obtains a sixth point data set during a third time period.

Herein, the above-described details may be applied to the point data sets, so a redundant description will be omitted.

In addition, referring to FIG. 27B, when the LiDAR device according to the embodiment operates in the second operation mode, a data processing algorithm is performed on frame data including the fourth point data set obtained during the first time period and the fifth point data set obtained during the second time period, and a data processing algorithm is performed on frame data including the fifth point data set obtained during the second time period and the sixth point data set obtained during the third time period.

Herein, referring to FIG. 27B, when the LiDAR device according to the embodiment operates in the second operation mode, the frame data on which a first data processing algorithm is performed and the frame data on which a second data processing algorithm is performed may include a point data set that is obtained in at least a portion of the same time period.

The method according to the embodiment may be implemented in the form of program instructions that can be executed through various computer means and recorded in a computer-readable medium. The computer-readable medium may include program instructions, data files, data structures, etc. alone or in combination. The program instructions recorded in the medium may be specially designed and configured for embodiments, or may be known and usable to those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like. The above-described hardware device may be configured to operate as one or more software modules to perform the operation of an embodiment, and vice versa.

While the elements and features of the present disclosure have been described with reference to embodiments of the present invention, the present disclosure is not limited thereto. It will be obvious to those skilled in the art that various changes or modifications may be made therein without departing from the spirit and scope of the present disclosure. Accordingly, such changes or modifications are intended to fall within the scope of the appended claims.

Although the present disclosure has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. A Light Detection And Ranging (LiDAR) device with a smart power management system comprising:

a laser emitting unit configured to emit laser;

a laser detecting unit configured to detect laser emitted from the laser emitting unit; and a controller configured to operate the LiDAR device in a first operation mode and a second operation mode in which a power consumption per unit time is lower than a power consumption per unit time of the first operation mode, wherein, in response to the LiDAR device operating in the first operation mode, a first sampling period for obtaining a first point data and a second sampling period for obtaining a second point data are sequential, wherein in the first sampling period a first emitter is configured to emit laser N times, and in the second sampling period a second emitter is configured to emit laser M times, wherein the first emitter is different from the second emitter, wherein a first time interval is provided between the first sampling period and the second sampling period, wherein in response to the LiDAR device operating in the second operation mode, a third sampling period for obtaining a third point data and a fourth sampling period for obtaining a fourth point data are sequential, wherein in the third sampling period the first emitter is configured to emit laser L times, and in the fourth sampling period a third emitter is configured to emit laser P times, wherein a second time interval is provided between the third sampling period and the fourth sampling period, wherein the second time interval is longer than the first time interval, wherein N, M, L, and P are each integers greater than 1, and wherein the controller is configured to operate such that the power consumption per unit time in the second operation mode is lower than the power consumption per unit time in the first operation mode by satisfying any one of the following conditions;

i) a first condition where the third emitter is set to be the same as the second emitter, the N is set equal to the L, the M is set equal to the P, and the second time interval is set to be longer than the first time interval so as to reduce a frame generation rate, ii) a second condition where the third emitter is set to be the same as the second emitter, the second time interval is set to be longer than the first time interval, and the L is set to be less than the N and the P is set to be less than the M, so that the frame generation rate is maintained in both the first and second operation modes, while the power consumption in the second operation mode is reduced compared to the first operation mode, or iii) a third condition where the N is set equal to the L, the M is set equal to the P, the second time interval is set to be longer than the first time interval, the third emitter is configured such that a distance between the third emitter and the first emitter is greater than a distance between the second emitter and the first emitter, so that the frame generation rate is maintained in both the first and second operation mode, while the power consumption in the second operation mode is reduced compared to the first operation mode, and a number of point data included in a frame data generated in the second operation mode is smaller than a number of point data included in a frame data generated in the first operation mode.

2. The LiDAR device of claim 1, wherein in the first to fourth sampling periods, a repetition of laser emitted from the laser emitting unit is the same.

3. The LiDAR device of claim 1, wherein in response to the first operation mode and the second operation mode satisfying the third condition, an angular resolution between the first point data and the second point data is different from an angular resolution between the third point data and the fourth point data.

4. The LiDAR device of claim 3, wherein an angle value of the angular resolution between the third point data and the fourth point data is greater an angle value of the angular resolution between the first point data and the second point data.

5. The LiDAR device of claim 1, wherein the controller is configured to:

obtain a first frame data including the first point data and the second point data in response to the LiDAR device operating in the first operation mode, and obtain a second frame data including the third point data and the fourth point data in response to the LiDAR device operating in the second operation mode, and wherein, in response to the first operation mode and the second operation mode satisfying the third condition, a resolution of the second frame data is lower than a resolution of the first frame data.

6. The LiDAR device of claim 1, wherein the controller is configured to:

obtain a first frame data including the first point data and the second point data in response to the LiDAR device is operating in the first operation mode, and obtain a second frame data including the third point data and the fourth point data in response to the LiDAR device operating in the second operation mode, and wherein in response to the first operation mode and the second operation mode satisfying the third condition, a number of point data included in the second frame data is less than a number of point data included in the first frame data.

7. The LiDAR device of claim 1, wherein the controller is configured to:

obtain a first frame data including the first point data and the second point data in response to the LiDAR device operating in the first operation mode, and obtain a second frame data including the third point data and the fourth point data in response to the LiDAR device operating in the second operation mode, and wherein, in response to the first operation mode and the second operation mode satisfying the third condition, a length of time for obtaining the second frame data is longer than the length of time for obtaining the first frame data.

8. The LiDAR device of claim 1, wherein the laser emitting unit is provided in the form of an array including at least two or more emitters, and wherein the laser detecting unit is provided in the form of an array including at least two or more detectors.

9. The LiDAR device of claim 8, wherein in response to the first emitter being activated, a first group of emitters including the first emitter are configured to be activated, wherein in response to the second emitter being activated, a second group of emitters including the second emitter are configured to be activated, and wherein in response to the third emitter being activated, a third group of emitters including the third emitter are configured to be activated.

10. The LiDAR device of claim 9, wherein the third group of emitters is the same as the second group of emitters.

* * * * *